(12) United States Patent
Ikeda et al.

(10) Patent No.: US 11,204,657 B2
(45) Date of Patent: Dec. 21, 2021

(54) DISPLAY DEVICE AND CONTROL PROGRAM

(71) Applicant: Semiconductor Energy Laboratory Co., Ltd., Kanagawa-ken (JP)

(72) Inventors: Takayuki Ikeda, Kanagawa (JP); Yuki Okamoto, Kanagawa (JP); Kei Takahashi, Kanagawa (JP); Shunpei Yamazaki, Tokyo (JP)

(73) Assignee: Semiconductor Energy Laboratory Co., Ltd.

( * ) Notice: Subject to any disclaimer, the term of this patent is extended or adjusted under 35 U.S.C. 154(b) by 68 days.

(21) Appl. No.: 15/685,792

(22) Filed: Aug. 24, 2017

(65) Prior Publication Data
US 2018/0059841 A1   Mar. 1, 2018

(30) Foreign Application Priority Data
Aug. 29, 2016 (JP) .............................. JP2016-166719

(51) Int. Cl.
*G06F 3/041* (2006.01)
*G06F 1/3234* (2019.01)
(Continued)

(52) U.S. Cl.
CPC .......... *G06F 3/0412* (2013.01); *G06F 1/3203* (2013.01); *G06F 1/3265* (2013.01);
(Continued)

(58) Field of Classification Search
CPC .. G06F 3/0412; G06F 1/3265; G06F 3/04883; G06F 1/3203; Y02D 10/00; G02F 1/13338
See application file for complete search history.

(56) References Cited

U.S. PATENT DOCUMENTS 7,737,958 B2   6/2010   Jeon et al.
7,782,308 B2   8/2010   Shin et al.
(Continued)

FOREIGN PATENT DOCUMENTS

CN   105047143 A   11/2015
CN   105808137 A   7/2016
(Continued)

OTHER PUBLICATIONS

Kusunoki, K. et al., "Transmissive OLED and Reflective LC Hybrid (TR-Hybrid) Display," SID Digest '16: SID International Symposium Digest of Technical Papers, May 22, 2016, vol. 47, pp. 57-60.
(Continued)

*Primary Examiner* — Jose R Soto Lopez
(74) *Attorney, Agent, or Firm* — Husch Blackwell LLP

(57) ABSTRACT

A display device with excellent visibility can be provided. The display device includes a display region displayed by a light-emitting element. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point, the display region includes a first region and a second region obtained by excluding the first region from the display region, The first region includes a first circle and a second circle, the center of the first circle is the first point, and the center of the second circle is the third point. The luminance in the first region is higher than the luminance in the second region.

13 Claims, 39 Drawing Sheets

(51) Int. Cl.
*G06F 3/0488* (2013.01)
*G06F 1/3203* (2019.01)
*G02F 1/1333* (2006.01)

(52) U.S. Cl.
CPC ...... *G06F 3/04883* (2013.01); *G02F 1/13338* (2013.01); *Y02D 10/00* (2018.01)

(56) References Cited

U.S. PATENT DOCUMENTS

| | | | |
|---|---|---|---|
| 7,916,125 | B2 | 3/2011 | Shin et al. |
| 8,028,251 | B2 | 9/2011 | Park et al. |
| 8,115,739 | B2 | 2/2012 | Park et al. |
| 8,136,052 | B2 | 3/2012 | Shin et al. |
| 8,169,411 | B2 | 5/2012 | Park et al. |
| 8,302,032 | B2 | 10/2012 | Shin et al. |
| 8,312,391 | B2 | 11/2012 | Shin et al. |
| 8,854,286 | B2 | 10/2014 | Yamazaki et al. |
| 8,890,781 | B2 | 11/2014 | Yamazaki et al. |
| 9,041,658 | B2 | 5/2015 | Park et al. |
| 9,058,099 | B2 | 6/2015 | Park et al. |
| 9,165,502 | B2 | 10/2015 | Yamazaki et al. |
| 9,368,082 | B2 | 6/2016 | Yamazaki et al. |
| 10,108,332 | B2 | 10/2018 | Park et al. |
| 10,269,328 | B2 | 4/2019 | Li |
| 10,303,356 | B2 | 5/2019 | Park et al. |
| 10,698,596 | B2 | 6/2020 | Park et al. |
| 2007/0121014 | A1* | 5/2007 | Lee ............ H04N 5/57 348/687 |
| 2007/0273668 | A1 | 11/2007 | Park et al. |
| 2007/0277123 | A1* | 11/2007 | Shin ............ G06F 3/04883 715/863 |
| 2007/0277124 | A1 | 11/2007 | Shin et al. |
| 2008/0172633 | A1 | 7/2008 | Jeon et al. |
| 2008/0259007 | A1* | 10/2008 | Chiu ............ G09G 3/2011 345/77 |
| 2009/0085847 | A1* | 4/2009 | Morisue ............ G09G 3/3406 345/88 |
| 2009/0213086 | A1 | 8/2009 | Chae et al. |
| 2009/0256814 | A1 | 10/2009 | Chung et al. |
| 2011/0012848 | A1* | 1/2011 | Li ............ G06F 3/04883 345/173 |
| 2011/0231796 | A1* | 9/2011 | Vigil ............ G06F 3/04883 715/810 |
| 2011/0304557 | A1* | 12/2011 | Wilburn ............ G06F 3/0488 345/173 |
| 2012/0030636 | A1* | 2/2012 | Miyazaki ............ G06F 3/04847 715/863 |
| 2012/0154295 | A1* | 6/2012 | Hinckley ............ G06F 3/04883 345/173 |
| 2012/0218314 | A1* | 8/2012 | Purdy ............ G09G 3/3208 345/690 |
| 2014/0109004 | A1* | 4/2014 | Sadhvani ............ G06F 3/04842 715/810 |
| 2014/0176504 | A1 | 6/2014 | Yoo et al. |
| 2015/0163410 | A1 | 6/2015 | Yamazaki et al. |
| 2015/0205451 | A1* | 7/2015 | Lee ............ G06F 3/0486 715/766 |
| 2015/0338942 | A1* | 11/2015 | Stone ............ G06F 3/0481 345/173 |
| 2015/0364076 | A1* | 12/2015 | Park ............ G09G 3/2081 345/77 |
| 2016/0035275 | A1 | 2/2016 | Yamazaki et al. |
| 2016/0110100 | A1* | 4/2016 | Wang ............ G06F 3/04842 715/762 |
| 2016/0210013 | A1* | 7/2016 | Park ............ G06F 3/0486 |
| 2016/0232852 | A1* | 8/2016 | An ............ G09G 3/20 |
| 2016/0232868 | A1 | 8/2016 | Yamazaki et al. |
| 2017/0004788 | A1 | 1/2017 | Yamazaki et al. |
| 2017/0206857 | A1* | 7/2017 | Li ............ G09G 3/38 |

FOREIGN PATENT DOCUMENTS

| | | |
|---|---|---|
| EP | 1 847 915 A2 | 10/2007 |
| EP | 1 860 530 A2 | 11/2007 |
| EP | 1 860 535 A2 | 11/2007 |
| EP | 1 860 536 A2 | 11/2007 |
| EP | 1 860 537 A2 | 11/2007 |
| EP | 1 860 538 A2 | 11/2007 |
| EP | 1 860 539 A1 | 11/2007 |
| EP | 3 054 379 A1 | 8/2016 |
| EP | 3 570 154 A1 | 11/2019 |
| JP | 2011-141522 | 7/2011 |
| JP | 2011-141524 | 7/2011 |
| TW | 200805132 | 1/2008 |

OTHER PUBLICATIONS

Sakuishi, T. et al., "Transmissive OLED and Reflective LC Hybrid (TR-Hybrid) Display with High Visibility and Low Power Consumption," SID Digest '16: SID International Symposium Digest of Technical Papers, May 22, 2016, vol. 47, pp. 735-738.

Ohide, T. et al., "Application of Transfer Technology to Manufacturing of Transmissive OLED and Reflective LC Hybrid (TR-Hybrid) Display," SID Digest '16: SID International Symposium Digest of Technical Papers, May 22, 2016, vol. 47, pp. 1002-1004.

Marks, L.E., "Brightness and Retinal Locus: Effects of Target Size and Spectral Composition," Perception & Psychophysics, 1971, vol. 9 (1A), pp. 26-30.

Taiwanese Office Action (Application No. 105137946) dated Aug. 27, 2020.

* cited by examiner

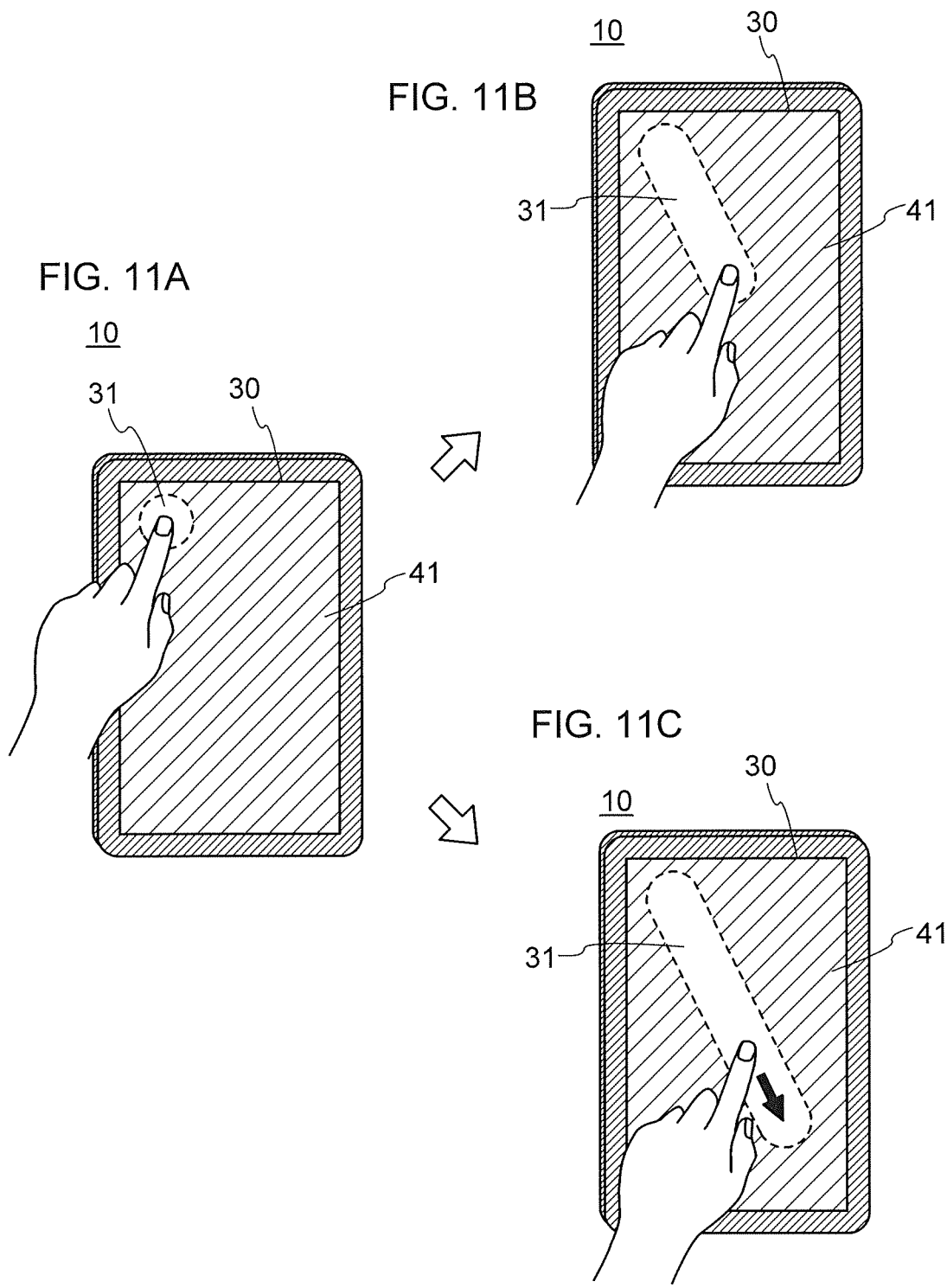

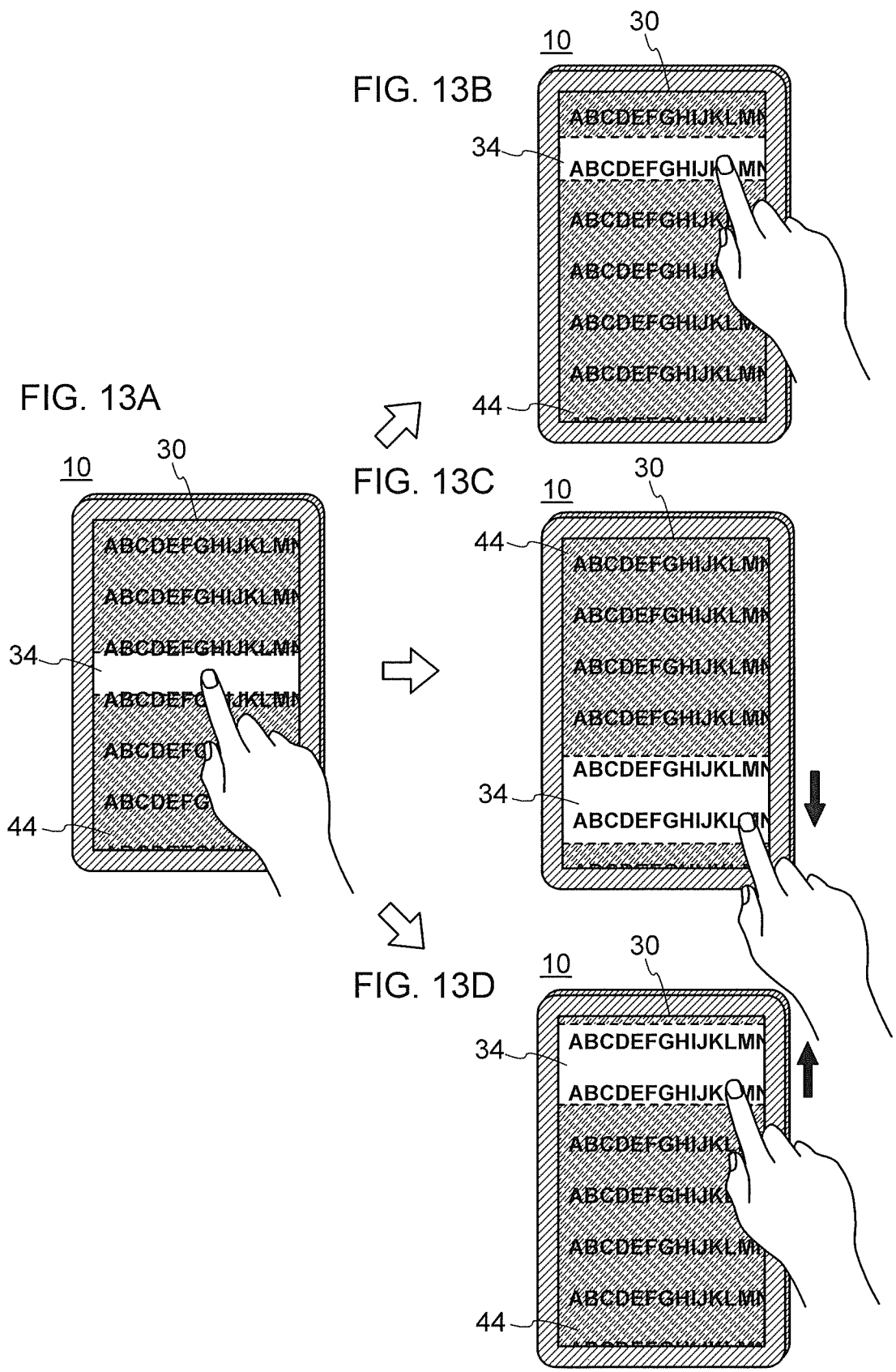

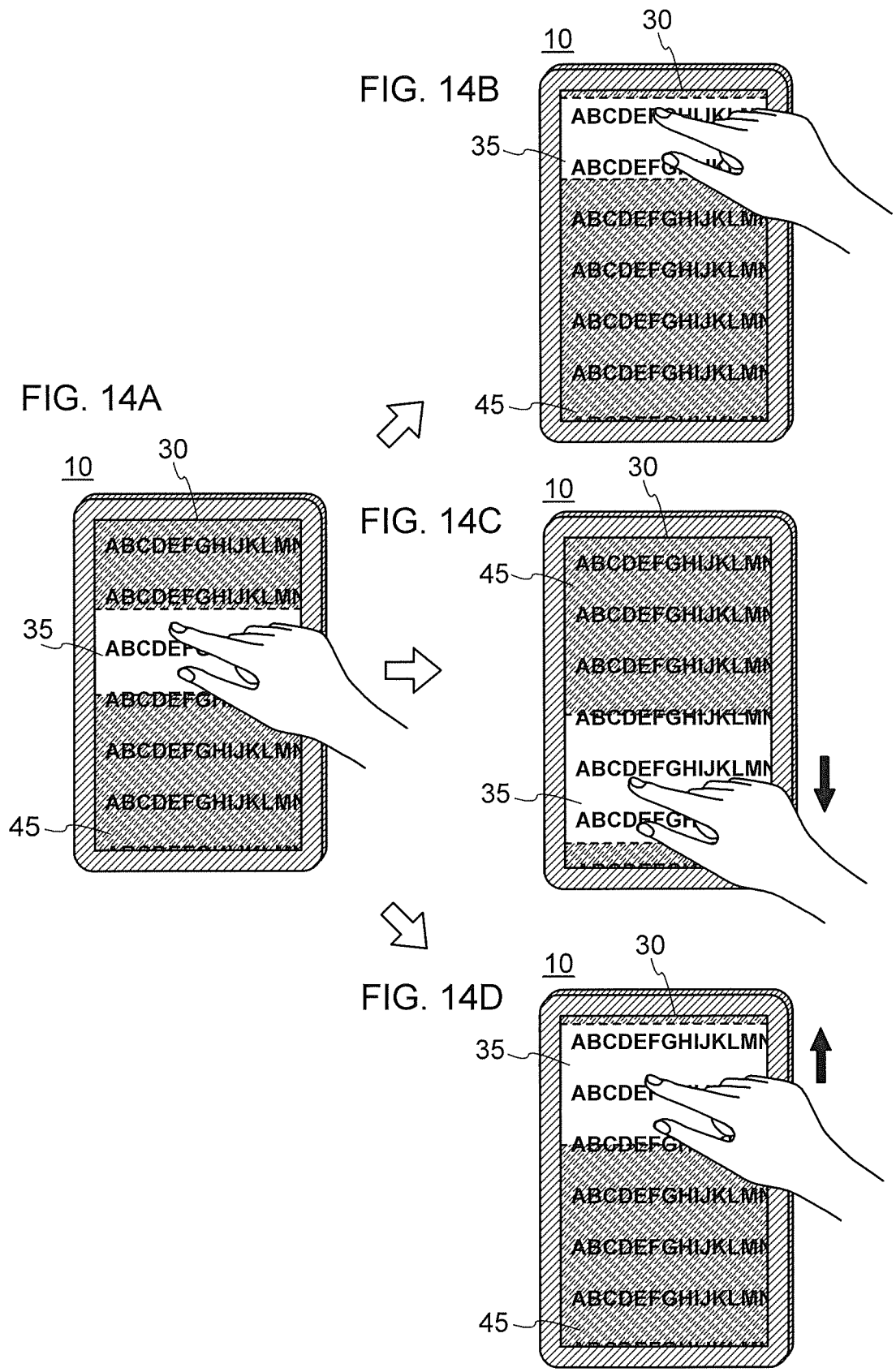

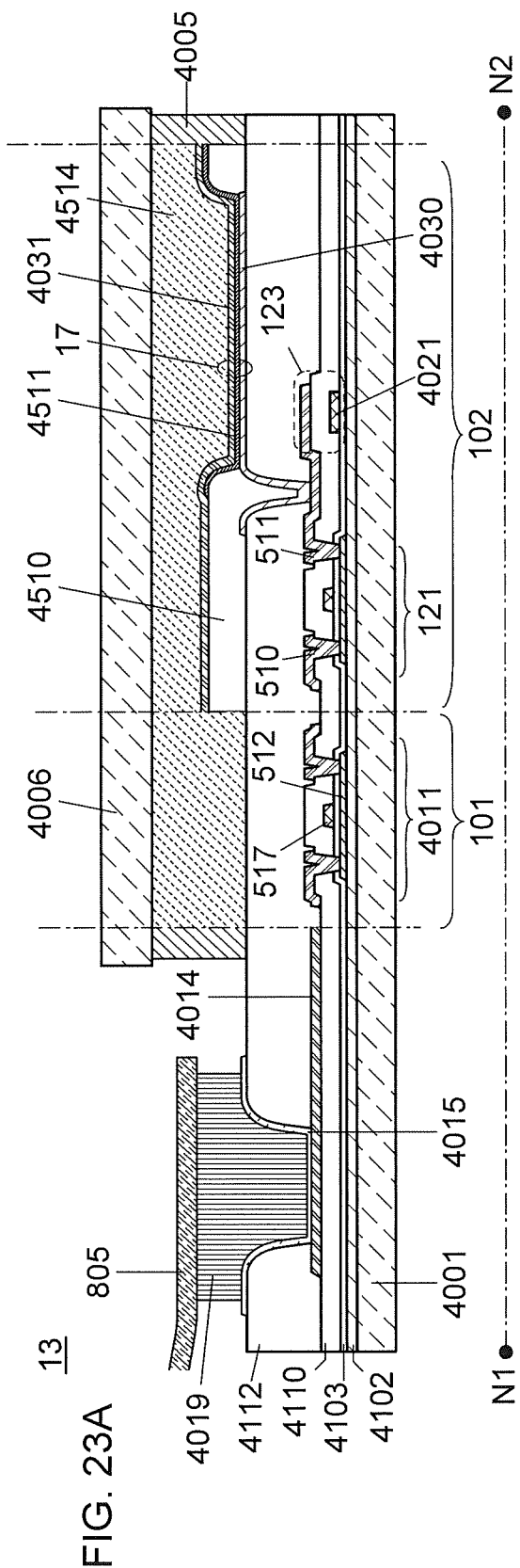
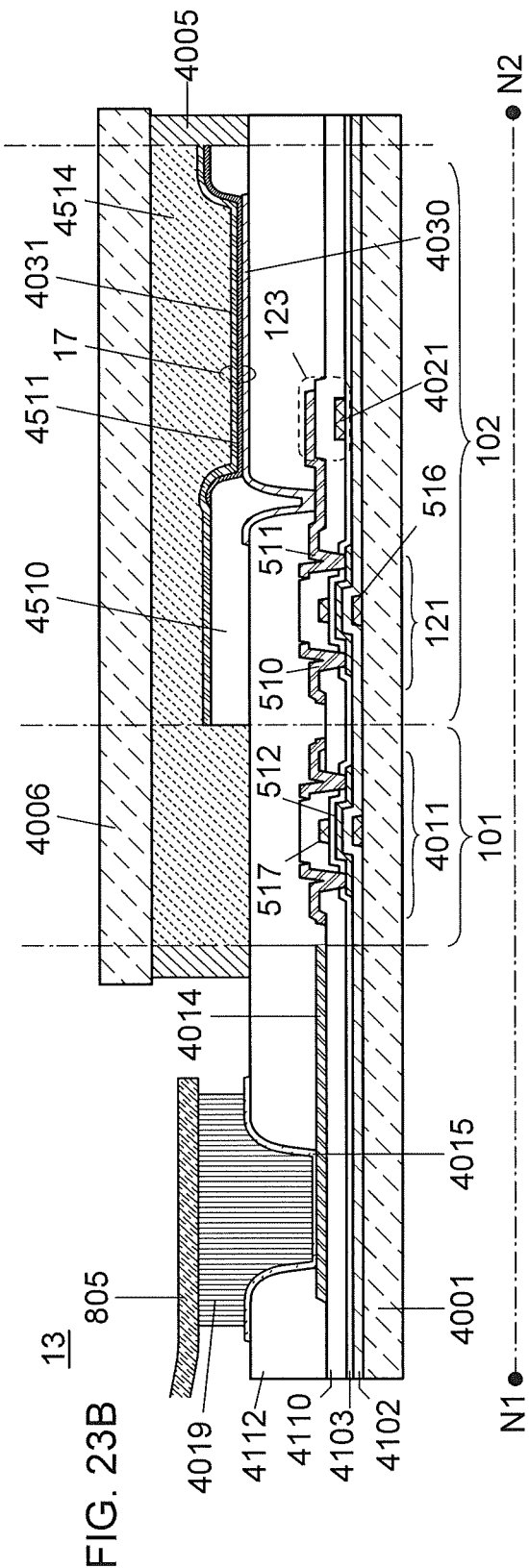
FIG. 23A
FIG. 23B

FIG. 35A
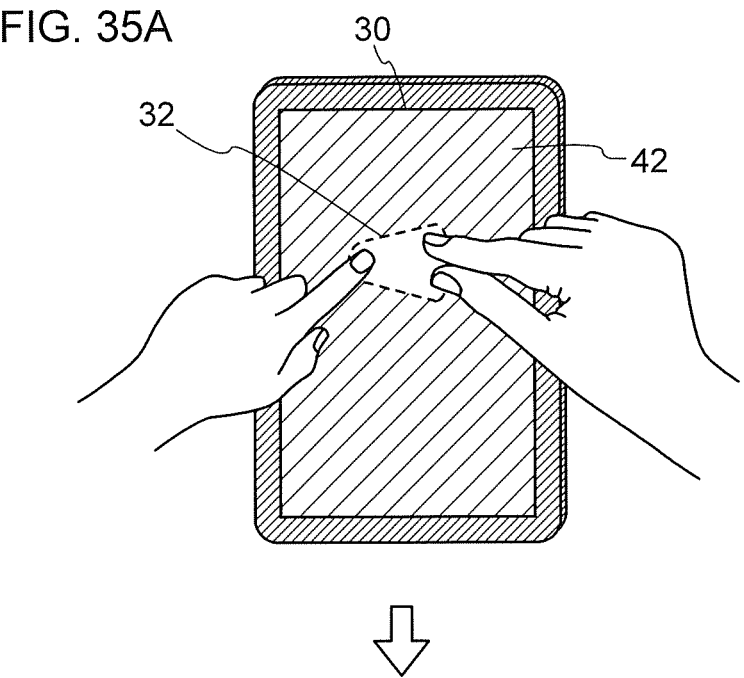
FIG. 35B
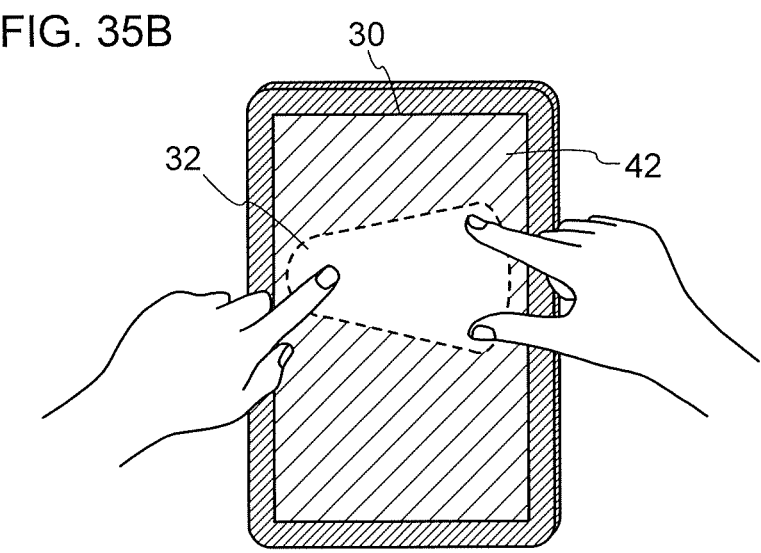

DISPLAY DEVICE AND CONTROL PROGRAM

BACKGROUND OF THE INVENTION

1. Field of the Invention

One embodiment of the present invention relates to a display device or a control program thereof.

In addition, one embodiment of the present invention relates to a semiconductor device. Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter.

In this specification and the like, a semiconductor device generally means a device that can function by utilizing semiconductor characteristics. In some cases, a display device, a light-emitting device, a memory device, an electro-optical device, a semiconductor circuit, or an electronic device includes a semiconductor device.

2. Description of the Related Art

Portable information terminals equipped with touch panels are in widespread use. As a display of a portable information terminal, an organic electroluminescence (EL) display has been attracting attention. An organic EL display is excellent in visibility and applicable to a flexible display.

A human visual field can be divided into a central visual field and a peripheral visual field. It is said that a peripheral visual field is more sensitive to brightness than a central visual field, and is particularly sensitive to blue (Non-Patent Document 1).

A technology for using oxide semiconductor transistors in display devices such as liquid crystal displays and organic EL displays has been drawing attention. An oxide semiconductor transistor has an extremely low off-state current. With the use of such an extremely low off-state current, the refresh frequency at the time of displaying still images is reduced, resulting in reduction in power consumption of liquid crystal displays or organic EL displays. Such a technique has been disclosed (Patent Document 1 and Patent Document 2).

REFERENCE

Patent Document

[Patent Document 1] Japanese Published Patent Application No. 2011-141522
[Patent Document 2] Japanese Published Patent Application No. 2011-141524
[Non-Patent Document 1] Lawrence E. Marks, "Brightness and retinal locus: Effects of target size and spectral composition", Perception & Psychophysics, 1971, Vol. 9, pp. 26-30.

SUMMARY OF THE INVENTION

The power consumption of a portable information terminal with a battery, e.g., a mobile phone, is required to be reduced. In the case where such an information terminal employs an organic EL display, increase in the luminance of the display for improving visibility results in an increased current that flows through EL elements; as a result, the power consumption becomes large. In particular, an EL element exhibiting blue consumes more power than EL elements exhibiting other colors.

An object of one embodiment of the present invention is to provide a display device with excellent visibility. An object of one embodiment of the present invention is to provide a control program for improving the visibility of the display device. An object of one embodiment of the present invention is to provide a display device with low power consumption. An object of one embodiment of the present invention is to provide a novel display device. An object of one embodiment of the present invention is to provide a novel semiconductor device.

Note that the description of a plurality of objects does not mutually preclude the existence. One embodiment of the present invention does not necessarily achieve all the objects. Objects other than those listed above are apparent from the description of the specification, drawings, and claims, and also such objects could be an object of one embodiment of the present invention.

One embodiment of the present invention is a display device including a display region displayed by a light-emitting element. The display region is configured to detect a touch. The display region includes a first region and a second region obtained by excluding the first region from the display region. The first region includes a point touched by a user. The luminance of blue in the second region is preferably lower than the luminance of blue in the first region.

One embodiment of the present invention is a display device including a display region displayed by a light-emitting element. The display region is configured to detect a touch. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region includes a first region and a second region obtained by excluding the first region from the display region. The first region includes a first circle and a second circle, the center of the first circle is the first point, and the center of the second circle is the third point. The luminance in the first region is preferably higher than the luminance in the second region.

One embodiment of the present invention is a display device including a display region displayed by a light-emitting element. The display region is configured to detect a touch. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region comprises a first ellipse and a second ellipse, foci of the first ellipse are the first point and the second point, and foci of the second ellipse are the fifth point and the sixth point. The luminance in the first region is preferably higher than the luminance in the second region.

One embodiment of the present invention is a display device including a display region displayed by a light-emitting element. The display region is configured to detect a touch. The display region displays a background and text including a plurality of lines. The display region comprises a first region and a second region obtained by excluding the first region from the display region. The first region comprises a line of the plurality of lines that is the nearest to a point touched by a user. The luminance of the background in the first region is preferably higher than the luminance of the back ground in the second region.

One embodiment of the present invention is a display device including a display region displayed by a light-emitting element. The display region is configured to detect a touch. The display region displays a background and text including a plurality of lines. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region includes a first region and a second region obtained by excluding the first region from the display region. The first region includes a line of the plurality of lines that is the nearest to the first point, and a line of the plurality of lines that is the nearest to the third point. The luminance of the background in the first region is preferably higher than the luminance of the background in the second region.

One embodiment of the present invention is a display device including a display region displayed by a light-emitting element. The display region is configured to detect a touch. The display region displays a background and text including a plurality of lines. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region includes a line of the plurality of lines that is the nearest to the first point, a line of the plurality of lines that is the nearest to the second point, a line of the plurality of lines that is nearest to the fifth point, and a line of the plurality of lines that is the nearest to the sixth point. The luminance of the background in the first region is preferably higher than the luminance of the background in the second region.

In any of the above embodiments, the luminance of blue in the second region is preferably lower than the luminance of blue in the first region.

One embodiment of the present invention is a display device including a display region. The display region is configured to detect a touch. The display region includes a first region and a second region obtained by excluding the first region from the display region. The first region includes a point touched by a user. The luminance in the first region is preferably higher than the luminance in the second region. It is preferable that display be performed in the first region by using a light-emitting element, and that display be performed in the second region by using a reflective element.

One embodiment of the present invention is a display device including a display region. The display region is configured to detect a touch. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region comprises a first region and a second region obtained by excluding the first region from the display region. The first region includes a first circle and a second circle, the center of the first circle is the first point, and the center of the second circle is the third point. The luminance in the first region is preferably higher than a luminance in the second region. It is preferable that display be performed in the first region by using a light-emitting element, and that display be performed in the second region by using a reflective element.

One embodiment of the present invention is a display device including a display region. The display region is configured to detect a touch. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region includes a first ellipse and a second ellipse, the foci of the first ellipse are the first point and the second point, and the foci of the second ellipse are the fifth point and the sixth point. The luminance in the first region is preferably higher than a luminance in the second region. It is preferable that display be performed in the first region by using a light-emitting element, and that display be performed in the second region by using a reflective element.

One embodiment of the present invention is a display device including a display region. The display region is configured to detect a touch. The display region displays a background and text including a plurality of lines. The display region includes a first region and a second region obtained by excluding the first region from the display region. The first region includes a line of the plurality of lines that is the nearest to a point touched by a user. The luminance of the background in the first region is preferably higher than the luminance of the back ground in the second region. It is preferable that display be performed in the first region by using a light-emitting element, and that display be performed in the second region by using a reflective element.

One embodiment of the present invention is a display device including a display region. The display region is configured to detect a touch. The display region displays a background and text including a plurality of lines. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region includes a first region and a second region obtained by excluding the first region from the display region. The first region includes a line of the plurality of lines that is the nearest to the first point, and a line of the plurality of lines that is the nearest to the third point. The luminance of the background in the first region is preferably higher than a luminance of the background in the second region. It is preferable that display be performed in the first region by using a light-emitting element, and that display be performed in the second region by using a reflective element.

One embodiment of the present invention is a display device including a display region. The display region is configured to detect a touch. The display region displays a background and text including a plurality of lines. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region includes a line of the plurality of lines that is the nearest to the first point, a line of the plurality of lines that is nearest to the second point, a line of the plurality of lines that is the nearest to the fifth point, and a line of the plurality of lines that is the nearest to the sixth point. The luminance of the background in the first region is preferably higher than the luminance of the background in the second region. It is preferable that display be performed in the first region by using a light-emitting element, and that display be performed in the second region by using a reflective element.

In any of the above embodiments, the luminance of blue in the second region is preferably lower than the luminance of blue in the first region.

One embodiment of the present invention is a display method in a display region displayed by a light-emitting element. The display region is configured to detect a touch. The display region includes a first region and a second region obtained by excluding the first region from the display region. The first region includes a point touched by a user. The luminance of blue in the second region is preferably lower than the luminance of blue in the first region.

One embodiment of the present invention is a display method in a display region displayed by a light-emitting element. The display region is configured to detect a touch. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region includes a first region and a second region obtained by excluding the first region from the display region. The first region includes a first circle and a second circle, the center of the first circle is the first point, and the center of the second circle is the third point. The luminance in the first region is preferably higher than a luminance in the second region.

One embodiment of the present invention is a display method in a display region displayed by a light-emitting element. The display region is configured to detect a touch. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region includes a first ellipse and a second ellipse, the foci of the first ellipse are the first point and the second point, and the foci of the second ellipse are the fifth point and the sixth point. The luminance in the first region is preferably higher than a luminance in the second region.

One embodiment of the present invention is a display method in a display region displayed by a light-emitting element. The display region is configured to detect a touch. The display region displays a background and text including a plurality of lines. The display region includes a first region and a second region obtained by excluding the first region from the display region. The first region includes a line of the plurality of lines that is the nearest to a point touched by a user. The luminance of the background in the first region is preferably higher than the luminance of the back ground in the second region.

One embodiment of the present invention is a display method in a display region displayed by a light-emitting element. The display region is configured to detect a touch. The display region displays a background and text including a plurality of line. In the display region, a point touched by a user is a first point, a point which has been touched by the user prior to the first point is a second point, a vector that starts at the first point and ends at the second point is a first vector, a vector obtained by multiplying the first vector by k (k is a real number) is a second vector, and a point that is the second vector away from the first point is a third point. The display region includes a first region and a second region obtained by excluding the first region from the display region. The first region includes a line of the plurality of lines that is the nearest to the first point, and a line of the plurality of lines that is the nearest to the third point. The luminance of the background in the first region is preferably higher than the luminance of the background in the second region.

One embodiment of the present invention is a display method in a display region displayed by a light-emitting element. The display region is configured to detect a touch. The display region displays a background and text including a plurality of lines. In the display region, one of two points touched by a user is a first point and the other of the two points touched by the user is a second point, one of two points which have been touched by the user prior to the two points is a third point and the other of the two points which have been touched by the user prior to the two points is a fourth point, a vector that starts at the first point and ends at the third point is a first vector, a vector that starts at the second point and ends at the fourth point is a second vector, a vector obtained by multiplying the first vector by k (k is a real number) is a third vector, a vector obtained by multiplying the second vector by k is a fourth vector, a point that is the third vector away from the first point is a fifth point, and a point that is the fourth vector away from the second point is a sixth point. The display region includes a first region and a second region obtained by excluding the first region from the display region. The first region includes a line of the plurality of lines that is the nearest to the first point, a line of the plurality of lines that is the nearest to the second point, a line of the plurality of lines that is the nearest to the fifth point, and a line of the plurality of lines that is the nearest to the sixth point. The luminance of the background in the first region is preferably higher than the luminance of the background in the second region.

In any of the above embodiments, the luminance of blue in the second region is preferably lower than the luminance of blue in the first region.

According to one embodiment of the present invention, a display device with excellent visibility can be provided. According to one embodiment of the present invention, a control program for improving the visibility of the display device can be provided. According to one embodiment of the present invention, a display device with low power consumption can be provided. According to one embodiment of the present invention, a novel display device can be provided. According to one embodiment of the present invention, a novel semiconductor device can be provided.

Note that the description of these effects does not preclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 11A to 11C illustrate usage examples of a display device.

FIGS. 13A to 13D illustrate usage examples of a display device.

FIGS. 14A to 14D illustrate usage examples of a display device.

FIGS. 23A and 23B are cross-sectional views each illustrating a structural example of a display panel.

FIGS. 35A and 35B illustrate usage examples of a display device.

DETAILED DESCRIPTION OF THE INVENTION

Figure 1:
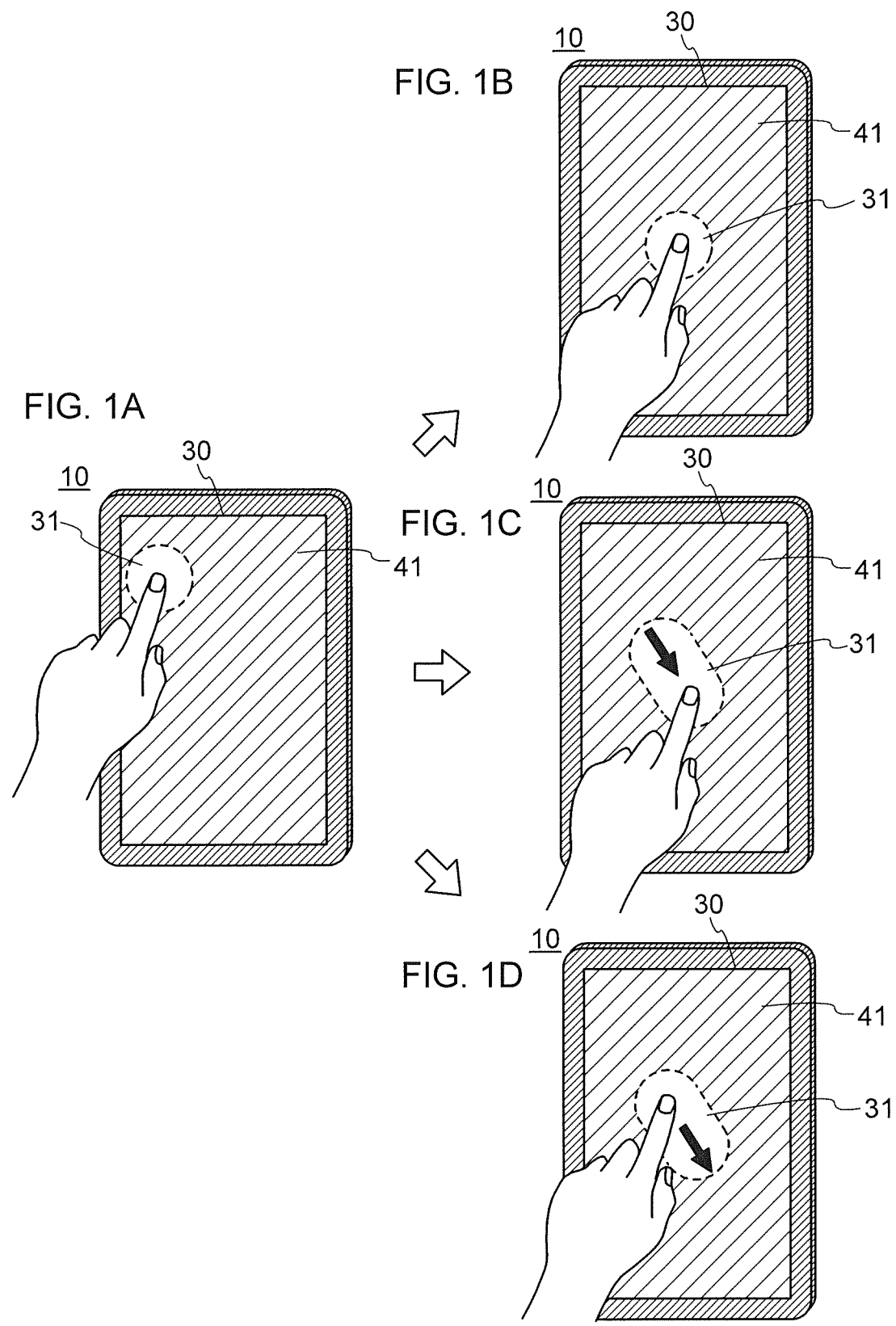
FIGS. 1A to 1D illustrate usage examples of a display device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, the size, the layer thickness, or the region is not limited to the illustrated scale. Note that the drawings are schematic views illustrating ideal examples, and embodiments of the present invention are not limited to shapes or values shown in the drawings.

Furthermore, in the present specification, any of the embodiments described below can be combined as appropriate. In addition, in the case where a plurality of structure examples are described in one embodiment, some of the structure examples can be combined as appropriate.

Embodiment 1

In this embodiment, a display device of one embodiment of the present invention is described.

A display device 10 described in this embodiment includes a display region 30. The display region 30 functions as a display panel and a touch panel (see FIG. 1A).

The display device 10 can display an image on the display region 30. A user of the display device 10 can input data by touching the display region 30. Although an example in which the display region 30 is touched by a finger is described in this specification, the display region 30 may be touched by a stylus instead of the finger.

<<Usage Examples>>

FIG. 1A illustrates an example where the user touches the display region 30 with a finger. With a touch by the finger, a region 31 which is a circle centering on the touched point emits bright light (the luminance of the region 31 is increased).

In the display region 30, the luminance of the region 31 is preferably higher than the luminance of a region obtained by excluding the region 31 from the display region 30 (a region 41). The high luminance of the region 31 results in improvement of the visibility of the vicinity of the touched point. In addition, the luminance of the region 31 is selectively increased, whereby the power consumption can be low as compared with the case where the luminance of the whole display region 30 is increased.

FIG. 1B illustrates an example where the finger has slid downward to the right from the position illustrated in FIG. 1A while touching the touch panel. The region 31 moves together with the slide of the finger.

FIG. 1C illustrates an example where the finger has slid downward to the right from the position illustrated in FIG. 1A while touching the touch panel. FIG. 1C is different from FIG. 1B in that the region 31 includes not only the touched point and the vicinity thereof but also a region which is opposite to the moving direction of the finger (shown by a black arrow), i.e., a region to the upper left of the finger.

FIG. 1D illustrates an example where the finger has slid downward to the right from the position illustrated in FIG. 1A while touching the touch panel. FIG. 1D is different from FIG. 1B in that the region 31 includes not only the touched point and the vicinity thereof but also a region along the moving direction of the finger (shown by a black arrow) and the vicinity thereof, i.e., a region to the lower right of the finger.

Figure 2:
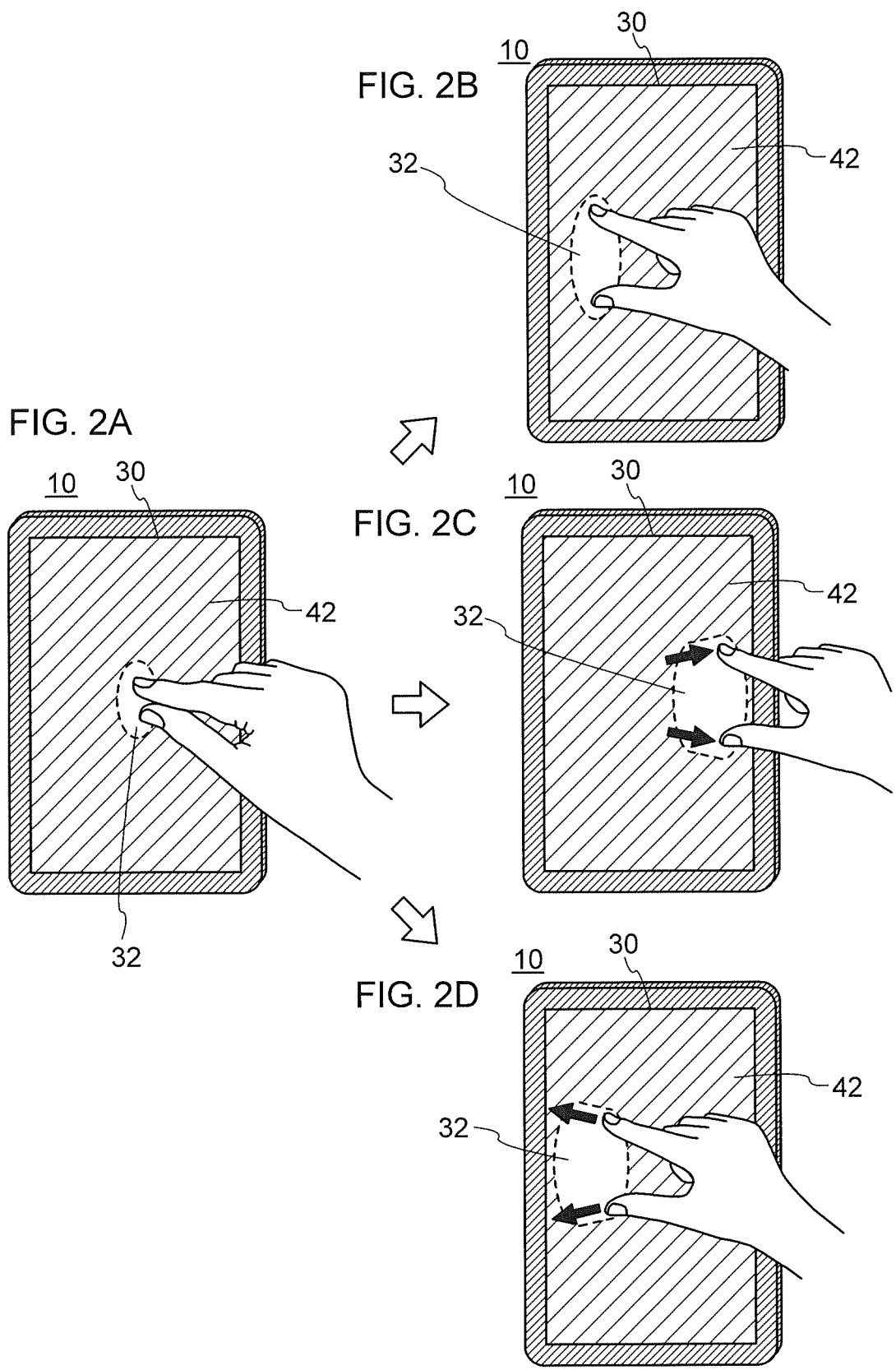
FIGS. 2A to 2D illustrate usage examples of a display device.

FIG. 2A illustrates an example where the user touches the display region 30 of the display device 10 with two fingers. With a touch by the two fingers, a region 32 having an elliptical shape whose foci are the two touched points has an increased luminance.

In the display region 30, the luminance of the region 32 is preferably higher than the luminance of a region obtained by excluding the region 32 from the display region 30 (a region 42). The high luminance of the region 32 results in improvement of the visibility of the vicinity of the touched point. In addition, the luminance of the region 32 is selectively increased, whereby the power consumption can be low as compared with the case where the luminance of the whole display region 30 is increased.

FIG. 2B illustrates an example where the two fingers have slid leftward from the positions illustrated in FIG. 2A and the distance between the two fingers has been increased (the distance between the foci of the ellipse has been increased) while the two fingers touch the touch panel. The region 32 is moved and enlarged in response to the movement of the two fingers.

FIG. 2C illustrates an example where the two fingers have slid rightward from the positions illustrated in FIG. 2A and the distance between the two fingers has been increased while the two fingers touch the touch panel. FIG. 2C is different from FIG. 2B in that the region 32 includes a region opposite to the movement directions of the two fingers (shown by black arrows), i.e., a region lying to the left of the two fingers.

FIG. 2D illustrates an example where the two fingers have slid leftward from the positions illustrated in FIG. 2A and the distance between the two fingers has been increased while the two fingers touch the touch panel. FIG. 2D is different from FIG. 2B in that the region 32 includes a region along the moving direction of the finger (shown by a black arrow) and the vicinity thereof, i.e., a region lying to the left of the two fingers.

The region 32 can be determined by three or more fingers. Such examples are illustrated in FIGS. 35A and 35B and FIGS. 36A and 36B.

FIG. 35A illustrates a case where the user touches the display region 30 of the display device 10 with three fingers. With a touch by the three fingers, the luminance of the region 32 including the three touched points becomes higher than the luminance of the region 42.

FIG. 35B illustrates an example where the distances between the three fingers have been increased from the positions illustrated in FIG. 35A while the three fingers touch the touch panel. The region 32 is enlarged in response to the movement of the three fingers.

Figure 36A:
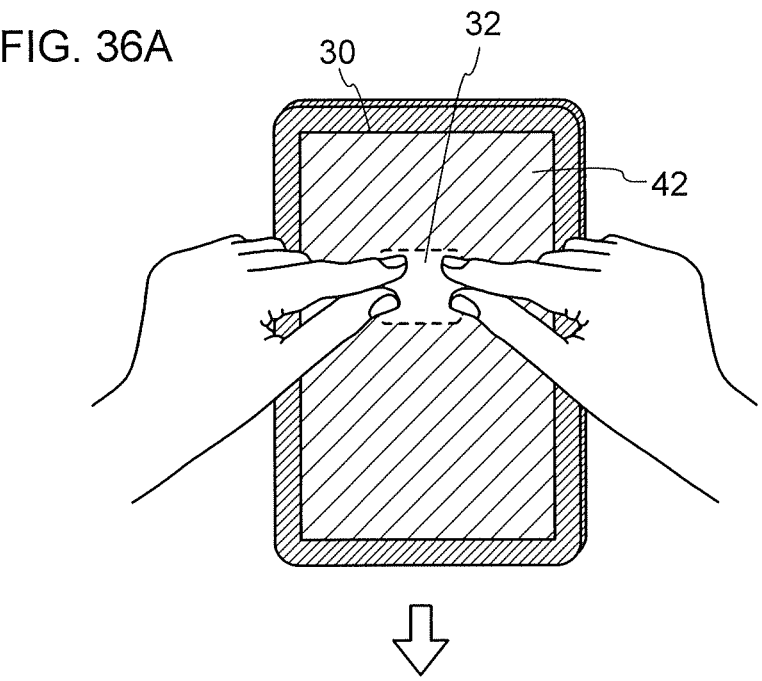
FIGS. 36A and 36B illustrate usage examples of a display device.

FIG. 36A illustrates a case where the user touches the display region 30 of the display device 10 with four fingers. With a touch by the four fingers, the luminance of the region 32 including the four touched points becomes higher than the luminance of the region 42.

Figure 36B:
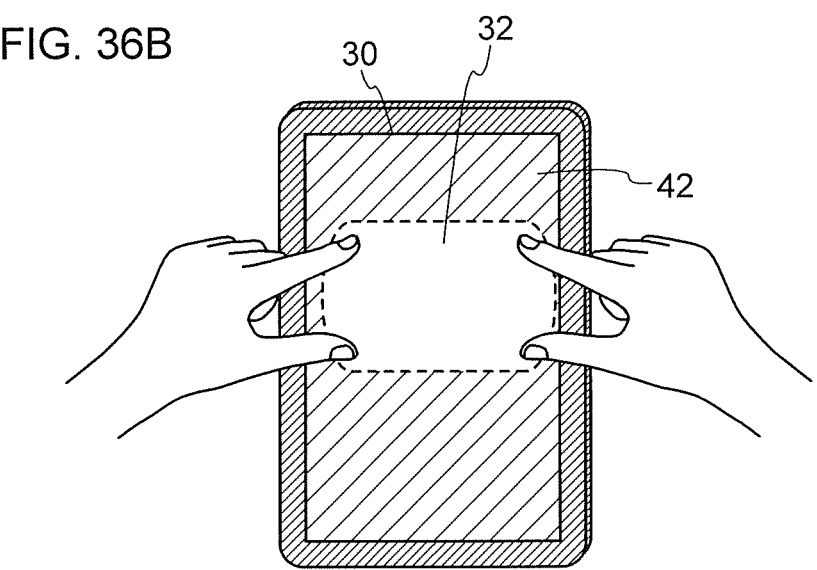

FIG. 36B illustrates an example where the distances between the four fingers have been increased from the positions illustrated in FIG. 36A while the four fingers touch the touch panel. The region 32 is enlarged in response to the movement of the four fingers.

In the above manner, the luminance of an area watched by the user can be increased by the above operations of the display device 10, whereby the visibility can be improved.

<<Block Diagram>>

Figure 3:
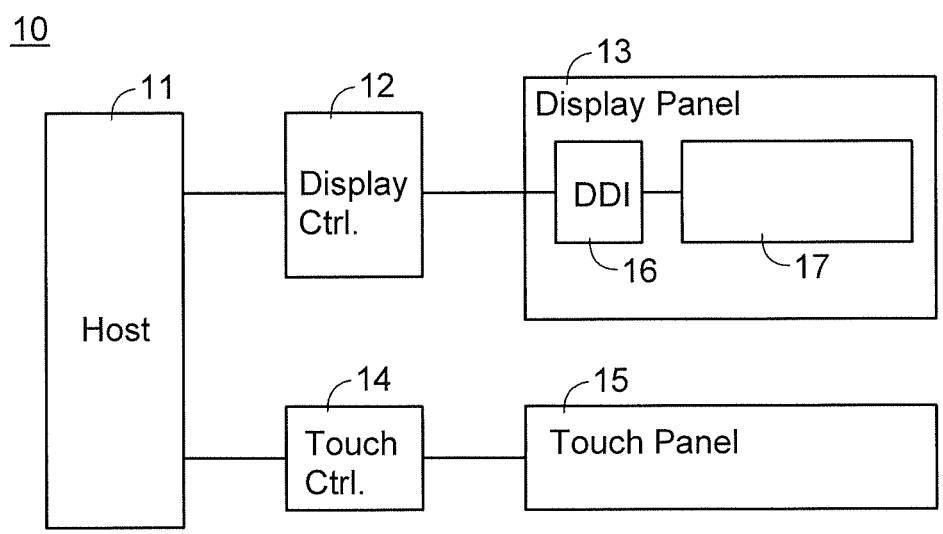
FIG. 3 is a block diagram showing a configuration example of a display device.

FIG. 3 is a block diagram illustrating a configuration example of the display device 10. The display device 10 includes a host 11, a display controller 12, a display panel 13, a touch panel controller 14, and a touch panel 15. The display panel 13 includes a display driver IC (DDI) 16 and a display element 17. The touch panel 15 is provided to overlap with the display panel 13. In other words, there is a region where the touch panel 15 and the display panel 13 overlap with each other.

The host 11 includes a central processing unit (CPU), a memory, and the like. The CPU may include a graphics processing unit (GPU). The memory stores a computer program for controlling the display device 10.

The host 11 has a function of generating an image signal which is to be displayed on the display panel 13. The image signal generated by the host 11 is processed by the display controller 12, so that an image is displayed on the display panel 13. In addition, the host 11 has a function of receiving a touch signal which is input from the touch panel and supplying an image signal to the display panel 13.

The touch panel controller 14 has a function of driving the touch panel 15. Furthermore, the touch panel controller 14 has a function of receiving a touch signal from the touch panel 15 and supplying it to the host 11.

A self-luminous light-emitting element, e.g., an organic EL element, an inorganic EL element, a light emitting diode (LED), a quantum-dot light-emitting diode (QLED), or a semiconductor laser, is preferably used as the display element 17. Note that an organic EL element is used as the display element 17 in the following description.

When the touch panel 15 is touched, the touch panel controller 14 sends an event, coordinates of a position which is touched, and an index to the host 11. The event has identification, e.g., DOWN that represents the start of a touch (a finger touches the touch panel), UP that represents the termination of the touch (the finger leaves the touch panel), and MOVE that represents movement of the finger touching the touch panel. The index represents the number of fingers touching the touch panel.

<<Flow Chart>>

FIG. 4, FIG. 5, FIG. 6, and FIG. 7 are flow charts showing operations of the display device 10. Note that the luminance of the display device 10 is referred to as $A \times L_0$ in some cases in the following description. Here, A is a variable which can be a positive real number of 1 or less, and $L_0$ is a maximum luminance which can be achieved by the display device 10. For example, $L_0$ corresponds to a case where image data of 8-bit gray scale is displayed.

<START>

Figure 4:
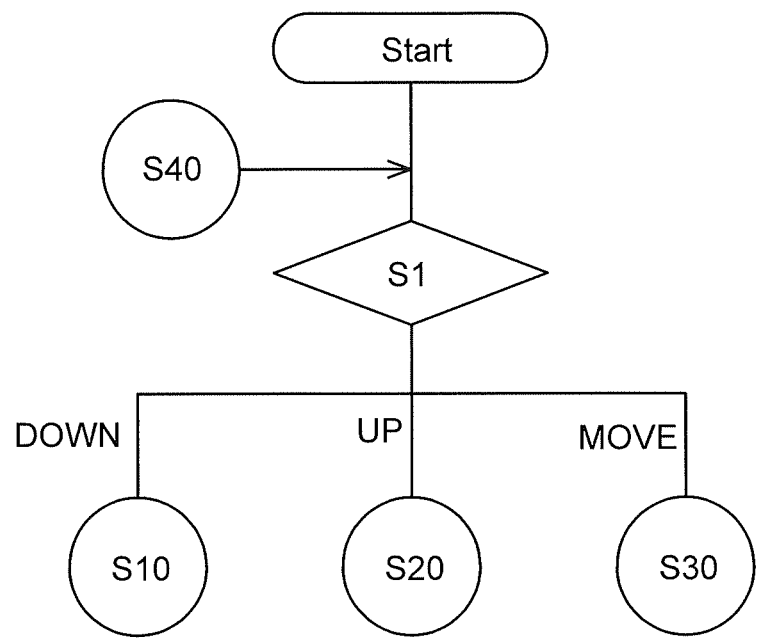
FIG. 4 is a flow chart showing an operation example of a display device.

In FIG. 4, START indicates a state where the display device 10 is not touched, and the luminance of the display region 30 is set to $A_0 \times L_0$ ($A_0$ is a positive real number of less than 1). Note that when the display region 30 includes pixels of three colors, i.e., R (red), G (green), and B (blue), $A_0$ of emitted light may differ among the pixels. Similarly, when the display region 30 includes pixels of four colors, i.e., R, G, B, and W (white), $A_0$ of emitted light may differ among the pixels. Similarly, when the display region 30 includes pixels of four colors, i.e., R, G, B, and Y (yellow), $A_0$ of emitted light may differ among the pixels.

In the case where $A_0$ differs among the pixels of the colors, $A_0$ is preferably set so that the luminance of blue is low. When an organic EL element is used as the display element 17, the power consumption for blue is larger than that for any other color. Therefore, the luminance of blue is set to low in START, whereby the power consumption of the display device 10 can be reduced.

In this specification, the luminance of blue in a certain region refers to the luminance of light which is emitted from some or all of the blue pixels included in the region. For example, in the display device 10 in FIG. 1A, five arbitrary points (points A to E) included in the region 41 are selected, the luminances of the points A to E are measured, and the average of the luminances of blue the five points may be used as the luminance of blue in the region 41. The luminance of blue in the region 31 in FIG. 1A can be measured in a similar manner. Note that the number of the measured points is not limited to five and may be set freely depending on the area of the region. The same can apply to the luminance of another color in a certain region, e.g., the luminance of red in a certain region or the luminance of green in a certain region.

Luminance in this specification includes radiance represented with $[W/(sr \cdot m^2)]$, in addition to luminance represented with $[cd/m^2]$.

Next, the event is determined in S1. The process moves to S10 in the case of DOWN, moves to S20 in the case of UP, or moves to S30 in the case of MOVE.

<DOWN>

Figure 5:
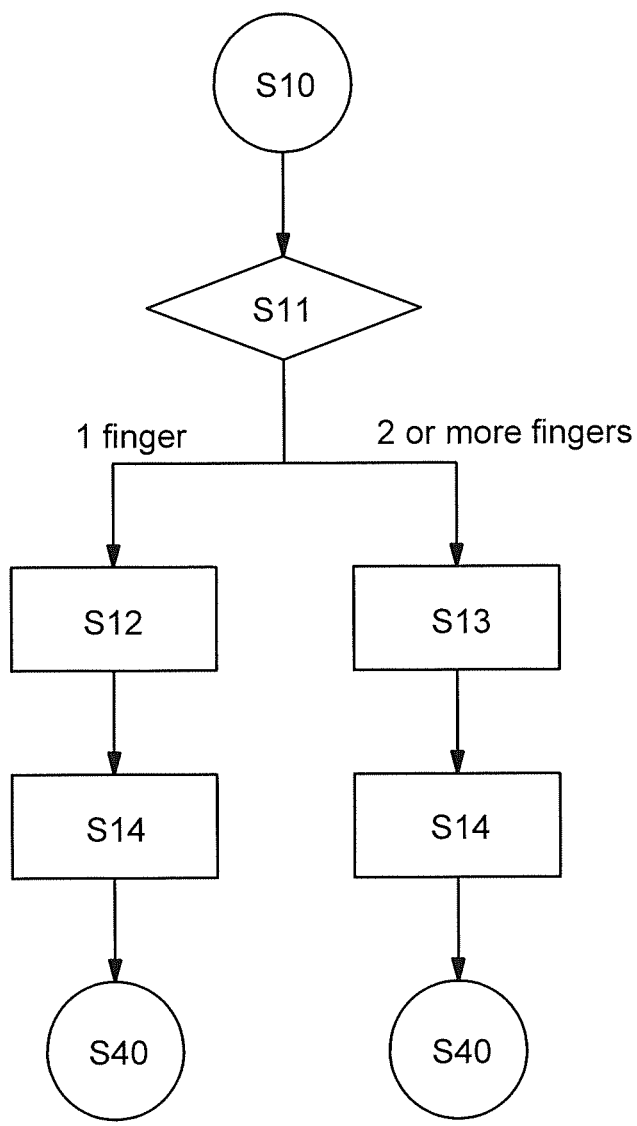
FIG. 5 is a flow chart showing an operation example of a display device.

FIG. 5 is a flow chart showing operations after S10 (operations after detection of DOWN). First, the number of fingers touching the touch panel is determined in S11. The process moves to S12 when the number of fingers is one, or moves to S13 when the number of fingers is two or more.

[Case where the Number of Fingers is One]

Figure 8A:
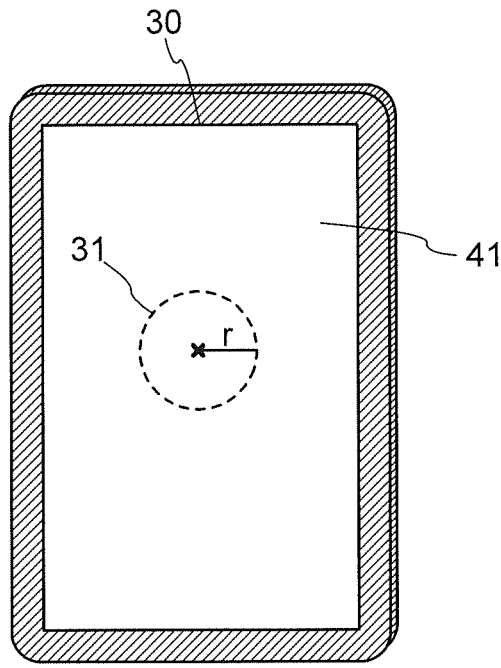
FIGS. 8A to 8C illustrate operations of a display device.

First, an operation in S12 in FIG. 5 is described. In S12, a circuit of radius r whose center corresponds to the point touched by the user is determined as the region 31 (see FIG. 8A). The luminance of the region 31 becomes $L_0$ (A=1), and the luminance of the region 41 is kept at $A_0 \times L_0$. In other words, the region 31 emits bright light.

In particular, the luminance of blue in the region 41 is preferably lower than that in the region 31. Since the user watches the region 31, the region 31 can be regarded as a central visual field, and the region 41 can be regarded as a peripheral visual field. A human being is more sensitive to the brightness of the peripheral visual field than to that of the central visual field, and has particularly high sensitivity with respect to blue. Even when the luminance of blue is very low, a human being can sense brightness in the peripheral field. Therefore, even when the luminance of blue in the region 41 is low, the user can feel the whole display region bright. Moreover, the power consumption of the display device 10 can be reduced.

The radius r may be set by the user. For example, in order that the vicinity of the finger touching the touch panel is made to be bright when an image is displayed, r is preferably greater than or equal to 5 mm.

It is preferable that the luminance gently change in the boundary between the region 31 and the region 41. For example, the A preferably changes in accordance with a sigmoid function in the boundary. Accordingly, the display device 10 can perform display so as to cause less eye strain of the user.

In FIG. 5, the number of fingers and the coordinates of the touched point which are input in S12 are stored in a memory element such as a memory in S14. After that, through S40, the process moves to S1 and an event is determined again.

[Case where the Number of Fingers is Two or More]

Next, an operation in S13 in FIG. 5 is described. Although a case where the number of fingers is two is described below, the same applies to other cases where the number of fingers is more than two.

Figure 10A:
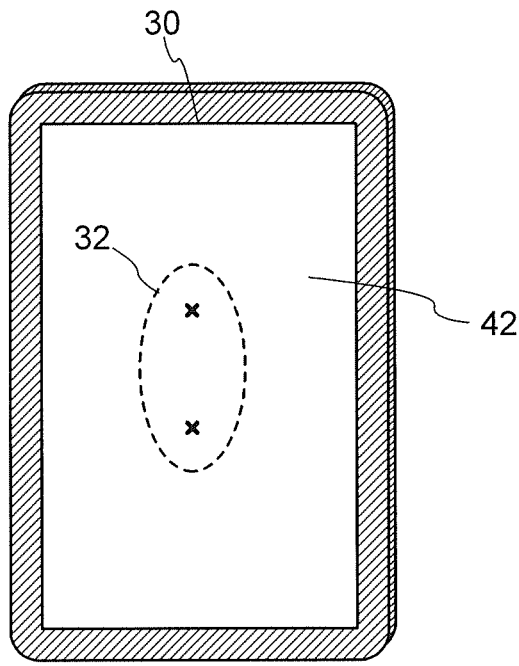
FIGS. 10A to 10C illustrate operations of a display device.

In S13 in FIG. 5, an ellipse whose foci correspond to the points touched by the user is determined as the region 32 (see FIG. 10A). The luminance of the region 32 becomes $L_0$ (A=1), and the luminance of the region 42 is kept at $A_0 \times L_0$. In other words, the region 32 emits bright light. Note that the ratio of the length of the major axis to the length of the minor axis of the ellipse is constant. The ratio may be set by the user.

In particular, the luminance of blue in the region 42 is preferably lower than the luminance of blue in the region 32. In the case where the region 32 and the region 42 are regarded as a central visual field and a peripheral visual field, respectively, even when the luminance of blue in the region 42 is low, the user can feel the whole display region bright. Moreover, the power consumption of the display device 10 can be reduced.

It is preferable that the luminance gently change in the boundary between the region 32 and the region 42. For example, the A preferably changes in accordance with a sigmoid function in the boundary. Accordingly, the display device 10 can perform display so as to cause less eye strain of the user.

Figure 37:
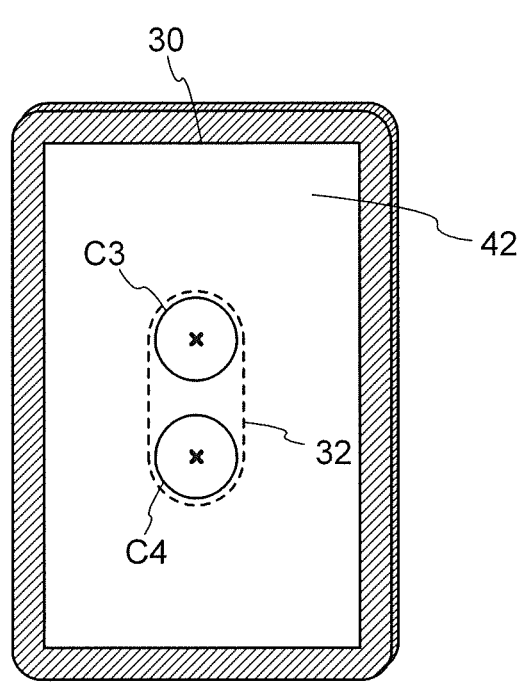
FIG. 37 illustrates an operation of a display device.

Note that the shape of the region 32 is not limited to an ellipse. As illustrated in FIG. 37, the region 32 may be set so as to include a circle C3 of radius r whose center is one of two touched points and a circle C4 of radius r whose center is the other touched point.

Figure 38A:
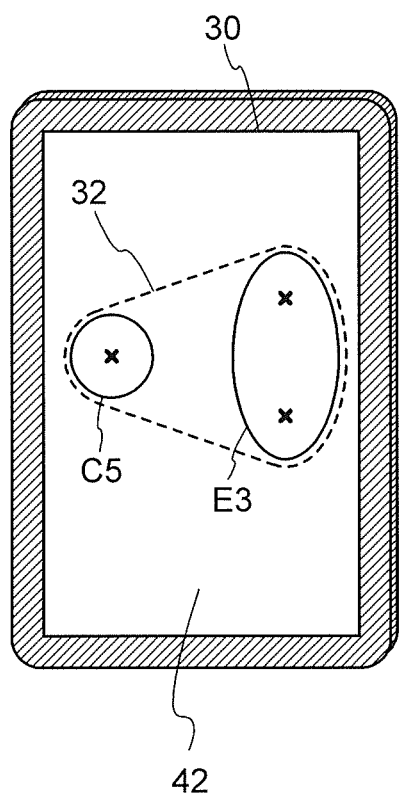
FIGS. 38A and 38B illustrate operations of a display device.
Figure 38B:
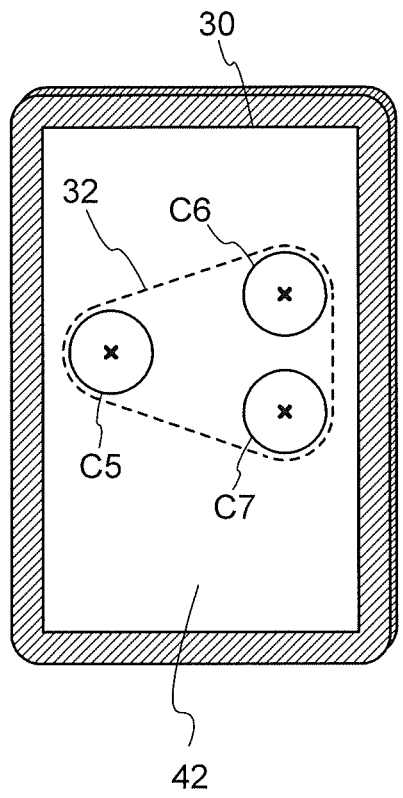

The region 32 can be determined by a touch with three fingers. Examples of such a case are illustrated in FIGS. 38A and 38B. A circuit of radius r whose center is one of three touched points is referred to as a circle C5, and an ellipse whose foci are the other two touched points is referred to as an ellipse E3. The region 32 is determined so as to include the circle C5 and the ellipse E3 (FIG. 38A).

Alternatively, circles of radius r whose centers are the three touched points are referred to as the circle C5, a circle C6, and a circle C7. The region 32 may be determined so as to include the circles C5, C6, and C7 (FIG. 38B).

Figure 39A:
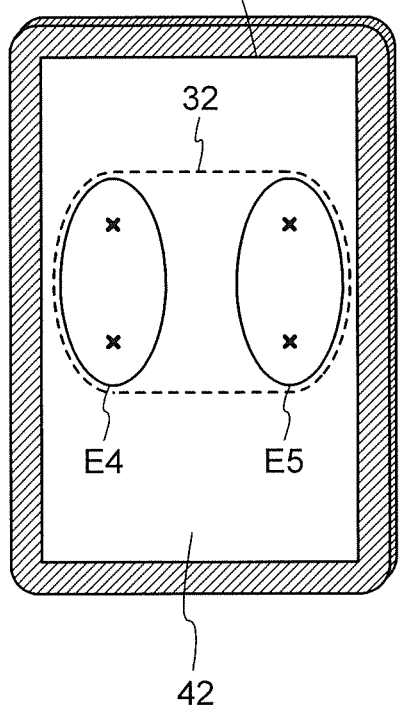
FIGS. 39A to 39C illustrate operations of a display device.
Figure 39B:
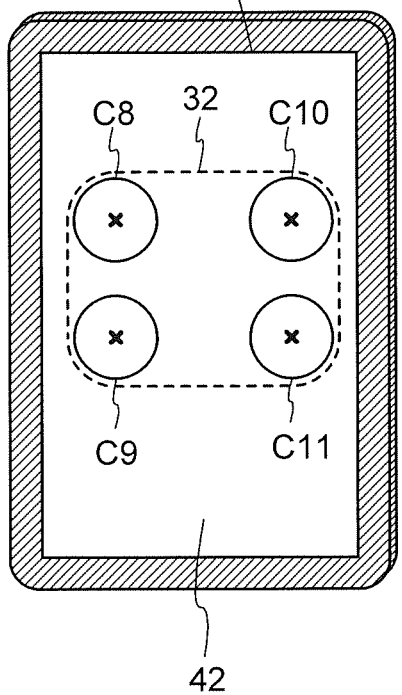
Figure 39C:
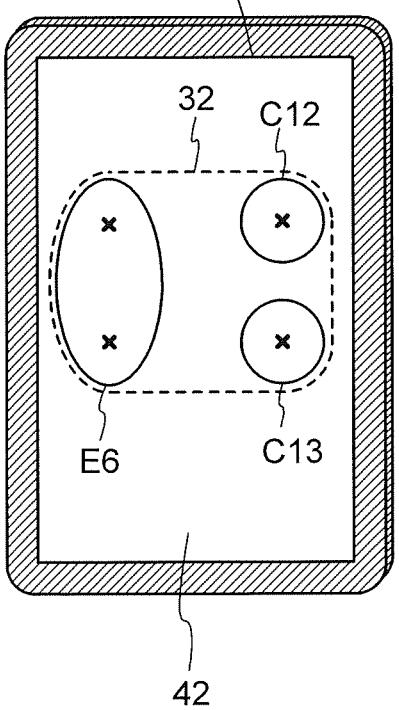

The region 32 can be determined by a touch with four fingers. Examples of such a case are illustrated in FIGS. 39A to 39C. An ellipse whose foci are two of the four touched points is referred to as an ellipse E4, and an ellipse whose foci are the other two touched points is referred to as an ellipse E5. The region 32 is determined so as to include the ellipse E4 and the ellipse E5 (FIG. 39A).

Alternatively, circles of radius r whose centers are the four touched points are referred to as a circle C8, a circle C9, a circle C10, and a circle C11. The region 32 may be determined so as to include the circles C8, C9, C10, and C11 (FIG. 39B).

Alternatively, an ellipse whose foci are two of the four touched points is referred to as an ellipse E6, and circles of radius r whose centers are the other two touched points are referred to as a circle C12 and a circle C13. The region 32 may be determined so as to include the ellipse E6, the circle C12, and the circle C13 (FIG. 39C).

In FIG. 5, the number of fingers and the coordinates of the touched points which are input in S13 are stored in a memory element such as a memory in S14. After that, through S40, the process moves to S1 and an event is determined again.

<UP>

Figure 6:
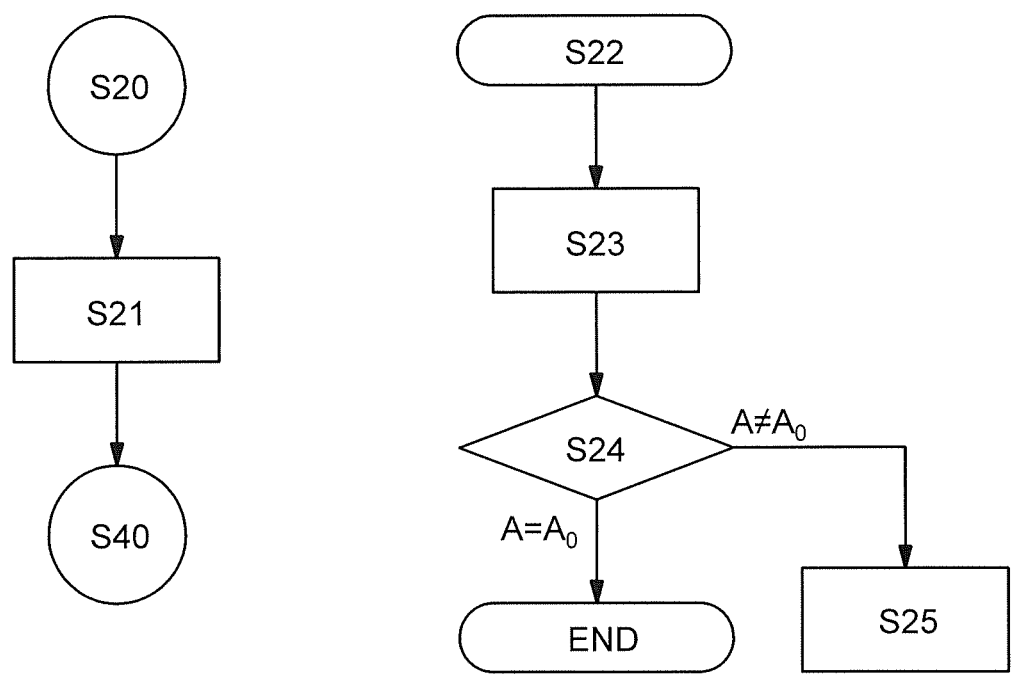
FIG. 6 is a flow chart showing an operation example of a display device.

FIG. 6 is a flow chart showing operations after S20 (operations after detection of UP). First, a timer is set in S21. After a predetermined time, S22 is called. The luminance $A \times L_0$ of the region 31 (FIGS. 1A to 1D) or the region 32 (FIGS. 2A to 2D) is brought close to $A_0 \times L_0$ in S23. Whether A is equal to $A_0$ or not is determined in S24. When they are equal, the process is terminated, whereas when they are not equal, the timer is set again in S25. After a predetermined time, S22 is called again.

When UP is determined in the above manner, after a finger(s) leaves the region, the luminance of the region touched by the finger(s) and the vicinity thereof, i.e., the luminance of the region 31 or the region 32, is gradually reduced to be equal to the luminance of the other region in the display region 30 eventually.

<MOVE>

Figure 7:
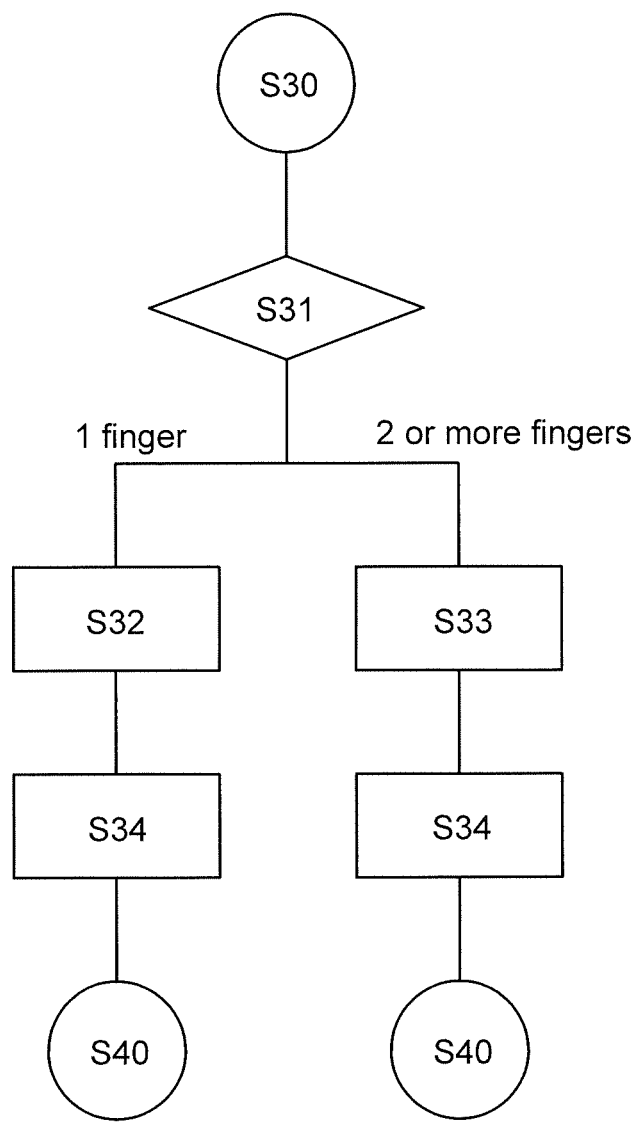
FIG. 7 is a flow chart showing an operation example of a display device.

FIG. 7 is a flow chart showing operations after S30 (operations after detection of MOVE). First, the number of fingers touching the touch panel is determined in S31. The process moves to S32 when the number of fingers is one, or moves to S33 when the number of fingers is two or more.

[When the Number of Fingers is One]

Figure 8B:
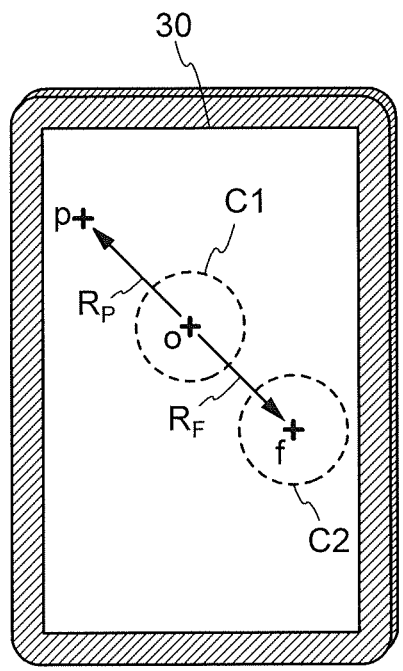

First, an operation in S32 is described. As illustrated in FIG. 8B, a point which is touched by the user is referred to as o, and a point which has been touched by the user prior to o is defined as p. A vector which starts at the point o and ends at the point p is defined as $R_P$. As shown in the following formula (1), a vector obtained by multiplying $R_P$ by k is defined as $R_F$, and a point that is the vector $R_F$ away from the point o is defined to as f. Here, k is a constant of a real number. In addition, a circle of radius r whose center is the point o is defined as C1, and a circle of radius r whose center is the point f is defined as C2.

$$R_F = k \times R_P \tag{1}$$

The circle C1 is moved to the circle C2 along the vector $R_F$ to obtain a region. The region is defined as the region 31 (see FIG. 8C). The region 31 is determined so as to include the circle C1 and the circle C2.

Figure 8C:
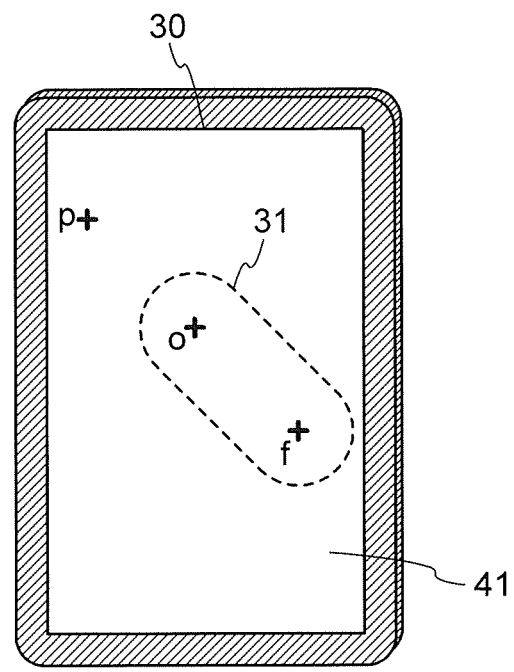

The region 31 in FIG. 8C corresponds to the region 31 in FIGS. 1B to 1D. For example, the constant k in the formula (1) is set to 0, whereby the region 31 illustrated in FIG. 1B can be obtained. For example, the constant k in the formula (1) is set to a positive value, whereby the region 31 illustrated in FIG. 1C can be obtained. For example, the constant k in the formula (1) is set to a negative value, whereby the region 31 illustrated in FIG. 1D can be obtained.

Figure 9:
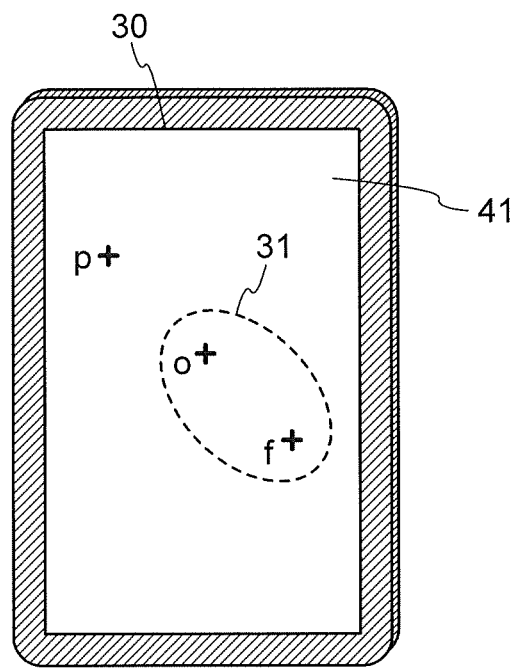
FIG. 9 illustrates an operation of a display device.

Note that the region 31 may be an ellipse whose foci are the point o and the point f, as illustrated in FIG. 9. Also in this case, the region 31 illustrated in any of FIGS. 1B to 1D can be obtained depending on the value of the constant k in the formula (1).

In FIG. 7, the number of fingers and the coordinates of the touched point which are input in S32 are stored in a memory element such as a memory in S34. After that, through S40, the process moves to S1 and an event is determined again.

[Case where the Number of Fingers is Two or More]

Next, an operation in S33 is described. Although a case where the number of fingers is two is described below, the same applies to other cases where the number of fingers is more than two.

Figure 10B:
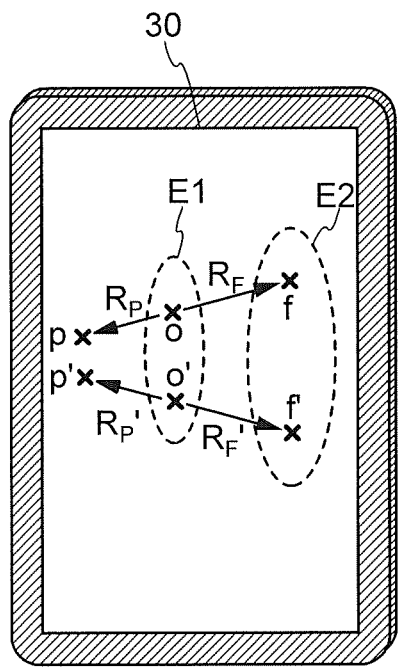

As illustrated in FIG. 10B, two points touched by the user are defined as o and o', and two points that have been touched by the user prior to o and o' are defined as p and p'. A vector which starts at the point o and ends at the point p is defined as $R_P$, and a vector which starts at the point o' and ends at the point p' is defined as $R_P'$. As shown in the formula (1), a vector obtained by multiplying $R_P$ by k is defined as $R_F$, and as shown in the following formula (2), a vector obtained by multiplying $R_P'$ by k is defined as $R_F'$. A point that is the vector $R_F$ away from the point o is defined to as f, and a point that is the vector $R_F'$ away from the point o' is defined to as f'. In the formula (2), k has the same value as k in the formula (1). An ellipse whose foci are the points o and o' is defined as E1, and an ellipse whose foci are the points f and f' is defined as E2.

$$R_F' = k \times R_P' \qquad (2)$$

The ellipse E1 is moved horizontally to reach the ellipse E2 while the focal distance is increased/reduced, whereby a region is obtained. The region is defined as the region 32 (see FIG. 10C). The region 32 is determined so as to include the ellipse E1 and the ellipse E2.

Figure 10C:
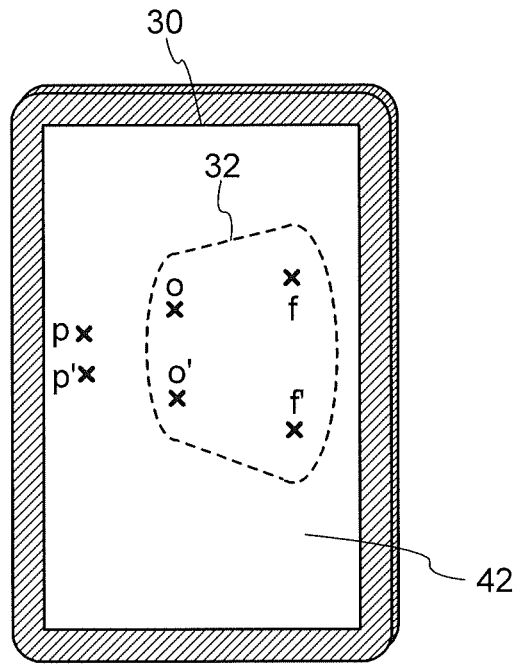

The region 32 in FIG. 10C corresponds to the region 32 in FIGS. 2B to 2D. For example, the constant k in the formulae (1) and (2) is set to 0, whereby the region 32 illustrated in FIG. 2B can be obtained. For example, the constant k in the formulae (1) and (2) is set to a positive value, whereby the region 32 illustrated in FIG. 2C can be obtained. For example, the constant k in the formulae (1) and (2) is set to a negative value, whereby the region 32 illustrated in FIG. 2D can be obtained.

In FIG. 7, the number of fingers and the coordinates of the touched points which are input in S33 are stored in a memory element such as a memory in S34. After that, through S40, the process moves to S1 and an event is determined again.

The above-described flow charts shown in FIG. 4, FIG. 5, FIG. 6, and FIG. 7 are stored as a computer program in the host 11 illustrated in FIG. 3. The host 11 reads and executes the computer program. The flow charts shown in FIG. 4, FIG. 5, FIG. 6, and FIG. 7 may be executed as hardware by the display controller 12.

<<Other Usage Examples>>

Next, other usage examples of the display device 10 are described with reference to FIGS. 11A to 11C and FIGS. 12A and 12B.

FIG. 11B illustrates a case where a finger has slid downward to the right from the position illustrated in FIG. 11A while touching the touch panel. The circular region 31 in FIG. 11A moves together with the slide of the finger. A region in which the circle has transferred is determined as the region 31 as illustrated in FIG. 11B. That is, a region which has been traced by the finger and the vicinity thereof are determined as the region 31 and emits bright light. FIG. 11B is different from FIGS. 1B and 1C in that the region 31 continuously includes a point which has been touched first (FIG. 11A).

The operation illustrated in FIG. 11B can be achieved when k is 0 (see the formula (1)) in S32 in FIG. 7 and the region that has been traced by the concentric circle is stored as the region 31.

FIG. 11C also illustrates a case where the finger has slid downward to the right from the position illustrated in FIG. 11A while touching the touch panel, as in FIG. 11B. A difference from FIG. 11B is that the region 31 includes a region along the moving direction of the finger (shown by a black arrow in the figure) and the vicinity thereof, i.e., a region to the lower right of the finger.

The operation illustrated in FIG. 11C can be achieved when k is a negative value in the operation in FIG. 11B.

Figure 12A:
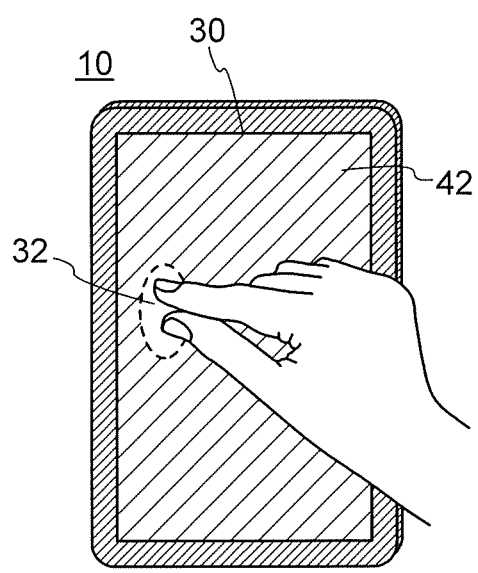
FIGS. 12A and 12B illustrate usage examples of a display device.
Figure 12B:
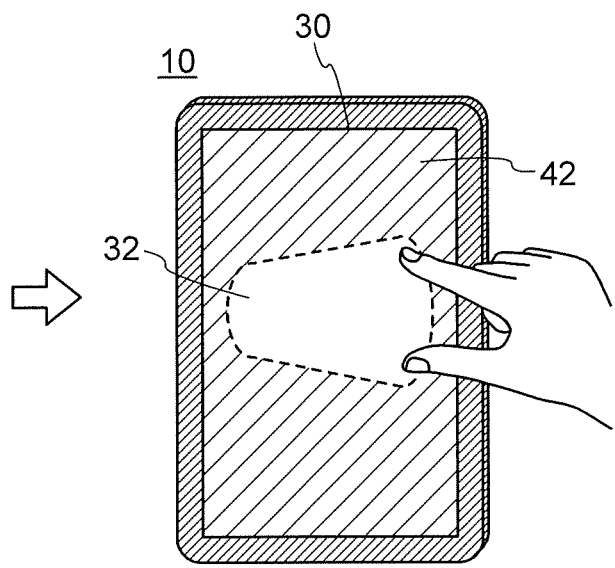

FIG. 12B illustrates an example where two fingers have slid from the positions illustrated in FIG. 12A while touching the touch panel. The elliptical region 32 in FIG. 12A moves together with the slide of the fingers. A region in which the ellipse has transferred is determined as the region 32 as illustrated in FIG. 12B. That is, a region which has been traced by the two fingers and the vicinity thereof are determined as the region 32 and emits bright light. FIG. 12B is different from FIGS. 2B to 2D in that the region 32 continuously includes two points which have been touched first (FIG. 12A).

The operation illustrated in FIG. 12B can be achieved when k is 0 (see the formula (2)) in S33 in FIG. 7 and the region that has been traced by the ellipse is stored as the region 32.

In the above manner, the luminance of an area watched by the user can be increased by the operations of the display device 10 described in this embodiment, whereby the visibility can be improved. In addition, the power consumption can be reduced.

Embodiment 2

In this embodiment, an example where the display device 10 displays text is described. Note that in this specification, text refers to text data displayed on the display device.

FIGS. 13A to 13D illustrate an example where text is displayed on the display region 30. The text consists of a plurality of lines. FIG. 13A illustrates an example where a user touches the text with a finger. A background of the touched line serves as a region 34 to emit bright light.

In the display region 30, the luminance of the background included in the region 34 is preferably higher than the luminance of a background of a region obtained by excluding of the region 34 from the display region 30 (a region 44). For example, in the case where the text and the background are shown in black and white, respectively, increasing the luminance of the background of the region 34 can increase a contrast ratio between the background (white) to the text (black), which can improve visibility of the text. In addition, the luminance of the background of the region 34 is selectively increased, whereby the power consumption can be low as compared with the case where the luminance of the whole background of the display region 30 is increased.

In particular, the luminance of blue in the region 44 is preferably lower than that in the region 34. Since the user watches the region 34, the region 34 can be regarded as a central visual field, and the region 44 can be regarded as a peripheral visual field. Even when the luminance of blue in the region 44 is low, the user can feel the whole display region bright. Moreover, the power consumption of the display device 10 can be reduced.

FIG. 13B illustrates an example where the finger has slid to an upper line from the position illustrated in FIG. 13A while touching the touch panel. The region 34 also moves together with the slide of the finger.

FIG. 13C illustrates an example where the finger has slid to a lower line from the position illustrated in FIG. 13A while touching the touch panel. The region 34 includes not only the touched line but also a line opposite to the moving direction of the finger (shown by a black arrow in the figure), i.e., a line located above the finger.

FIG. 13D illustrates an example where the finger has slid to a upper line from the position illustrated in FIG. 13A while touching the touch panel. The region 34 includes not only the touched line but also a line along the moving direction of the finger (shown by a black arrow in the figure), i.e., a line located above the finger.

FIGS. 14A to 14D illustrate an example where two fingers touch the display device 10. In a manner similar to that in FIGS. 13A to 13D, text is displayed on the display region 30.

FIG. 14A illustrates an example where the user touches the text with two fingers. A background of the touched lines serves as a region 35 to emit bright light.

In the display region 30, the luminance of the background included in the region 35 is preferably higher than the luminance of a background of a region obtained by excluding of the region 35 from the display region 30 (a region 45). For example, in the case where the text and the background are shown in black and white, respectively, increasing the luminance of the background of the region 35 can increase a contrast ratio between the background (white) to the text (black), which can improve visibility of the text. In addition, the luminance of the background of the region 35 is selectively increased, whereby the power consumption can be low as compared with the case where the luminance of the whole background of the display region 30 is increased.

In particular, it is preferable that the luminance of blue in the region 35 be high and that the luminance of blue in the region 45 be low. Since the user watches the region 35, the region 35 can be regarded as a central visual field, and the region 45 can be regarded as a peripheral visual field. Even when the luminance of blue in the region 45 is low, the user can feel the whole display region bright. Moreover, the power consumption of the display device 10 can be reduced.

FIG. 14B illustrates an example where the two fingers have slid to upper lines from the positions illustrated in FIG. 14A while touching the touch panel. The region 35 also moves together with the slide of the fingers.

FIG. 14C illustrates an example where the fingers have slid to lower lines from the positions illustrated in FIG. 14A while touching the touch panel. The region 35 includes not only the lines touched by the two fingers but also a line opposite to the moving direction of the two fingers (shown by a black arrow in the figure), i.e., a line located above the two fingers.

FIG. 14D illustrates an example where the fingers have slid to upper lines from the positions illustrated in FIG. 14A while touching the touch panel. The region 35 includes not only the lines touched by the two fingers but also a line along the moving direction of the two fingers (shown by a black arrow in the figure), i.e., a line located above the two fingers.

A block diagram shown in FIG. 3 is applicable to the configuration of the display device 10 described in this embodiment. The operations illustrated in FIGS. 13A to 13D and FIGS. 14A to 14D can be described according to the flow charts shown in FIG. 4, FIG. 5, FIG. 6, and FIG. 7.

FIGS. 15A to 15C and FIGS. 16A to 16C are schematic views illustrating operations of the display device 10. Note that text displayed on the display region 30 is shown by solid lines in FIGS. 15A to 15C and FIGS. 16A to 16C.

Figure 15A:
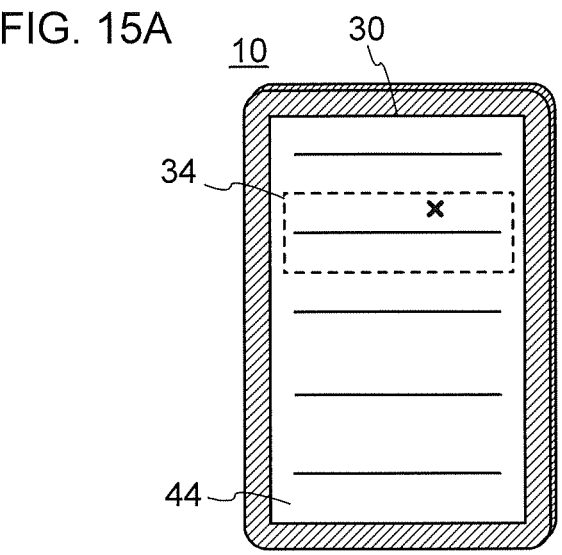
FIGS. 15A to 15C illustrate operations of a display device.

FIG. 15A is a schematic view illustrating S12 in FIG. 5 (DOWN, the number of fingers is one). A line which is the nearest to the point touched by the finger (shown by x in the figure) is included in the region 34.

In a manner similar to that in Embodiment 1, the luminance of the background of the display region 30 is represented as $A \times L_0$ (A is a variable which can be a positive real number of 1 or less, and $L_0$ is a maximum luminance which can be achieved by the display device 10). The luminance of the background of the region 34 is $L_0$ (A=1), and the luminance of the background of the region 44 is $A_0 \times L_0$ ($A_0$ is a positive real number of less than 1). In short, the background of the region 34 emits bright light. Furthermore, it is preferable that the luminance of the background gently change in the boundary between the region 34 and the region 44. For example, the A preferably changes in accordance with a sigmoid function in the boundary. Accordingly, the display device 10 can perform display so as to cause less eye strain of the user.

Figure 16A:
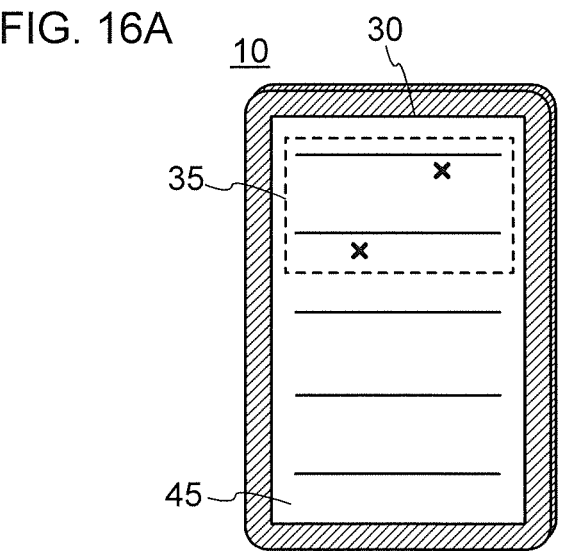
FIGS. 16A to 16C illustrate operations of a display device.

FIG. 16A is a schematic view illustrating S13 in FIG. 5 (DOWN, the number of fingers is two or more). A line which is the nearest to one of two points touched by two fingers (shown by x in the figure) and a line which is the nearest to the other of the two points touched by the two fingers are both included in the region 35.

The luminance of the background of the region 35 is $L_0$ (A=1), and the luminance of the background of the region 45 is $A_0 \times L_0$ ($A_0$ is a positive real number of less than 1). In short, the background of the region 35 emits bright light. Furthermore, it is preferable that the luminance of the background gently change in the boundary between the region 35 and the region 45. For example, the A preferably changes in accordance with a sigmoid function in the boundary. Accordingly, the display device 10 can perform display so as to cause less eye strain of the user.

Figure 15B:
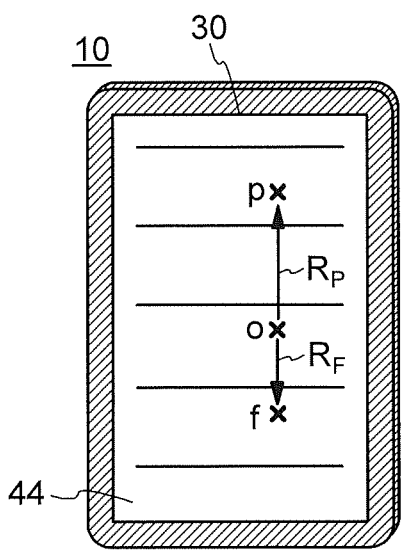

FIG. 15B is a schematic view illustrating S32 in FIG. 7 (MOVE, the number of fingers is one). In a manner similar to that in FIGS. 8A to 8C, a point which is touched by the user is referred to as o, and a point which has been touched by the user prior to o is defined as p. A vector which starts at the point o and ends at the point p is defined as R. As shown in the formula (1) described in Embodiment 1, a vector obtained by multiplying the vector $R_P$ by k is defined as $R_F$, and a point that is the vector $R_F$ away from the point o is defined to as f. Here, k is a constant of a real number.

Figure 15C:
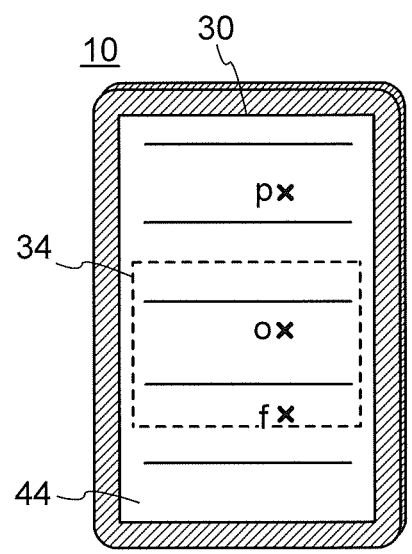

The region 34 is set so as to include a line which is the nearest to the point o and a line which is the nearest to the point f (see FIG. 15C).

The region 34 in FIG. 15C corresponds to the region 34 in FIGS. 13B to 13D. For example, the constant k is set to 0, whereby the region 34 illustrated in FIG. 13B can be obtained. For example, the constant k is set to a positive value, whereby the region 34 illustrated in FIG. 13C can be obtained. For example, the constant k is set to a negative value, whereby the region 34 illustrated in FIG. 13D can be obtained.

Figure 16B:
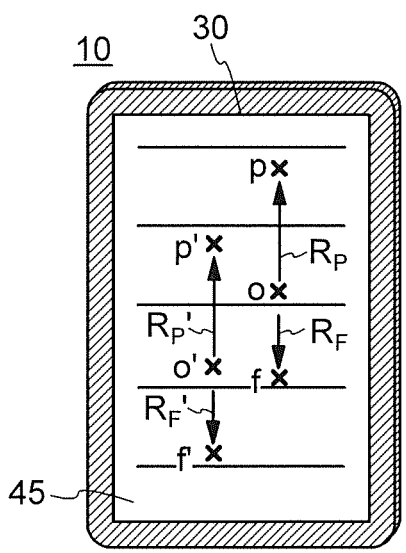

FIG. 16B is a schematic view illustrating S33 in FIG. 7 (MOVE, the number of fingers is two or more). Two points touched by the user are defined as o and o', and two points that have been touched by the user prior to o and o' are defined as p and p'. A vector which starts at the point o and ends at the point p is defined as $R_P$, and a vector which starts at the point o' and ends at the point p' is defined as $R_P$'. As shown in the formula (1) described in Embodiment 1, a vector obtained by multiplying $R_P$ by k is defined as $R_F$, and as shown in the following formula (2) described in Embodiment 1, a vector obtained by multiplying $R_P$' by k is defined as $R_F$'. A point that is the vector $R_F$ away from the point o is defined to as f, and a point that is the vector $R_F$' away from the point o' is defined to as f'.

Figure 16C:
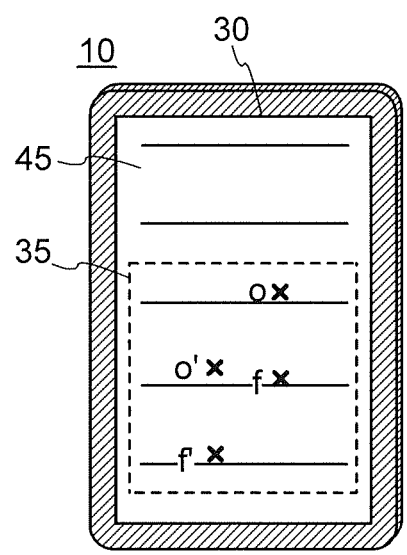

The region 35 is set so as to include a line which is the nearest to the point o, a line which is nearest to the point o', a line which is the nearest to the point f, and a line which is the nearest to the point f' (see FIG. 16C).

The region 35 in FIG. 16C corresponds to the region 35 in FIGS. 14B to 14D. For example, the constant k is set to 0, whereby the region 35 illustrated in FIG. 14B can be obtained. For example, the constant k is set to a positive value, whereby the region 35 illustrated in FIG. 14C can be obtained. For example, the constant k is set to a negative value, whereby the region 35 illustrated in FIG. 14D can be obtained.

Next, another usage example of the display device 10 is described.

Figure 17A:
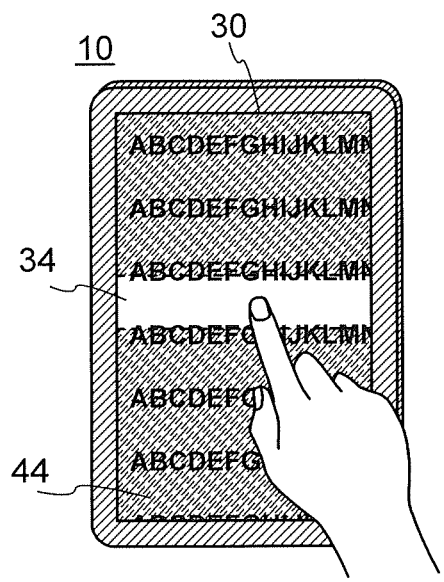
FIGS. 17A to 17C illustrate usage examples of a display device.
Figure 17B:
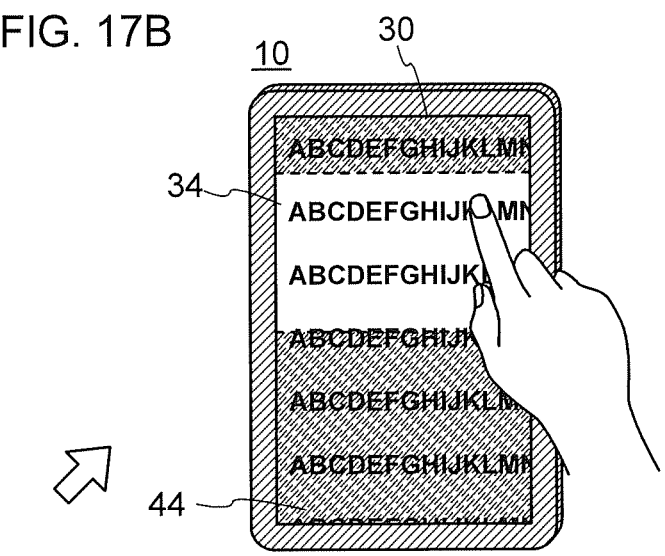

FIG. 17B illustrates an example where a finger has slid to an upper line from the position illustrated in FIG. 17A while touching the touch panel. Lines which have been traced by the finger are set as the region 34, as illustrated in FIG. 17B. FIG. 17B is different from FIGS. 13B to 13D in that the region 34 continuously includes the row which has been touched first (FIG. 17A).

The operation illustrated in FIG. 17B can be achieved when k is 0 (see the formula (1)) in S32 in FIG. 7 and the region that has been traced by the finger is stored as the region 34.

Figure 17C:
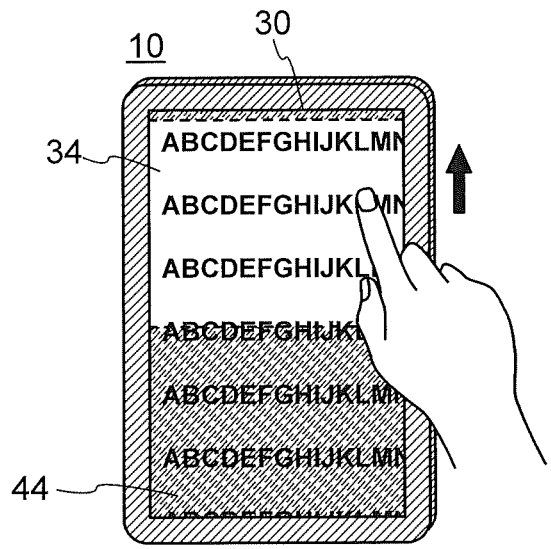

FIG. 17C illustrates an example where the finger has slid to an upper line from the position illustrated in FIG. 17A while touching the touch panel. A difference from FIG. 17B is that the region 34 also includes a line along the moving direction of the finger (shown by a black arrow in the figure), i.e., a line which is located above the finger and is not touched by the finger yet.

The operation illustrated in FIG. 17C can be achieved when k is a negative value in the operation in FIG. 17B.

Figure 18A:
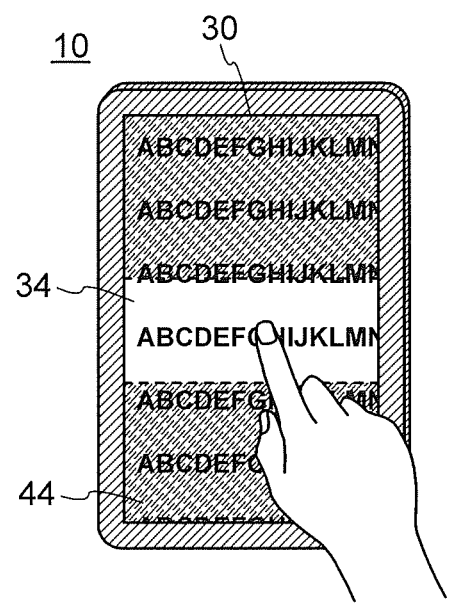
FIG. 18A illustrates a usage example of a display device.
Figure 18B:
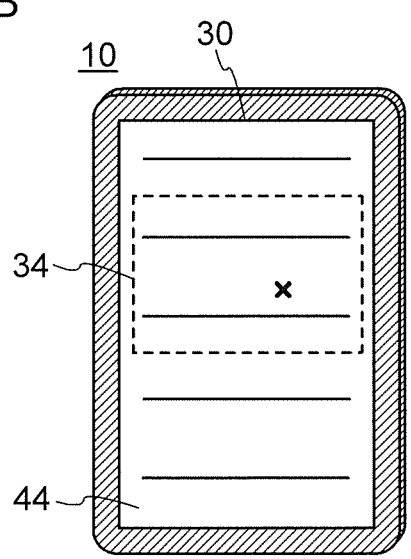
FIG. 18B illustrates an operation of the display device.

FIG. 18A illustrates a case where two lines are included in the region 34 when the finger touches the touch panel. As illustrated in FIG. 18B, a line which is the nearest to a touched point (shown by x in the figure) and a line which is the second nearest to the touched point are included in the region 34.

In the display device 10 described in this embodiment, the luminance of the background of the touched region or the vicinity thereof can be increased as described above, whereby the visibility of text can be improved. Furthermore, the power consumption can be reduced.

Embodiment 3

In this embodiment, a structure example of the display device 10 described in the above embodiment is described.

Figure 19:
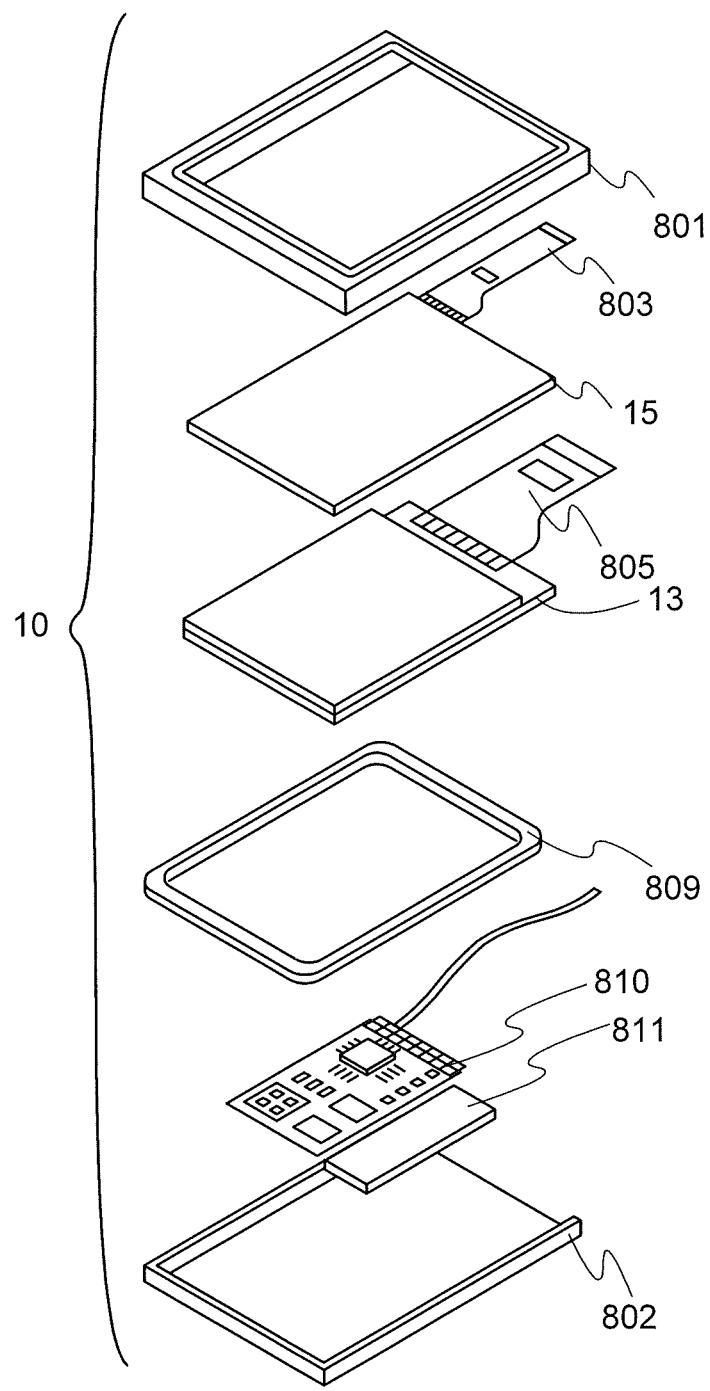
FIG. 19 is an exploded view illustrating a structure example of a display device.

In the display device 10 illustrated in FIG. 19, the touch panel 15 connected to a flexible printed circuit (FPC) 803, the display panel 13 connected to an FPC 805, a frame 809, a printed circuit board 810, and a battery 811 are provided between an upper cover 801 and a lower cover 802.

The host 11, the display controller 12, and the touch panel controller 14 illustrated in FIG. 3 can be provided in the printed circuit board 810.

The shapes and sizes of the upper cover 801 and the lower cover 802 can be changed as appropriate in accordance with the sizes of the touch panel 15 and the display panel 13.

The touch panel 15 can be a resistive touch panel or a capacitive touch panel and can be formed to overlap with the display panel 13. A counter substrate (sealing substrate) of the display panel 13 can have a touch panel function. A photosensor may be provided in each pixel of the display panel 13 so that an optical touch panel is obtained. An electrode for a touch sensor may be provided in each pixel of the display panel 13 so that a capacitive touch panel is obtained. In such cases, the touch panel 15 can be omitted.

The display panel 13 and the touch panel 15 can each be formed using a flexible substrate. For the flexible substrate, for example, metal, an alloy, resin, glass, or fiber thereof can be used. Examples of the resin include polyester, polyolefin, polyamide (e.g., nylon or aramid), polyimide, polycarbonate, acrylic, and polytetrafluoroethylene (PTFE). When the display panel 13 and the touch panel 15 are flexible, the shapes of the upper cover 801, the lower cover 802, and the frame 809 can have curvature.

Next, a specific structure example of the display panel 13 is described with reference to FIGS. 20A and 20B, FIGS. 21A to 21C, FIG. 22, and FIGS. 23A and 23B.

Figure 20A:
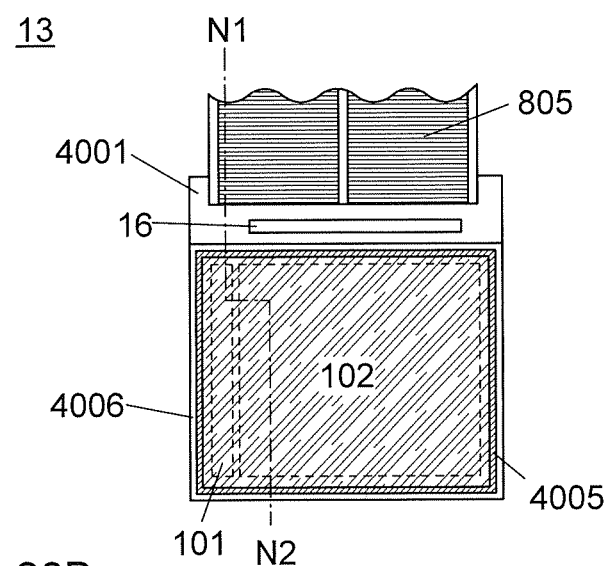
FIGS. 20A and 20B are top views each illustrating a structure example of a display panel.
Figure 20B:
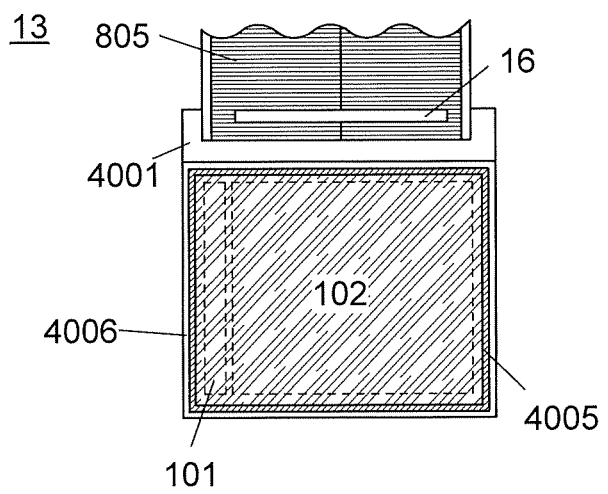

FIGS. 20A and 20B are each a top view illustrating a structure example of the display panel 13.

In each of FIGS. 20A and 20B, a sealant 4005 is provided so as to surround a pixel portion 102 and a scan line driver circuit 101 provided over a first substrate 4001, and the pixel portion 102 and the scan line driver circuit 101 are sealed with a second substrate 4006. The DDI 16 is provided in a region other than the region surrounded by the sealant 4005. Various signals and potentials applied to the DDI 16, the scan line driver circuit 101, and the pixel portion 102 are supplied from the FPC 805.

The DDI 16 is formed with an IC or the like in a process different from that for forming the pixel portion 102. The IC may be formed using, for example, a single crystal semiconductor substrate such as a Si wafer). The connection method of the DDI 16 is not particularly limited; wire bonding, chip on glass (COG), tape carrier package (TCP), chip on film (COF), or the like can be used. FIG. 20A illustrates an example where the DDI 16 is mounted by COG. FIG. 20B illustrates an example where the DDI 16 is mounted by TCP.

When the DDI 16 is formed with the IC, the number of ICs is not limited to one. The DDI 16 may be formed with a plurality of ICs. The DDI 16 including a plurality of ICs can achieve higher definition of the pixel portion 102.

Although FIGS. 20A and 20B both illustrate the example where the scan line driver circuit 101 and the pixel portion 102 are formed in the same process, one embodiment of the present invention is not limited thereto. The scan line driver circuit 101 may be formed with one or a plurality of ICs, similarly to the DDI 16.

Figure 21A:
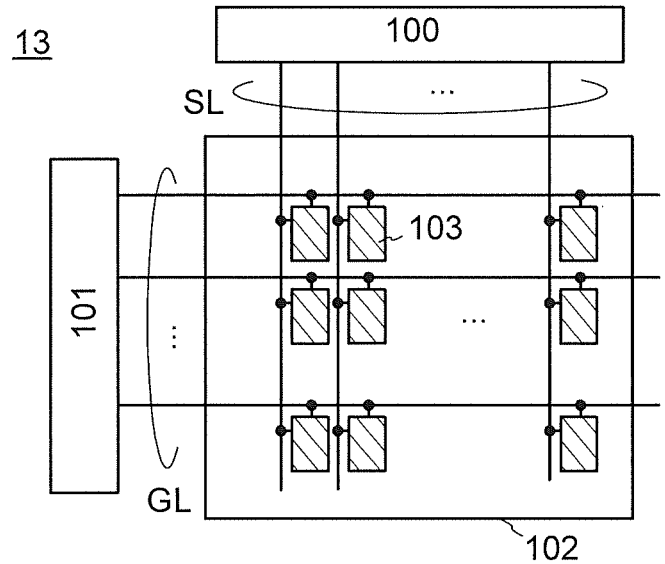
FIG. 21A is a block diagram illustrating a configuration example of a display panel.

FIG. 21A is a circuit block diagram illustrating a configuration example of the display panel 13. The display panel 13 includes the DDI 16, the scan line driver circuit 101, and the pixel portion 102. In the pixel portion 102, pixels 103 are arranged in a matrix.

The DDI 16 has a function of converting input image signals (digital signals) into analog signals and outputting the signals to a plurality of wirings SL. The DDI 16 includes an LVDS receiver (LVDS: low voltage differential signaling), a shift register, a latch circuit, a level shifter, a digital/analog (D/A) converter, and a buffer, for example.

The scan line driver circuit 101 has a function of outputting scan signals to a plurality of wirings GL. The scan line driver circuit 101 includes a shift register and a buffer, for example. The scan line driver circuit 101 receives a gate start pulse, a gate clock signal, and the like and outputs a pulse signal.

In the pixel portion 102, the wirings GL and the wirings SL are provided to intersect at substantially right angles. The pixel 103 is provided at the intersection of the wiring GL and the wiring SL. For color display, the pixels 103 corresponding to the respective colors of red, green, and blue (RGB) are arranged in sequence in the pixel portion 102. Note that the pixels of RGB can be arranged in a stripe pattern, a mosaic pattern, a delta pattern, or the like as appropriate. Without limitation to RGB, white, yellow, or the like may be added to RGB for color display.

Figure 21B:
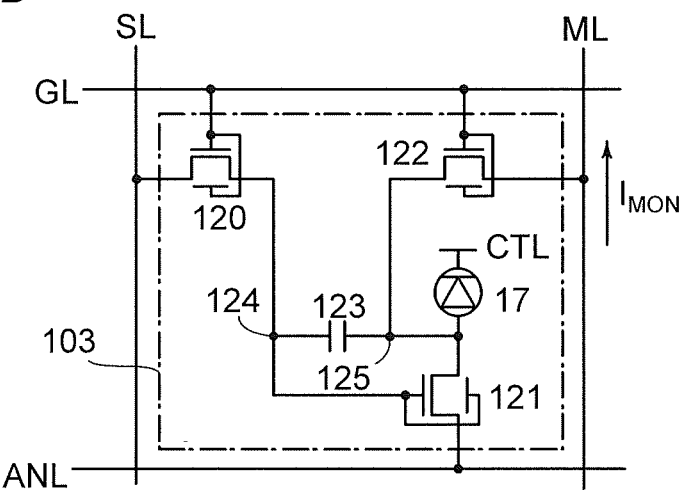
FIG. 21B is a circuit diagram illustrating a configuration example of a pixel.

FIG. 21B is a circuit diagram illustrating a configuration example of the pixel 103. The pixel 103 is electrically connected to the wiring GL, the wiring SL, a wiring ML, a wiring CTL, and a wiring ANL. The pixel 103 includes transistors 120 to 122, a capacitor 123, and the display element 17.

The display element 17 includes a pair of terminals (an anode and a cathode). As the display element 17, an element which can control the luminance with current or voltage can be used. In the following description, an organic EL element is employed as the display element 17.

Although the transistors 120 to 122 are n-channel transistors in FIG. 21B, some or all of the transistors 120 to 122 may be p-channel transistors. The transistors 120 to 122 each include a back gate electrically connected to a gate. With such a device structure, the current drive capability of the transistors 120 to 122 can be improved. Some or all of the transistors 120 to 122 may be transistors without back gates.

The transistor 120 is a pass transistor which connects a gate of the transistor 121 (a node 124) and the wiring SL. The transistor 122 is a pass transistor which connects the wiring ML and an anode of the display element 17. The transistor 121 is a driving transistor and functions as a source of current supplied to the display element 17. In accordance with the amount of drain current of the transistor 121, the luminance of the display element 17 is adjusted. The capacitor 123 is a storage capacitor which stores voltage between a node 125 and the node 124.

Variation in the drive capability of the transistors 121 in the pixels 103 causes variation in the luminance of the display elements 17, which results in decrease in display quality. The pixel 103 in FIG. 21B has a function of correcting variation in the luminance of the display element 17 by monitoring drain currents of the transistor 121.

Figure 21C:
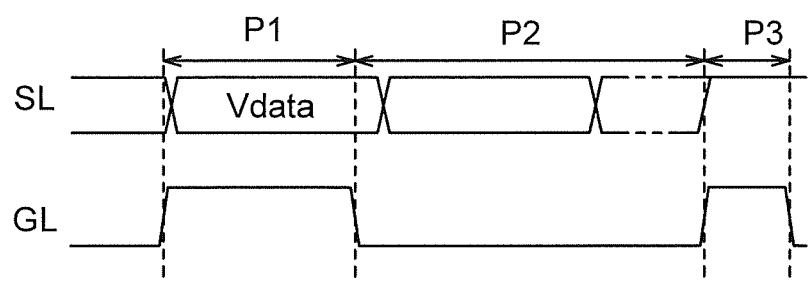
FIG. 21C is a timing chart showing an operation example of the pixel.

FIG. 21C shows an example of a timing chart of a potential of the wiring GL illustrated in FIG. 21B and an image signal supplied to the wiring SL. Note that in the timing chart in FIG. 21C, all the transistors included in the pixel 103 are n-channel transistors.

A period P1 is a writing operation period, and the display element 17 does not emit light during the period. A high-level potential is supplied to the wiring GL, and the transistors 120 and 122 are turned on. A potential Vdata is supplied as an image signal to the wiring SL. The potential Vdata is supplied to the node 124 through the transistor 120.

It is preferable that, in the period P1, the potential of the wiring ML be lower than the sum of the potential of the wiring CTL and the threshold voltage Vthe of the display element 17, and that the potential of the wiring ANL be higher than the potential of the wiring ML. With the above configuration, the drain current of the transistor 121 can be made to flow preferentially through the wiring ML instead of the display element 17.

A period P2 is a light emission period, and the display element 17 emits light during the period. A low-level potential is supplied to the wiring GL, and the transistors 120 and 122 are turned off. When the transistor 120 is turned off, the potential Vdata is held at the node 124. A potential Vano is supplied to the wiring ANL, and a potential Vcat is supplied to the wiring CTL. The potential Vano is preferably higher than the sum of the potential Vcat and the threshold voltage Vthe of the display element 17. The potential difference between the wiring ANL and the wiring CTL allows the drain current of the transistor 121 to flow into the display element 17; thus, the display element 17 emits light.

A period P3 is a monitor period in which the drain current of the transistor 121 is obtained. A high-level potential is supplied to the wiring GL, and the transistors 120 and 122 are turned on. Such a potential that the gate voltage of the transistor 121 is higher than the threshold voltage Vth thereof is supplied to the wiring SL. It is preferable that the potential of the wiring ML be lower than the sum of the potential of the wiring CTL and the threshold voltage Vthe of the display element 17, and that the potential of the wiring ANL be higher than the potential of the wiring ML. With the above configuration, the drain current of the transistor 121 can be made to flow preferentially through the wiring ML instead of the display element 17.

A current $I_{MON}$ which is output from the pixel 103 to the wiring ML in the period P3 corresponds to the drain current flowing into the transistor 121 during the light emission period. The current $I_{MON}$ is supplied to a monitor circuit. The monitor circuit analyzes the current $I_{MON}$ and generates a correction signal on the basis of the analysis result. Through the operation, deviation of the luminance of the pixels 103 can be corrected.

Figure 22:
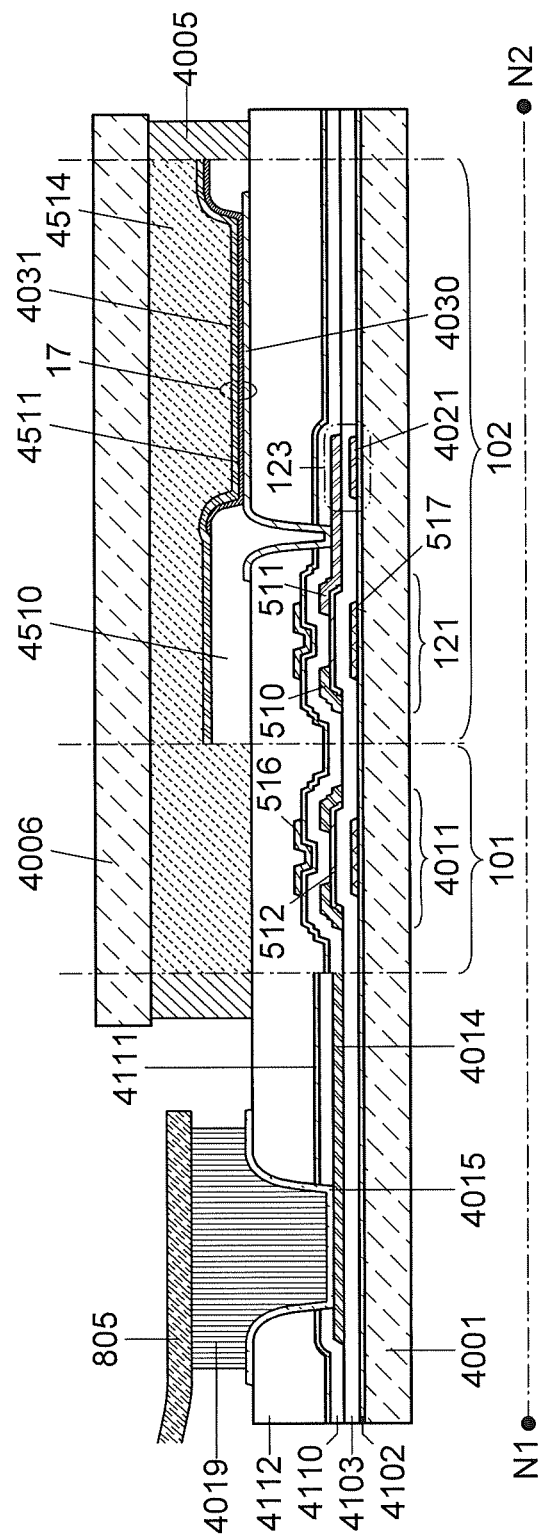
FIG. 22 is a cross-sectional view illustrating a structure example of a display panel.

FIG. 22 is a cross-sectional view illustrating a cross-sectional structure of a portion along a chain line N1-N2 in FIG. 20A.

The display panel 13 in FIG. 22 includes an electrode 4015, and the electrode 4015 is electrically connected to a terminal included of the FPC 805 through an anisotropic conductive layer 4019. The electrode 4015 is electrically connected to a wiring 4014 in an opening formed in insulating layers 4112, 4111, and 4110. The electrode 4015 is formed of the same conductive layer as a first electrode layer 4030.

The pixel portion 102 and the scan line driver circuit 101 provided over the first substrate 4001 each include a plurality of transistors. In FIG. 22, the transistor 121 included in the pixel portion 102 and a transistor 4011 included in the scan line driver circuit 101 are illustrated. The insulating layer 4112 is provided over the transistor 121 and the transistor 4011, and a partition wall 4510 is formed over the insulating layer 4112.

The transistors 121 and 4011 are provided over an insulating layer 4102. The transistors 121 and 4011 include electrodes 517 over the insulating layer 4102. An insulating layer 4103 is formed over the electrodes 517. Semiconductor layers 512 are formed over the insulating layer 4103. Electrodes 510 and electrodes 511 are formed over the semiconductor layers 512. The insulating layer 4110 and the insulating layer 4111 are formed over the electrodes 510 and the electrodes 511. Electrodes 516 are formed over the insulating layer 4110 and the insulating layer 4111. The electrodes 510 and the electrodes 511 are formed of the same conductive layer as the wiring 4014.

In each of the transistors 121 and 4011, the electrode 517 functions as a gate electrode, the electrode 510 functions as one of a source electrode and a drain electrode, the electrode 511 functions as the other of the source electrode and the drain electrode, and the electrode 516 functions as a back gate electrode.

Since the transistors 121 and 4011 each have a bottom gate structure and include a back gate, the on-state current of the transistors can be increased. Moreover, the threshold voltage of the transistors can be controlled.

In each of the transistors 121 and 4011, the semiconductor layer 512 functions as a channel formation region. For the semiconductor layer 512, crystalline silicon, polycrystalline silicon, amorphous silicon, metal oxide, an organic semiconductor, or the like may be used. Impurities may be introduced to the semiconductor layer 512, if necessary, to increase conductivity of the semiconductor layer 512 or control the threshold voltage of the transistor.

In the case where metal oxide is used as the semiconductor layers 512, the metal oxide preferably includes at least one of indium (In) and zinc (Zn). Typical examples of such oxide include In-M-Zn oxide, In-M oxide, Zn-M oxide, and In—Zn oxide (the element M is aluminum (Al), gallium (Ga), yttrium (Y), tin (Sn), boron (B), silicon (Si), titanium (Ti), iron (Fe), nickel (Ni), germanium (Ge), zirconium (Zr), molybdenum (Mo), lanthanum (La), cerium (Ce), neodymium (Nd), vanadium (V), beryllium (Be), hafnium (Hf), tantalum (Ta), or tungsten (W), for example).

The off-state current of the transistor 121 can be reduced when the metal oxide is used as the semiconductor layer 512. Accordingly, an electrical signal such as an image signal can be held for a longer period, and a writing interval can be set longer in an on state. Thus, the frequency of refresh operation can be reduced, which leads to an effect of suppressing power consumption.

In FIG. 22, the capacitor 123 has a region where the electrode 511 and an electrode 4021 overlap each other with the insulating layer 4103 positioned therebetween. The electrode 4021 is formed of the same conductive layer as the electrodes 517.

In FIG. 22, an organic EL element is used as the display element 17. The display element 17 is electrically connected to the transistor 121 provided in the pixel portion 102. The structure of the display element 17 is a stacked-layer structure including the first electrode layer 4030, a light-emitting layer 4511, and a second electrode layer 4031; however, one embodiment is not limited to this structure. The structure of the display element 17 can be changed as appropriate depending on the direction in which light is extracted from the display element 17, or the like.

the partition wall 4510 can be formed using an organic insulating material or an inorganic insulating material. It is particularly preferable that the partition wall 4510 be formed using a photosensitive resin material to have an opening over the first electrode layer 4030 so that a side surface of the opening slopes with continuous curvature.

The light-emitting layer 4511 may be formed using a single layer or a plurality of layers stacked.

A protective layer may be formed over the second electrode layer 4031 and the partition wall 4510 in order to prevent entry of oxygen, hydrogen, moisture, carbon dioxide, or the like into the display element 17. For the protective layer, silicon nitride, silicon nitride oxide, aluminum oxide, aluminum nitride, aluminum oxynitride, aluminum nitride oxide, diamond like carbon (DLC), or the like can be used. In addition, in a space which is formed with the first substrate 4001, the second substrate 4006, and the sealant 4005, a filler 4514 is provided for sealing. It is preferable that, in this manner, the display element be packaged (sealed) with a protective film (such as a laminate film or an ultraviolet curable resin film) or a cover member with high air-tightness and little degasification so that the display element is not exposed to the outside air.

As the filler 4514, an ultraviolet curable resin or a thermosetting resin can be used as well as an inert gas such as nitrogen or argon; for example, polyvinyl chloride (PVC), an acrylic resin, polyimide, an epoxy resin, a silicone resin, polyvinyl butyral (PVB), ethylene vinyl acetate (EVA), or the like can be used. A drying agent may be contained in the filler 4514.

For example, a glass material such as a glass frit, or a resin that is curable at room temperature such as a two-component-mixture-type resin, a light curable resin, a thermosetting resin, and the like can be used for the sealant 4005. A drying agent may be contained in the sealant 4005.

If needed, an optical film, such as a polarizing plate, a circularly polarizing plate (including an elliptically polarizing plate), a retardation plate (a quarter-wave plate or a half-wave plate), or a color filter, may be provided as appropriate on a light-emitting surface. Further, the polarizing plate or the circularly polarizing plate may be provided with an anti-reflection film. For example, anti-glare treatment by which reflected light can be diffused by projections and depressions on a surface so as to reduce the glare can be performed.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

The first electrode layer 4030 and the second electrode layer 4031 each can also be formed using one or more kinds selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also referred to as conductive polymer) can be used for the first electrode layer 4030 and the second electrode layer 4031. The conductive macromolecule may be a so-called π-electron conjugated conductive macromolecule. For example, polyaniline or a derivative thereof, polypyrrole or a derivative thereof, polythiophene or a derivative thereof, a copolymer of two or more of aniline, pyrrole, and thiophene or a derivative thereof can be given.

In order to extract light of the display element 17 to the outside, at least one of the first electrode layer 4030 and the second electrode layer 4031 is transparent. In accordance with how to extract light, the structures of the display panels are classified into a top emission structure, a bottom emission structure, and a dual emission structure. In the top emission structure, light is extracted through a surface (top surface) opposite to a substrate where a transistor and a light-emitting element are formed. In the bottom emission structure, light is extracted through a surface (bottom surface) of a substrate where a transistor and a light-emitting element are formed. In the dual emission structure, light is extracted through a top surface and a bottom surface. For example, the second electrode layer 4031 is transparent in the case of the top emission structure. The first electrode layer 4030 is transparent in the case of the bottom emission structure. The first and second electrode layers 4030 and 4031 are transparent in the case of the dual emission structure.

FIG. 23A is a cross-sectional view in which top-gate transistors are used as the transistors 121 and 4011 in FIG. 22. In each of the transistors 121 and 4011 in FIG. 23A, the electrode 517 functions as a gate electrode, the electrode 510 functions as one of a source electrode and a drain electrode, and the electrode 511 functions as the other of the source electrode and the drain electrode. The description of FIG. 22 can be referred to for details of other components in FIG. 23A.

FIG. 23B is a cross-sectional view in which the transistors 4011 and 121 in FIG. 23A each include the electrode 516 functioning as a back gate. Since the transistors 121 and 4011 each have a top gate structure and include a back gate, the on-state current of the transistors can be increased. Moreover, the threshold voltage of the transistors can be controlled. The description of FIG. 22 can be referred to for details of other components in FIG. 23B.

Embodiment 4

In this embodiment, a mode of the display device 10 which is different from that described in the above embodiment is described.
<<Block Diagram>>

Figure 24:
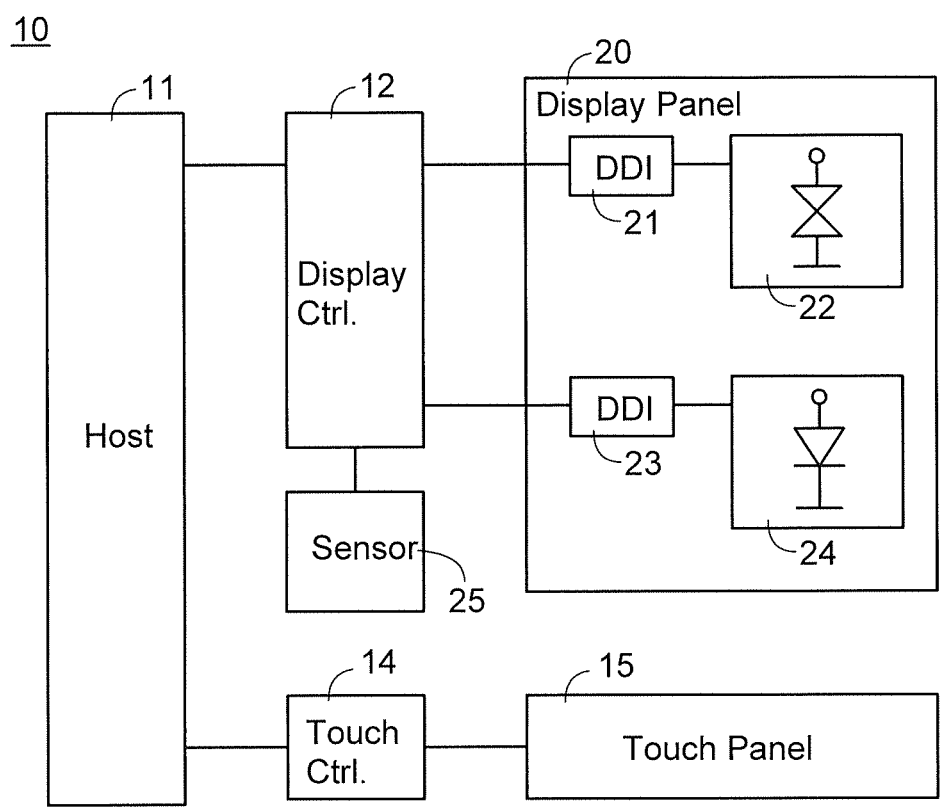
FIG. 24 is a block diagram illustrating a configuration example of a display device.

FIG. 24 is a block diagram illustrating a configuration example of the display device 10. The display device 10 includes the host 11, the display controller 12, a display panel 20, the touch panel controller 14, the touch panel 15, and a photosensor 25. The display panel 20 includes a DDI 21, a reflective element 22, a DDI 23, and a light-emitting element 24.

The reflective element 22 is a reflective display element which displays an image by utilizing reflection of external light. For example, a liquid crystal element, a shutter-type micro electro mechanical systems (MEMS) element, an optical-interference-type MEMS element, or a display element employing a microcapsule method, an electrophoretic method, an electrowetting method, an Electronic Liquid Powder (registered trademark) method, or the like can be used. The power consumption of the display panel 20 can be reduced when the reflective element 22 is used. Note that an example where a reflective liquid crystal element is used as the reflective element 22 is described below.

As the light-emitting element 24, a self-luminous light-emitting element such as an organic EL element, an inorganic EL element, an LED, a QLED, or a semiconductor laser can be used. Note that an example where an organic EL element is used as the light-emitting element 24 is described below.

The display panel 20 has three display modes: a mode in which an image is display only by the reflective element 22 (a reflective mode), a mode in which an image is displayed only by the light-emitting element 24 (a light-emitting mode), and a mode in which an image is displayed by a combination of the reflective element 22 and the light-emitting element 24 (a hybrid mode).

The display panel 20 can switch the display mode depending on the intensity of light received by the photosensor 25. For example, when the display device 10 is used in an outdoor environment in a sunny day, an image is displayed in the reflective mode. At this time, light emission of the light-emitting element 24 can be stopped, which can lead to power saving of the display device 10. When the display device 10 is used during night or in a dark environment, an image can be displayed in the light-emitting mode.

Different display regions in the display panel 20 can employ different display modes. For example, when display is performed, the region 31 in FIGS. 1A to 1D or FIGS. 11A to 11C can employ the light-emitting mode, whereas the region 41 in FIGS. 1A to 1D or FIGS. 11A to 11C can employ the reflective mode. For example, when an image is displayed, the region 31 in FIGS. 1A to 1D or FIGS. 11A to 11C can employ the hybrid mode, whereas the region 41 in FIGS. 1A to 1D or FIGS. 11A to 11C can employ the reflective mode.

For example, when display is performed, the region 32 in FIGS. 2A to 2D or FIGS. 12A and 12B can employ the light-emitting mode, whereas the region 42 in FIGS. 2A to 2D or FIGS. 12A and 12B can employ the reflective mode. For example, when display is performed, the region 32 in FIGS. 2A to 2D or FIGS. 12A and 12B can employ the hybrid mode, whereas the region 42 in FIGS. 2A to 2D or FIGS. 12A and 12B can employ the reflective mode.

For example, when display is performed, the region 34 in FIGS. 13A to 13D, FIGS. 17A to 17C, or FIGS. 18A and 18B can employ the light-emitting mode, whereas the region 44 in FIGS. 13A to 13D, FIGS. 17A to 17C, or FIGS. 18A and 18B can employ the reflective mode. For example, when display is performed, the region 34 in FIGS. 13A to 13D, FIGS. 17A to 17C, or FIGS. 18A and 18B can employ the hybrid mode, whereas the region 44 in FIGS. 13A to 13D, FIGS. 17A to 17C, or FIGS. 18A and 18B can employ the reflective mode.

For example, when display is performed, the region 35 in FIGS. 14A to 14D can employ the light-emitting mode, whereas the region 45 in FIGS. 14A to 14D can employ the reflective mode. For example, when display is performed, the region 35 in FIGS. 14A to 14D can employ the hybrid mode, whereas the region 45 in FIGS. 14A to 14D can employ the reflective mode.

Different display regions in the display panel 20 employ different display modes as described above, whereby the visibility of a certain display region can be improved. Moreover, the power consumption of the display device 10 can be reduced.
<<Structure Examples of Display Panel>>

Next, structure examples of the display panel 20 illustrated in FIG. 24 are described with reference to FIGS. 25A to 25C.

Figure 25A:
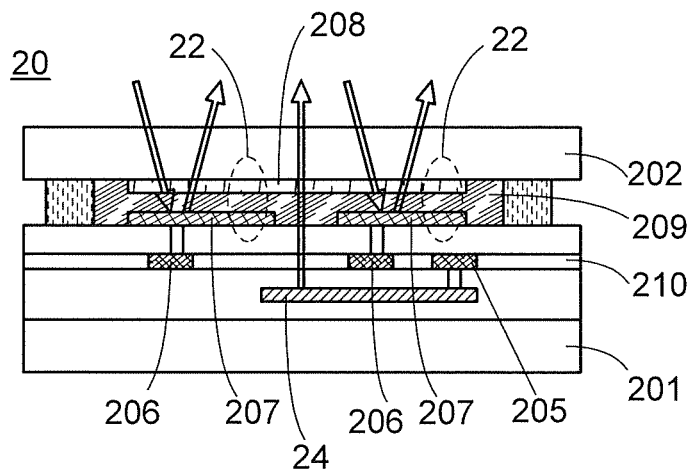
FIGS. 25A to 25C are schematic cross-sectional views each illustrating a structure example of a display panel.

FIG. 25A illustrates an example of a cross-sectional structure of the display panel 20. The display panel 20 illustrated in FIG. 25A includes the light-emitting element 24, the reflective element 22, a transistor 205 having a function of controlling supply of a current to the light-emitting element 24, and a transistor 206 having a function of controlling supply of a voltage to the reflective element 22. The light-emitting element 24, the reflective element 22, the transistor 205, and the transistor 206 are positioned between a substrate 201 and a substrate 202.

The reflective element 22 in the display panel 20 includes a pixel electrode 207, a common electrode 208, and a liquid crystal layer 209. The pixel electrode 207 is electrically connected to the transistor 206. The alignment of the liquid crystal layer 209 is controlled with a voltage applied between the pixel electrode 207 and the common electrode 208. Note that FIG. 25A illustrates an example where the pixel electrode 207 has a function of reflecting visible light and the common electrode 208 has a function of transmitting visible light. Light entering through the substrate 202 is reflected by the pixel electrode 207 and exits through the substrate 202 again, as shown by white arrows.

The light-emitting element 24 is electrically connected to the transistor 205. The light-emitting element 24 emits light toward the substrate 202 side. Since FIG. 25A illustrates the example where the pixel electrode 207 has a function of reflecting visible light and the common electrode 208 has a function of transmitting visible light, light emitted from the light-emitting element 24 passes through a region which does not overlap the pixel electrode 207, passes through a region where the common electrode 208 is provided, and then exits through the substrate 202, as shown by a white arrow.

Furthermore, in the display panel 20 illustrated in FIG. 25A, the transistor 205 and the transistor 206 are both included in the same layer, a layer 210. The layer 210 including the transistor 205 and the transistor 206 includes a region positioned between the reflective element 22 and the light-emitting element 24. Note that when at least a semiconductor layer included in the transistor 205 and a semiconductor layer included in the transistor 206 are positioned on the same insulating surface, the transistor 205 and the transistor 206 can be both regarded as being included in the layer 210.

Owing to the above structure, the transistor 205 and the transistor 206 can be formed through a common manufacturing process.

Next, another structure of the display panel 20 is described with reference to an example of a cross-sectional structure illustrated in FIG. 25B. The structure of the display panel 20 illustrated in FIG. 25B is different from that of the display panel 20 illustrated in FIG. 25A in that the transistor 205 and the transistor 206 are included in different layers.

Figure 25B:
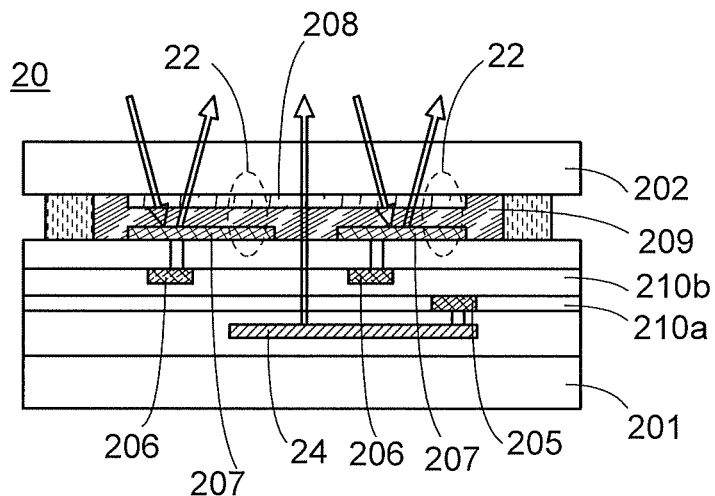

Specifically, the display panel 20 illustrated in FIG. 25B includes a layer 210*a* including the transistor 205 and a layer 210*b* including the transistor 206. The layer 210*a* and the layer 210*b* each include a region positioned between the reflective element 22 and the light-emitting element 24. In addition, in the display panel 20 illustrated in FIG. 25B, the layer 210*a* is closer to the light-emitting element 24 than the layer 210*b* is. Note that when at least the semiconductor layer included in the transistor 205 and the semiconductor layer included in the transistor 206 are positioned on different insulating surfaces, the transistor 205 and the transistor 206 can be regarded as being included in different layers.

Owing to the above structure, the transistor 205 and various wirings connected to the transistor 205 can partly overlap with the transistor 206 and various wirings connected to the transistor 206; therefore, high definition of the display panel 20 can be achieved while the pixel size is kept small.

Next, another structure of the display panel 20 of one embodiment of the present invention is described with reference to an example of a cross-sectional structure illustrated in FIG. 25C. The structure of the display panel 20 illustrated in FIG. 25C is different from that of the display panel 20 illustrated in FIG. 25A in that the transistor 205 and the transistor 206 are included in different layers. Furthermore, the structure of the display panel 20 illustrated in FIG. 25C is different from the structure of the display panel 20 illustrated in FIG. 25B in that the layer 210*a* including the transistor 205 is closer to the substrate 201 than the light-emitting element 24 is.

Figure 25C:
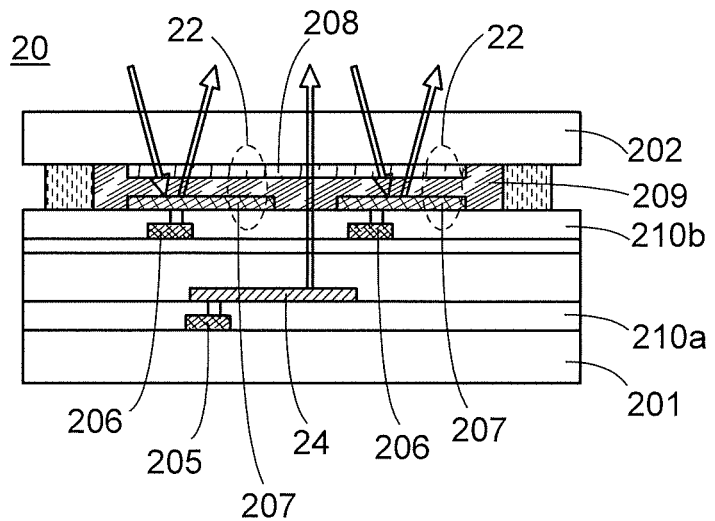

Specifically, the display panel 20 illustrated in FIG. 25C includes the layer 210*a* including the transistor 205 and the layer 210*b* including the transistor 206. The layer 210*a* includes a region between the light-emitting element 24 and the substrate 201. The layer 210*b* includes a region positioned between the reflective element 22 and the light-emitting element 24.

Owing to the above structure, the transistor 205 and the wirings connected to the transistor 205 can overlap with the transistor 206 and the wirings connected to the transistor 206, to a larger extent than in the case of FIG. 25B; therefore, higher definition of the display panel 20 can be achieved while the pixel size is kept small.

Although FIGS. 25A to 25C each illustrate the cross-sectional structure where one light-emitting element 24 is provided with respect to two reflective elements 22, one embodiment of the present invention is not limited thereto. The display panel 20 may have a cross-sectional structure where one light-emitting element 24 is provided with respect to one reflective element 22 or a cross-sectional structure where a plurality of light-emitting elements 24 is provided with respect to one reflective element 22.

FIGS. 25A to 25C each illustrate the case where the pixel electrode 207 included in the reflective element 22 has a function of reflecting visible light; however, one embodiment is not limited thereto. The pixel electrode 207 may have a function of transmitting visible light. In this case, a light source such as a backlight or a front light may be provided in the display panel 20; alternatively, the light-emitting element 24 may be used as a light source when an image is displayed with the use of the reflective element 22.

<<Configuration Examples of Pixel>>

Next, examples of a circuit configuration of a pixel included in the display panel 20 illustrated in FIG. 24 and FIGS. 25A to 25C are described with reference to FIGS. 26A and 26B, FIGS. 27A and 27B, FIG. 28, and FIG. 29.

Figure 26A:
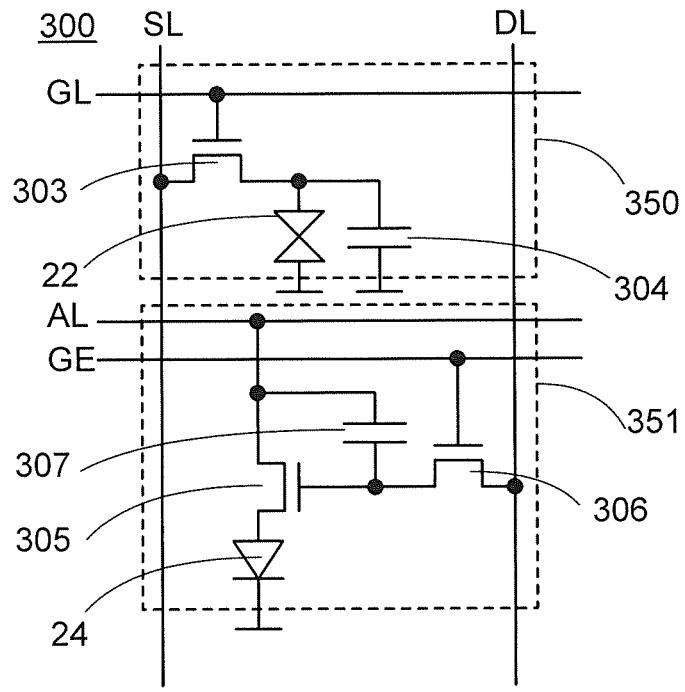
FIGS. 26A and 26B are circuit diagrams each illustrating a configuration example of a pixel.

A pixel 300 illustrated in FIG. 26A includes a pixel 350 and a pixel 351. The pixel 350 includes the reflective element 22, and the pixel 351 includes the light-emitting element 24.

Specifically, the pixel 350 includes the reflective element 22, a transistor 303 having a function of controlling a voltage applied to the reflective element 22, and a capacitor 304. A gate of the transistor 303 is electrically connected to the wiring GL, one of a source and a drain thereof is electrically connected to the wiring SL, and the other of the source and the drain thereof is electrically connected to the pixel electrode of the reflective element 22. The common electrode of the reflective element 22 is electrically connected to a wiring or electrode to which a predetermined potential is supplied. One electrode of the capacitor 304 is electrically connected to the pixel electrode of the reflective element 22, and the other electrode thereof is electrically connected to a wiring or electrode to which a predetermined potential is supplied.

Specifically, the pixel 351 includes the light-emitting element 24, a transistor 305 having a function of controlling a current supplied to the light-emitting element 24, a transistor 306 having a function of controlling supply of a potential to a gate of the transistor 305, and a capacitor 307. A gate of the transistor 306 is electrically connected to a wiring GE, one of a source and a drain thereof is electrically connected to a wiring DL, and the other of the source and the drain thereof is electrically connected to the gate of the transistor 305. One of a source and a drain of the transistor 305 is electrically connected to a wiring AL, and the other of the source and the drain thereof is electrically connected to the light-emitting element 24. One electrode of the capacitor 307 is electrically connected to the wiring AL, and the other electrode thereof is electrically connected to the gate of the transistor 305.

In the pixel 300 illustrated in FIG. 26A, an image signal for the reflective element 22 is supplied to the wiring SL, and an image signal for the light-emitting element 24 is supplied to the wiring DL; accordingly, a gray scale of an image displayed by the reflective element 22 and a gray scale of an image displayed by the light-emitting element 24 can be controlled independently.

Note that although FIG. 26A illustrates the configuration example of the pixel 300 which includes one pixel 350 including the reflective element 22 and one pixel 351 including the light-emitting element 24, the pixel 300 may include a plurality of pixels 350 or may include a plurality of pixels 351.

Figure 26B:
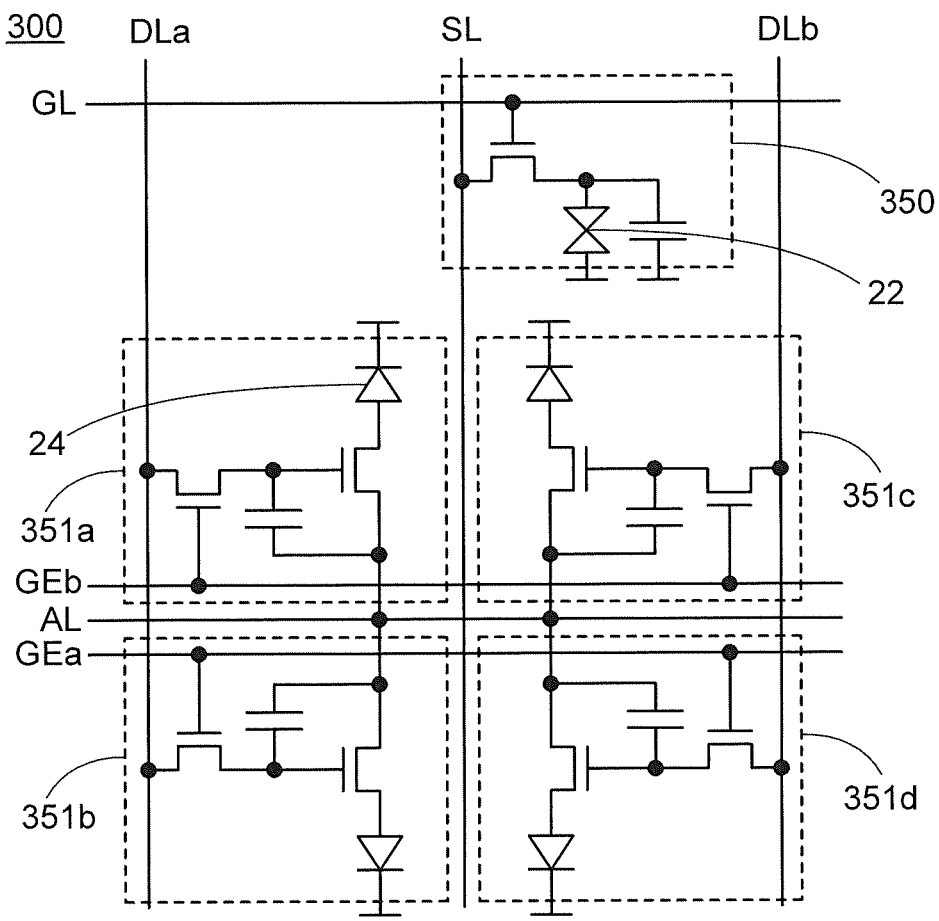

FIG. 26B illustrates a configuration example of the pixel 300 which includes one pixel 350 and four pixels 351.

Specifically, the pixel 300 illustrated in FIG. 26B includes the pixel 350 including the reflective element 22 and pixels 351*a* to 351*d* each including the light-emitting element 24.

The configuration of the pixel 350 illustrated in FIG. 26A can be referred to for the configuration of the pixel 350 illustrated in FIG. 26B.

Similarly to the pixel 351 illustrated in FIG. 26A, each of the pixels 351a to 351d illustrated in FIG. 26B includes the light-emitting element 24, the transistor 305 having a function of controlling a current supplied to the light-emitting element 24, the transistor 306 having a function of controlling supply of a potential to the gate of the transistor 305, and the capacitor 307. The light-emitting elements 24 of the pixels 351a to 351d emit light having wavelengths in different ranges; thus, the display device can display a color image.

In the pixels 351a to 351d in FIG. 26B, the gate of the transistor 306 included in the pixel 351a and the gate of the transistor 306 included in the pixel 351c are electrically connected to a wiring GEb. Furthermore, the gate of the transistor 306 included in the pixel 351b and the gate of the transistor 306 included in the pixel 351d are electrically connected to a wiring GEa.

In the pixels 351a to 351d in FIG. 26B, one of the source and the drain of the transistor 306 included in the pixel 351a and one of the source and the drain of the transistor 306 included in the pixel 351b are electrically connected to a wiring DLa. Furthermore, one of the source and the drain of the transistor 306 included in the pixel 351c and one of the source and the drain of the transistor 306 included in the pixel 351d are electrically connected to a wiring DLb.

One of the source and the drain of the transistor 305 in each of the pixels 351a to 351d in FIG. 26B is electrically connected to the wiring AL.

As described above, among the pixels 351a to 351d in FIG. 26B, the pixel 351a and the pixel 351c share the wiring GEb, and the pixel 351b and the pixel 351d share the wiring GEa. Alternatively, all the pixels 351a to 351d may share one wiring GE. In this case, it is preferable that the pixels 351a to 351d be electrically connected to four different wirings DL.

Figure 27A:
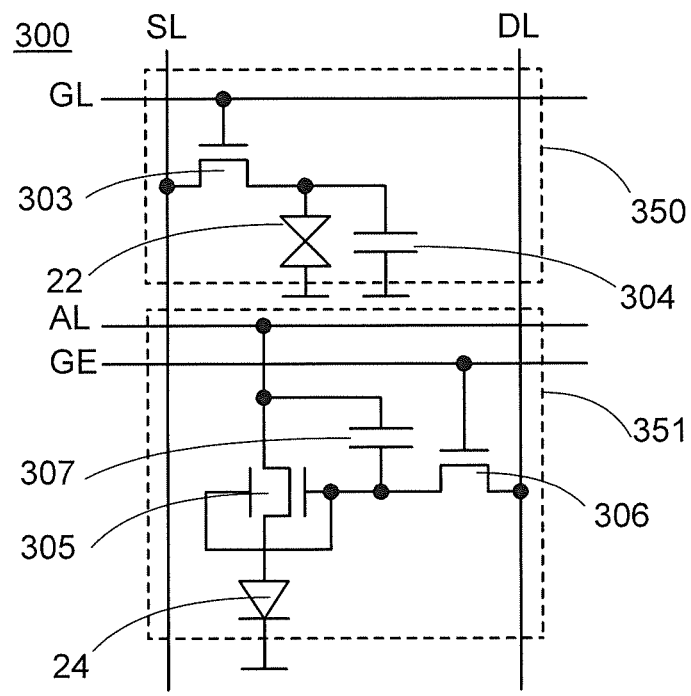
FIGS. 27A and 27B are circuit diagrams each illustrating a configuration example of a pixel.

Next, FIG. 27A illustrates a configuration example of the pixel 300 which is different from that illustrated in FIG. 26A. The configuration of the pixel 300 illustrated in FIG. 27A is different from the configuration of the pixel 300 illustrated in FIG. 26A in that the transistor 305 included in the pixel 351 has a back gate.

Specifically, in the pixel 300 illustrated in FIG. 27A, the back gate of the transistor 305 is electrically connected to the gate (front gate) thereof. Owing to the above configuration, a shift of the threshold voltage of the transistor 305 can be reduced, which can improve the reliability of the transistor 305 in the pixel 300 illustrated in FIG. 27A. In addition, owing to the above configuration, the size of the transistor 305 can be small and the on-state current of the transistor 305 can be high in the pixel 300 illustrated in FIG. 27A.

Note that in the display device of one embodiment of the present invention, the pixel 300 may include a plurality of pixels 350, each of which is illustrated in FIG. 27A, or may include a plurality of pixels 351, each of which is illustrated in FIG. 27A. Specifically, similarly to the case of the pixel 300 illustrated in FIG. 26B, one pixel 350 illustrated in FIG. 27A and four pixels 351 each of which is illustrated in FIG. 27A may be included. In this case, the pixel 300 illustrated in FIG. 26B can be referred to for connection relationship between wirings and the four pixels 351.

Figure 27B:
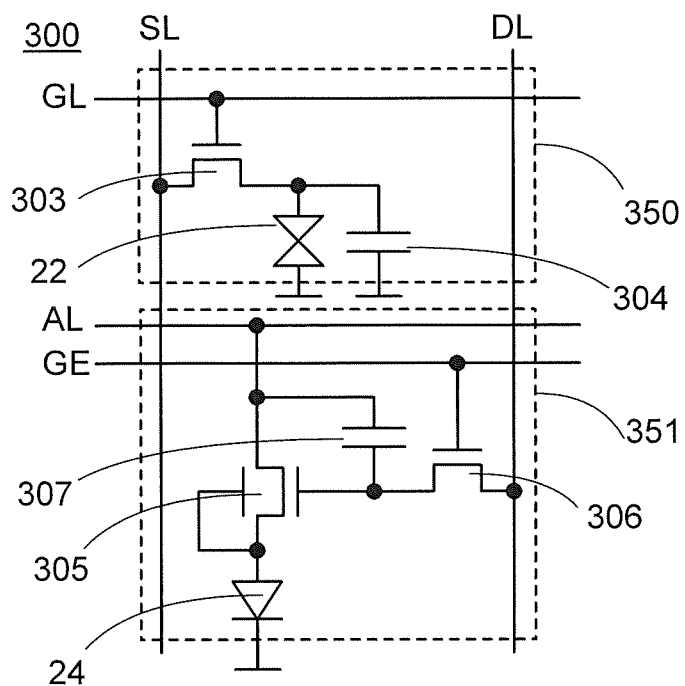

Next, FIG. 27B illustrates a configuration example of the pixel 300 which is different from that illustrated in FIG. 26A. The configuration of the pixel 300 illustrated in FIG. 27B is different from the configuration of the pixel 300 illustrated in FIG. 26A in that the transistor 305 included in the pixel 351 has a back gate. The configuration of the pixel 300 illustrated in FIG. 27B is different from the configuration of the pixel 300 illustrated in FIG. 27A in that the back gate of the transistor 305 is electrically connected to the light-emitting element 24, not to the gate.

Owing to the above configuration, a shift of the threshold voltage of the transistor 305 can be reduced, which can improve the reliability of the transistor 305 in the pixel 300 illustrated in FIG. 27B.

Note that in the display device of one embodiment of the present invention, the pixel 300 may include a plurality of pixels 350, each of which is illustrated in FIG. 27B, or may include a plurality of pixels 351, each of which is illustrated in FIG. 27B. Specifically, similarly to the case of the pixel 300 illustrated in FIG. 26B, one pixel 350 illustrated in FIG. 27B and four pixels 351 each of which is illustrated in FIG. 27B may be included. In this case, the pixel 300 illustrated in FIG. 26B can be referred to for connection relationship between wirings and the four pixels 351.

Figure 28:
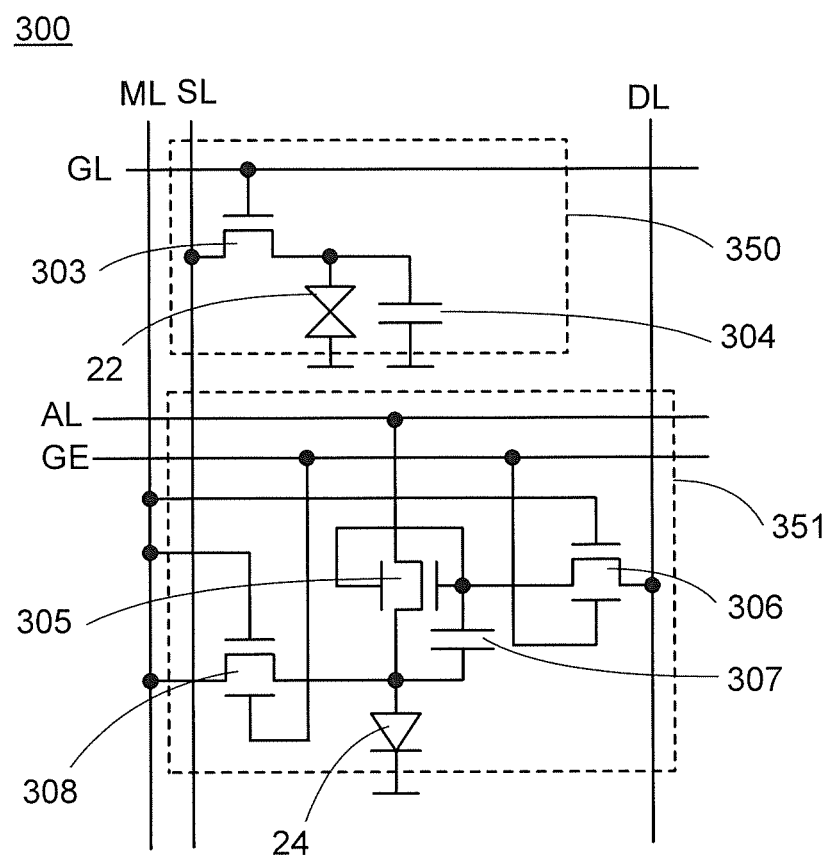
FIG. 28 is a circuit diagram illustrating a configuration example of a pixel.

Next, FIG. 28 illustrates a configuration example of the pixel 300 which is different from that in FIG. 26A. The pixel 300 illustrated in FIG. 28 includes the pixel 350 and the pixel 351. The pixel 300 in FIG. 28 is different from that in FIG. 26A in the configuration of the pixel 351.

Specifically, the pixel 351 illustrated in FIG. 28 includes the light-emitting element 24, the transistor 305 having a function of controlling a current supplied to the light-emitting element 24, the transistor 306 having a function of controlling supply of a potential to the gate of the transistor 305, a transistor 308 having a function of supplying a predetermined potential to the pixel electrode of the light-emitting element 24, and the capacitor 307. The transistor 305, the transistor 306, and the transistor 308 each have a back gate.

The gate (front gate) of the transistor 306 is electrically connected to the wiring ML, the back gate thereof is electrically connected to the wiring GE, one of the source and the drain thereof is electrically connected to the wiring DL, and the other of the source and the drain thereof is electrically connected to the gate and the back gate of the transistor 305. One of the source and the drain of the transistor 305 is electrically connected to the wiring AL, and the other of the source and the drain thereof is electrically connected to the light-emitting element 24.

A gate (front gate) of the transistor 308 is electrically connected to the wiring ML, a back gate thereof is electrically connected to the wiring GE, one of a source and a drain thereof is electrically connected to the wiring ML, and the other of the source and the drain thereof is electrically connected to the light-emitting element 24. One electrode of the capacitor 307 is electrically connected to the light-emitting element 24, and the other electrode thereof is electrically connected to the gate of the transistor 305.

Note that FIG. 28 illustrates the configuration example of the pixel 300 which includes one pixel 350 including the reflective element 22 and one pixel 351 including the light-emitting element 24; however, the pixel 300 may include a plurality of pixels 350 or a plurality of pixels 351.

Figure 29:
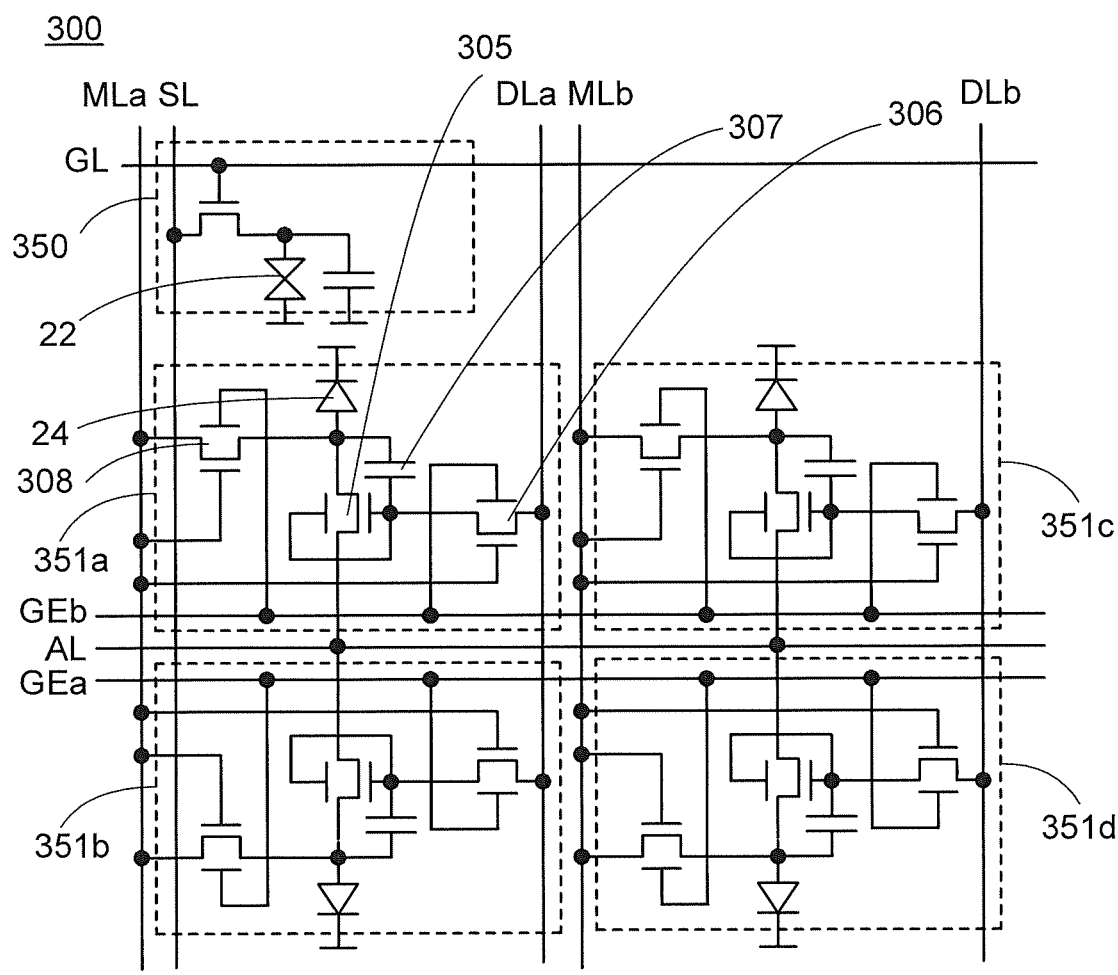
FIG. 29 is a circuit diagram illustrating a configuration example of a pixel.

FIG. 29 illustrates a configuration example of the pixel 300 which includes one pixel 350 and four pixels 351.

Specifically, the pixel 300 illustrated in FIG. 29 includes the pixel 350 including the reflective element 22 and the pixels 351a to 351d each including the light-emitting element 24.

The configuration of the pixel 350 illustrated in FIG. 29 can be referred to for the configuration of the pixel 350 illustrated in FIG. 28.

Similarly to the pixel 351 illustrated in FIG. 28, each of the pixels 351a to 351d illustrated in FIG. 29 includes the light-emitting element 24, the transistor 305 having a function of controlling a current supplied to the light-emitting element 24, the transistor 306 having a function of controlling supply of a potential to the gate of the transistor 305, the transistor 308 having a function of supplying a predetermined potential to the pixel electrode of the light-emitting element 24, and the capacitor 307. The light-emitting elements 24 of the pixels 351a to 351d emit light having wavelengths in different ranges; thus, the display device can display a color image.

In the pixels 351a to 351d in FIG. 29, the gate of the transistor 306 included in the pixel 351a and the gate of the transistor 306 included in the pixel 351b are electrically connected to a wiring MLa. In addition, the gate of the transistor 306 included in the pixel 351c and the gate of the transistor 306 included in the pixel 351d are electrically connected to a wiring MLb.

In the pixels 351a to 351d in FIG. 29, the back gate of the transistor 306 included in the pixel 351a and the back gate of the transistor 306 included in the pixel 351c are electrically connected to the wiring GEb. Furthermore, the back gate of the transistor 306 included in the pixel 351b and the back gate of the transistor 306 included in the pixel 351d are electrically connected to the wiring GEa.

In the pixels 351a to 351d in FIG. 29, one of the source and the drain of the transistor 306 included in the pixel 351a and one of the source and the drain of the transistor 306 included in the pixel 351b are electrically connected to the wiring DLa. Furthermore, one of the source and the drain of the transistor 306 included in the pixel 351c and one of the source and the drain of the transistor 306 included in the pixel 351d are electrically connected to the wiring DLb.

In the pixels 351a to 351d in FIG. 29, the back gate of the transistor 308 included in the pixel 351a and the back gate of the transistor 308 included in the pixel 351c are electrically connected to the wiring GEb. Furthermore, the back gate of the transistor 308 included in the pixel 351b and the back gate of the transistor 308 included in the pixel 351d are electrically connected to the wiring GEa.

In the pixels 351a to 351d in FIG. 29, the gate and one of the source and the drain of the transistor 308 included in the pixel 351a are electrically connected to the wiring MLa, and the gate and one of the source and the drain of the transistor 308 included in the pixel 351b are electrically connected to the wiring MLa. Furthermore, the gate and one of the source and the drain of the transistor 308 included in the pixel 351c are electrically connected to the wiring MLb, and the gate and one of the source and the drain of the transistor 308 included in the pixel 351b are electrically connected to the wiring MLb.

One of the source and the drain of the transistor 305 in each of the pixels 351a to 351d in FIG. 29 is electrically connected to the wiring AL.

As described above, among the pixels 351a to 351d in FIG. 29, the pixel 351a and the pixel 351c share the wiring GEb, and the pixel 351b and the pixel 351d share the wiring GEa. Alternatively, all the pixels 351a to 351d may share one wiring GE. In this case, it is preferable that the pixels 351a to 351d be electrically connected to four different wirings DL.

Note that in the case where the display screen does not need updating (i.e., in the case where a still image is displayed), when a transistor with low off-state current is used in the pixel 350, the driver circuit can be temporarily stopped (which is referred to as "idling stop" or "IDS driving" in the following description). The IDS driving can reduce the power consumption of the display panel 20.

To perform IDS driving, it is preferable that the dielectric constant anisotropy of the liquid crystal layer be greater than or equal to 2 and less than or equal to 3.8, and that the resistivity of the liquid crystal layer be greater than or equal to $1.0 \times 10^{14}$ ($\Omega \cdot cm$) and less than or equal to $1.0 \times 10^{15}$ ($\Omega \cdot cm$).

When the dielectric constant anisotropy of the liquid crystal layer is high, interaction with an electric field is strong and the operation speed of the liquid crystal layer is high; thus, the display panel can operate at a high speed. Note that when the dielectric constant anisotropy of the liquid crystal layer exceeds 3.8, impurities in the liquid crystal are difficult to remove. The impurities that remain in the liquid crystal layer increase the conductivity of the liquid crystal layer, which makes it difficult to keep voltage which has been applied to a pixel when IDS driving is performed.

In contrast, when the dielectric constant anisotropy of the liquid crystal layer is low, the amount of an impurity in the liquid crystal layer can be reduced, so that the liquid crystal layer can have reduced conductivity. Note that when the dielectric constant anisotropy of the liquid crystal layer is less than 2, interaction with an electric field is small and the operation speed of the liquid crystal layer is low; thus, a high driving voltage is needed for high speed operation, and reduction in the power consumption is difficult.

For these reasons, when the dielectric constant anisotropy of the liquid crystal layer is set to be greater than or equal to 2 and less than or equal to 3.8, and the resistivity of the liquid crystal layer is set to be greater than or equal to $1.0 \times 10^{14}$ ($\Omega \cdot cm$) and less than or equal to $1.0 \times 10^{15}$ ($\Omega \cdot cm$), IDS driving can be performed, so that the power consumption of the display panel 20 can be reduced.

<<Cross-Sectional View of Display Panel>>

Figure 30:
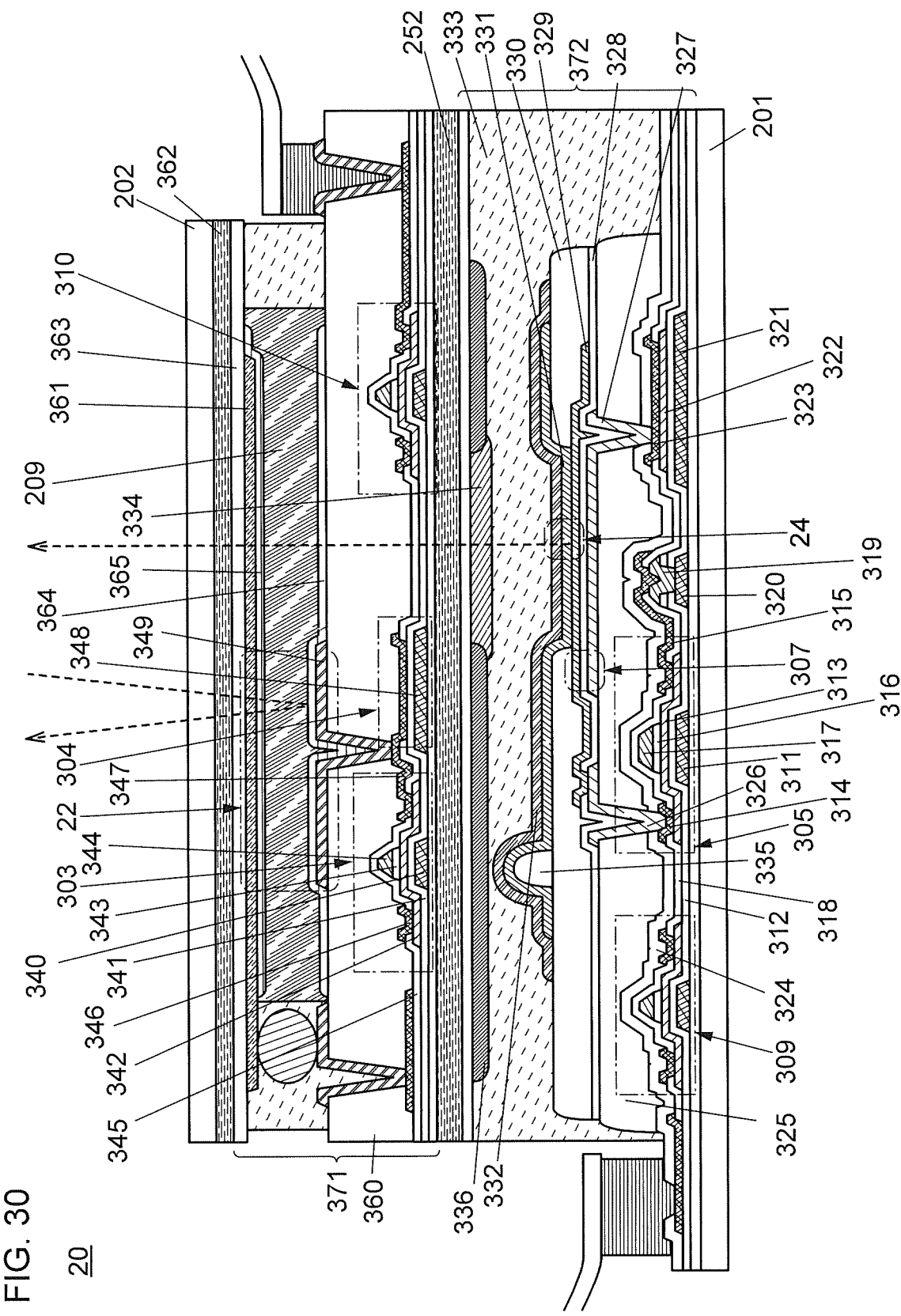
FIG. 30 is a cross-sectional view illustrating a structural example of a display panel.
Figure 31:
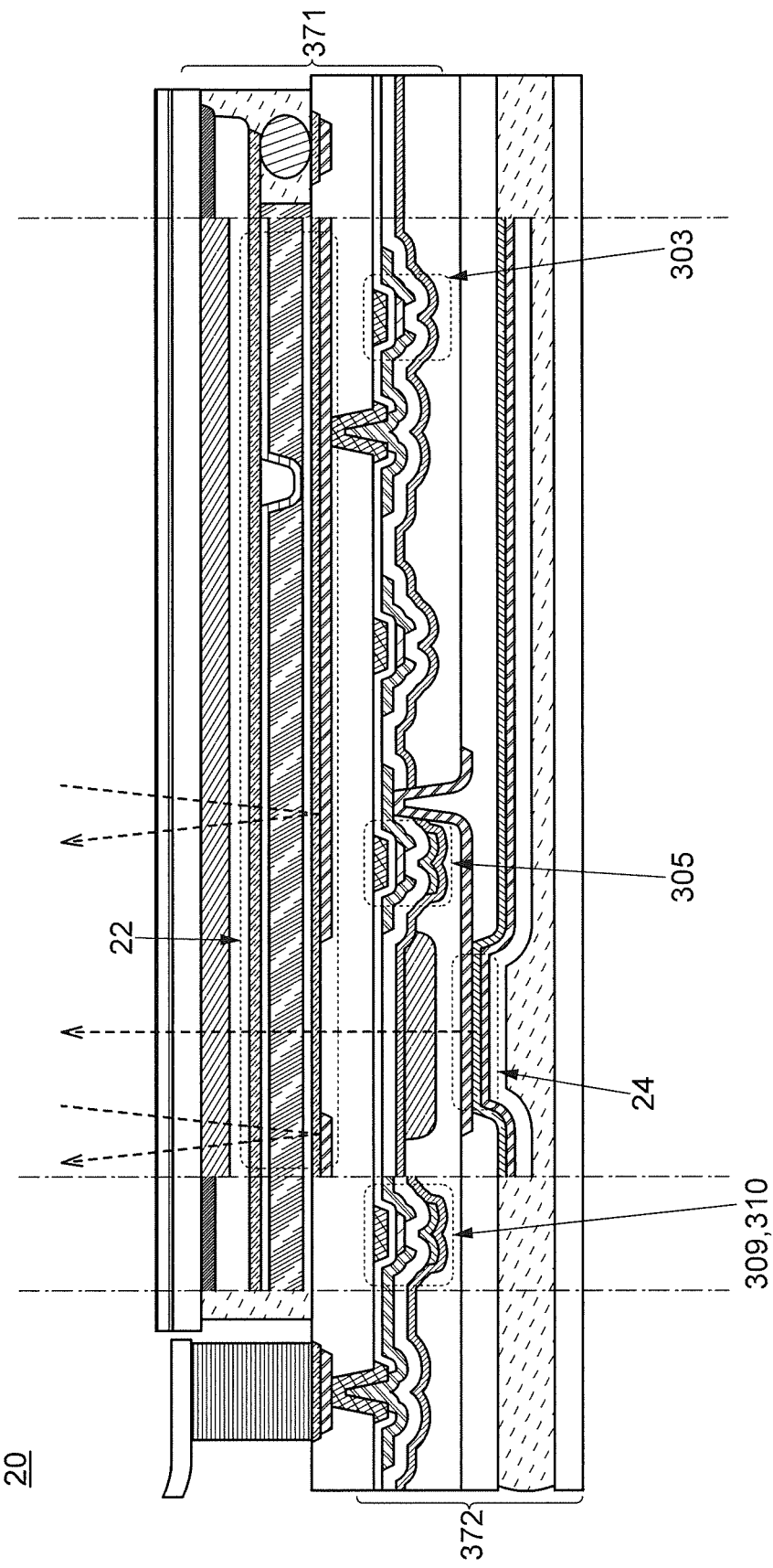
FIG. 31 is a cross-sectional view illustrating a structure example of a display panel.
Figure 32:
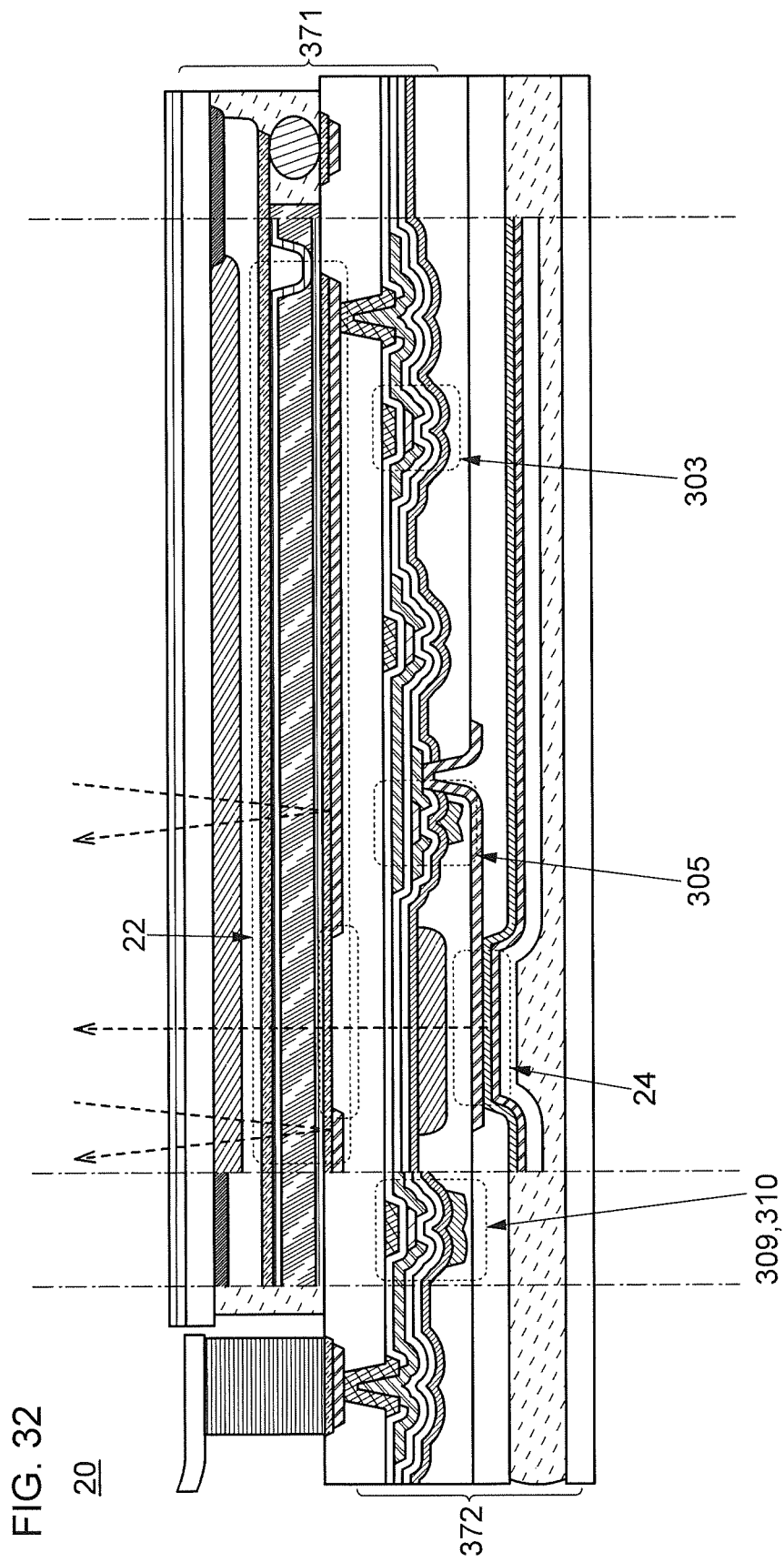
FIG. 32 is a cross-sectional view illustrating a structure example of a display panel.

A more specific structure example of the display panel 20 in FIG. 25C is illustrated in FIG. 30. Note that although more specific structure examples of the display panels 20 in FIGS. 25A and 25B are illustrated in FIG. 31 and FIG. 32, respectively, detailed description thereof is omitted. Reference numerals that are the same as those in FIG. 30 are used in FIG. 31 and FIG. 32.

The display panel 20 illustrated in FIG. 30 has a structure in which a display portion 372 and a display portion 371 are stacked between the substrate 201 and the substrate 202. Specifically, the display portion 372 and the display portion 371 are bonded to each other with a bonding layer 252 in FIG. 30.

In addition, the light-emitting element 24, the transistor 305, and the capacitor 307 included in the pixel of the display portion 372, and a transistor 309 included in a driver circuit of the display portion 372 are illustrated in FIG. 30. Furthermore, the reflective element 22, the transistor 303, and the capacitor 304 included in the pixel of the display portion 371, and a transistor 310 included in a driver circuit of the display portion 371 are illustrated in FIG. 30.

The transistor 305 includes a conductive layer 311 functioning as a back gate, an insulating layer 312 over the conductive layer 311, a semiconductor layer 313 which is provided over the insulating layer 312 to overlap with the conductive layer 311, an insulating layer 316 over the semiconductor layer 313, a conductive layer 317 which functions as a gate and is positioned over the insulating layer 316, and conductive layers 314 and 315 which are positioned over an insulating layer 318 over the conductive layer 317 and electrically connected to the semiconductor layer 313.

The conductive layer 315 is electrically connected to a conductive layer 319. The conductive layer 319 is electrically connected to a conductive layer 320. The conductive layer 319 is formed in the same layer as the conductive layer 317. The conductive layer 320 is formed in the same layer as the conductive layer 311.

A conductive layer 321 which functions as a back gate of the transistor 306 (not illustrated) is positioned in the same layer as the conductive layers 311 and 320. The insulating layer 312 is positioned over the conductive layer 321. A semiconductor layer 322 which includes a region overlapping with the conductive layer 321 is positioned over the insulating layer 312. The semiconductor layer 322 includes a channel formation region of the transistor 306 (not illustrated). The insulating layer 318 is positioned over the semiconductor layer 322. A conductive layer 323 is positioned over the insulating layer 318. The conductive layer 323 is electrically connected to the semiconductor layer 322. The conductive layer 323 functions as a source or a drain of the transistor 306 (not illustrated).

Since the transistor 309 has a structure similar to that of the transistor 305, detailed description thereof is omitted.

An insulating layer 324 is positioned over the transistor 305, the conductive layer 323, and the transistor 309. An insulating layer 325 is positioned over the insulating layer 324. A conductive layer 326 and a conductive layer 327 are positioned over the insulating layer 325. The conductive layer 326 is electrically connected to the conductive layer 314. The conductive layer 327 is electrically connected to the conductive layer 323. An insulating layer 328 is positioned over the conductive layer 326 and the conductive layer 327. A conductive layer 329 is positioned over the insulating layer 328. The conductive layer 329 is electrically connected to the conductive layer 326 and functions as a pixel electrode of the light-emitting element 24.

A region where the conductive layer 327, the insulating layer 328, and the conductive layer 329 overlap with one another functions as the capacitor 307.

An insulating layer 330 is positioned over the conductive layer 329. An EL layer 331 is positioned over the insulating layer 330. A conductive layer 332 functioning as a counter electrode is positioned over the EL layer 331. The conductive layer 329, the EL layer 331, and the conductive layer 332 are electrically connected to one another in an opening of the insulating layer 330. A region where the conductive layer 329, the EL layer 331, and the conductive layer 332 are electrically connected to one another functions as the light-emitting element 24. The light-emitting element 24 has a top emission structure in which light is emitted from the conductive layer 332 side toward a direction shown by an arrow of a broken line.

One of the conductive layer 329 and the conductive layer 332 functions as an anode, and the other thereof functions as a cathode. When a voltage higher than the threshold voltage of the light-emitting element 24 is applied between the conductive layer 329 and the conductive layer 332, holes are injected to the EL layer 331 from the anode side and electrons are injected to the EL layer 331 from the cathode side. The injected electrons and holes are recombined in the EL layer 331 and a light-emitting substance contained in the EL layer 331 emits light.

Note that when metal oxide is used as each of the semiconductor layers 313 and 322, it is preferable that an insulating material containing oxygen be used for the insulating layer 318 and that a material in which an impurity such as water or hydrogen is less likely to diffuse be used for the insulating layer 324 in order to increase the reliability of the display.

In the case where an organic material is used for the insulating layer 325 or the insulating layer 330, when the insulating layer 325 or the insulating layer 330 is exposed at an end portion of the display, an impurity such as moisture in the outside of the display might enter the light-emitting element 24 or the like through the insulating layer 325 or the insulating layer 330. The entry of an impurity deteriorates the light-emitting element 24, leading to deterioration of the display. Thus, as illustrated in FIG. 30, it is preferable that neither the insulating layer 325 nor the insulating layer 330 be positioned at the end portion of the display.

The light-emitting element 24 overlaps with a coloring layer 334 with a bonding layer 333 positioned therebetween. A spacer 335 and a light-blocking layer 336 overlap with each other with the bonding layer 333 positioned therebetween. Although FIG. 30 illustrates the case where a space is provided between the conductive layer 332 and the light-blocking layer 336, the conductive layer 332 and the light-blocking layer 336 may be in contact with each other.

The coloring layer 334 is a colored layer that transmits light in a specific wavelength range. For example, a color filter that transmits light in a specific wavelength range, such as red, green, blue, or yellow light, can be used.

Note that one embodiment of the present invention is not limited to a color filter method, and a separate coloring method, a color conversion method, a quantum dot method, and the like may be employed.

The transistor 303 in the display portion 371 includes a conductive layer 340 functioning as a back gate, an insulating layer 341 over the conductive layer 340, a semiconductor layer 342 which is provided over the insulating layer 341 to overlap with the conductive layer 340, an insulating layer 343 over the semiconductor layer 342, a conductive layer 344 which functions as a gate and is positioned over the insulating layer 343, and conductive layers 346 and 347 which are positioned over an insulating layer 345 over the conductive layer 344 and electrically connected to the semiconductor layer 342.

A conductive layer 348 is positioned in the same layer as the conductive layer 340. The insulating layer 341 is positioned over the conductive layer 348. The conductive layer 347 is positioned over the insulating layer 341 to overlap with the conductive layer 348. A region where the conductive layer 347, the insulating layer 341, and the conductive layer 348 overlap with one another functions as the capacitor 304.

Since the transistor 310 has a structure similar to that of the transistor 303, detailed description thereof is omitted.

An insulating layer 360 is positioned over the transistor 303, the capacitor 304, and the transistor 310. A conductive layer 349 is positioned over the insulating layer 360. The conductive layer 349 is electrically connected to the conductive layer 347 and functions as a pixel electrode of the reflective element 22. An alignment film 364 is positioned over the conductive layer 349.

A conductive layer 361 functioning as a common electrode is provided over the substrate 202. Specifically, in FIG. 30, an insulating layer 363 is attached so as to be positioned over the substrate 202 with a bonding layer 362 positioned therebetween, and the conductive layer 361 is positioned on the insulating layer 363. Furthermore, an alignment film 365 is positioned on the conductive layer 361, and the liquid crystal layer 209 is positioned between the alignment film 364 and the alignment film 365.

In FIG. 30, the conductive layer 349 has a function of reflecting visible light, and the conductive layer 361 has a function of transmitting visible light; accordingly, light entering through the substrate 202 can be reflected by the conductive layer 349 and then exits through the substrate 202, as shown by an arrow of a broken line.

For example, a material containing one of indium (In), zinc (Zn), and tin (Sn) is preferably used for the conductive material that transmits visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium are given, for example. Note that a film including graphene can be used as well. The film including graphene can be formed, for example, by reducing a film containing graphene oxide.

Examples of a conductive material that reflects visible light include aluminum, silver, and an alloy including any of these metal elements. Furthermore, a metal material such as gold, platinum, nickel, tungsten, chromium, molybdenum, iron, cobalt, copper, or palladium or an alloy containing any of these metal materials can be used. Furthermore, lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (also referred to as Ag—Pd—Cu or APC), or an alloy of silver and magnesium may be used.

A light diffusion plate is preferably provided on a display surface side of the substrate 202. The light diffusion plate can reduce glare at the conductive layer 349, which can increase the visibility of the display panel 20. Note that the visibility of the display panel 20 can be increased by making the conductive layer 349 have an uneven surface instead of providing the light diffusion plate on the display surface side of the substrate 202.

Although the structure of the display device including a top-gate transistor with a back gate is illustrated in FIG. 30, the display device of one embodiment of the present invention may include a transistor without a back gate or a bottom-gate transistor.

The semiconductor layers 342, 313, and 322 each function as a channel formation region of a transistor. For any of the semiconductor layers, crystalline silicon, polycrystalline silicon, amorphous silicon, metal oxide, an organic semiconductor, or the like may be used. Impurities may be introduced to any of the semiconductor layers, if necessary, to increase conductivity of the semiconductor layer or control the threshold value of the transistor.

When metal oxide is used for each of the semiconductor layers 342, 313, and 322, the metal oxide preferably includes at least one of indium (In) and zinc (Zn). Typical examples of such oxide include In-M-Zn oxide, In-M oxide, Zn-M oxide, and In—Zn oxide (the element M is aluminum (Al), gallium (Ga), yttrium (Y), tin (Sn), boron (B), silicon (Si), titanium (Ti), iron (Fe), nickel (Ni), germanium (Ge), zirconium (Zr), molybdenum (Mo), lanthanum (La), cerium (Ce), neodymium (Nd), vanadium (V), beryllium (Be), hafnium (Hf), tantalum (Ta), or tungsten (W), for example).

A transistor including the above-described metal oxide can have a low off-state current. Accordingly, an electrical signal such as an image signal can be held for a longer period, and a writing interval can be set longer in an on state. Accordingly, the frequency of refresh operation can be reduced, which leads to an effect of suppressing power consumption.

<<External View of Display Panel>>

Figure 33A:
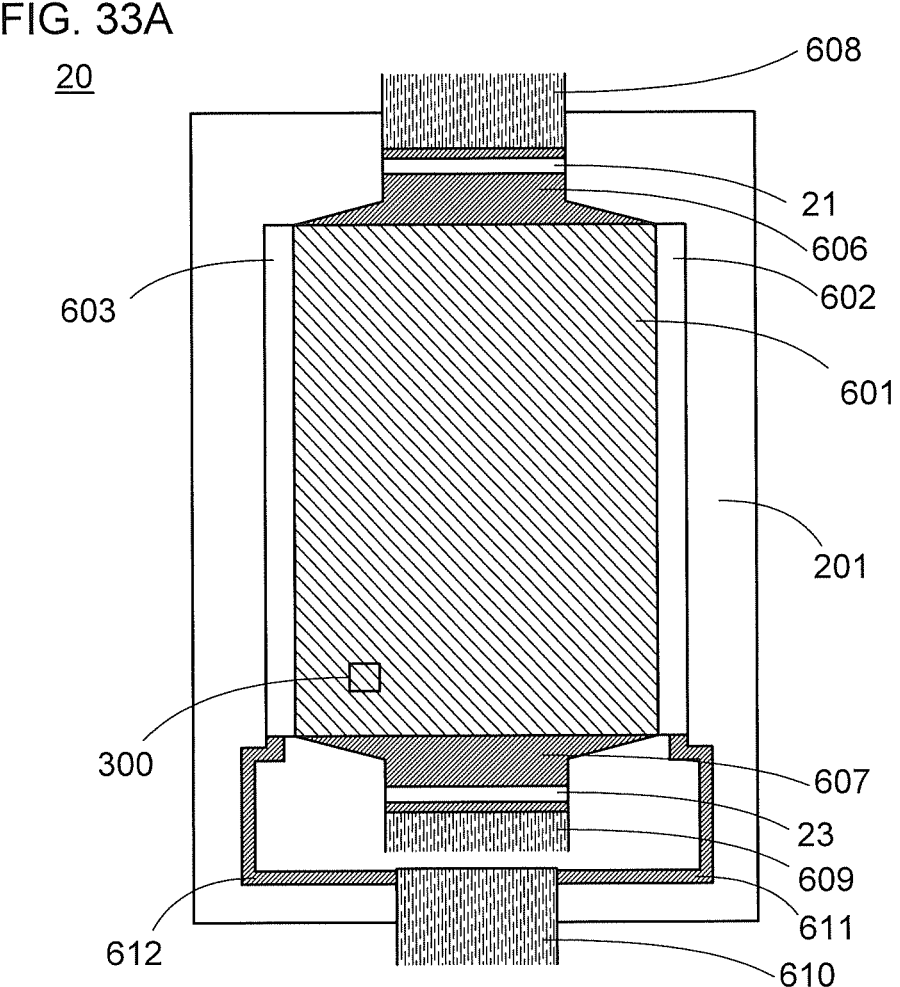
FIG. 33A is a top view illustrating a structure example of a display panel.

Next, FIG. 33A illustrates an example of an external view of the display panel 20. The display panel 20 illustrated in FIG. 33A includes, over the substrate 201, a pixel portion 601, a scan line driver circuit 602 for the pixel 350 including the reflective element 22, and a scan line driver circuit 603 for the pixel 351 including the light-emitting element 24. The DDI 21 is electrically connected to the pixel portion 601 via a wiring 606. The DDI 23 is electrically connected to the pixel portion 601 via a wiring 607.

An FPC 608 is electrically connected to the DDI 21. An FPC 609 is electrically connected to the DDI 23. An FPC 610 is electrically connected to the scan line driver circuit 602 via a wiring 611. Furthermore, the FPC 610 is electrically connected to the scan line driver circuit 603 via a wiring 612.

Figure 33B:
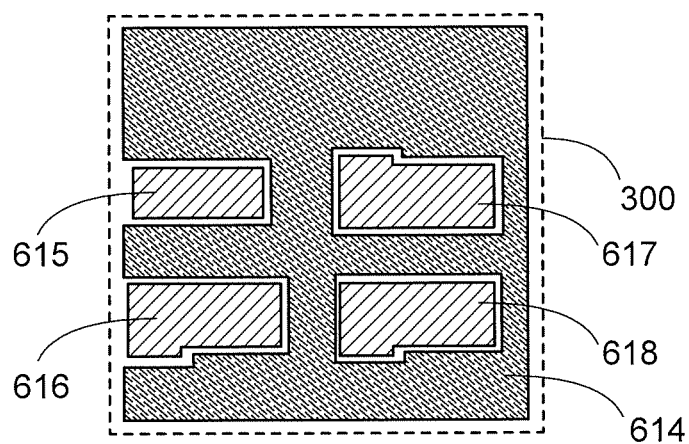
FIG. 33B is a top view illustrating a structure example of a pixel.

Next, a layout of a display region of the reflective element 22 and a layout of a display region of the light-emitting element 24 in the pixel 300 included in the pixel portion 601 are illustrated in FIG. 33B.

Specifically, in FIG. 33B, the pixel 300 includes a display region 614 of the reflective element, a display region 615 of the light-emitting element 24 corresponding to yellow, a display region 616 of the light-emitting element 24 corresponding to green, a display region 617 of the light-emitting element 24 corresponding to red, and a display region 618 of the light-emitting element 24 corresponding to blue.

Note that when light-emitting elements corresponding to green, blue, red, and yellow are used to display black with high color reproducibility, the amount of a current flowing in the light-emitting element corresponding to yellow per unit area needs to be the smallest. In FIG. 33B, the display region 616 of the light-emitting element corresponding to green, the display region 617 of the light-emitting element corresponding to red, and the display region 618 of the light-emitting element corresponding to blue have substantially the same areas, whereas the display region 615 of the light-emitting element corresponding to yellow has a relatively small area; therefore, black can be displayed with high color reproducibility.

Embodiment 5

FIGS. 34A to 34E illustrate specific examples of electronic devices including the display device 10 described in the above embodiment.

Figure 34A:
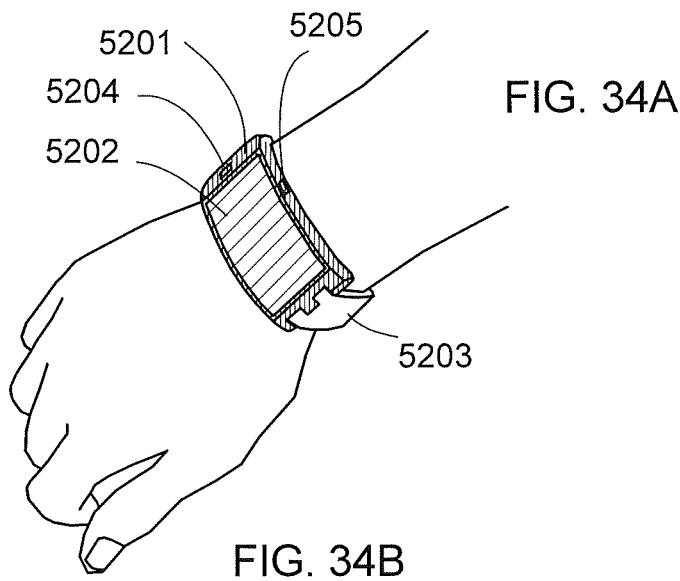
FIGS. 34A to 34E illustrate examples of an electronic device.

FIG. 34A illustrates a wristwatch-type mobile terminal, which includes a housing 5201, a display 5202, a band 5203, a photosensor 5204, a switch 5205, and the like. The display 5202 includes a touch sensor. A user can operate the mobile terminal by touching the display 5202. When the display device 10 described in the above embodiment is used in the display 5202, the visibility of a region which is touched by the user's finger can be improved. In addition, the power consumption of the mobile terminal can be reduced.

Figure 34B:
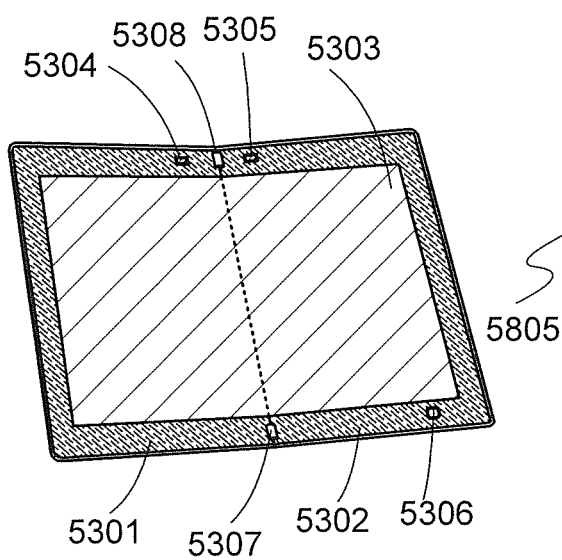

FIG. 34B illustrates a tablet personal computer, which includes a housing 5301, a housing 5302, a display 5303, a photosensor 5304, a photosensor 5305, a switch 5306, and the like. The display 5303 is supported by the housing 5301 and the housing 5302. The display 5303 is formed using a flexible substrate and therefore has a function of being flexible in shape and bendable. By changing the angle between the housing 5301 and the housing 5302 with a hinge 5307 and a hinge 5308, the display 5303 can be folded so that the housing 5301 and the housing 5302 overlap with each other. Although not illustrated, an open/close sensor may be incorporated so that the above-described angle change can be used as information about conditions of use of the display 5303. The display 5303 includes a touch sensor. A user can operate the personal computer by touching the display 5303. When the display device 10 described in the above embodiment is used in the display 5303, the visibility of a region which is touched by the user's finger can be improved. In addition, the power consumption of the personal computer can be reduced.

Figure 34C:
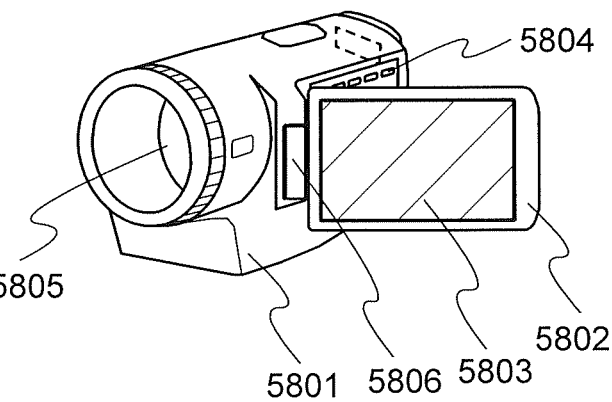

FIG. 34C illustrates a video camera, which includes a housing 5801, a housing 5802, a display 5803, operation keys 5804, a lens 5805, a joint 5806, and the like. The operation keys 5804 and the lens 5805 are provided in the housing 5801, and the display 5803 is provided in the housing 5802. The housing 5801 and the housing 5802 are connected to each other with the joint 5806, and the angle between the housing 5801 and the housing 5802 can be changed with the joint 5806. An image on the display 5803 may be switched depending on the angle between the housing 5801 and the housing 5802 at the joint 5806. The display 5803 includes a touch sensor. A user can operate the video camera by touching the display 5803. When the display device 10 described in the above embodiment is used in the display 5803, the visibility of a region which is touched by the user's finger can be improved. In addition, the power consumption of the video camera can be reduced.

Figure 34D:
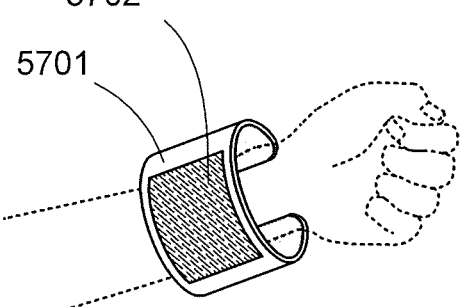

FIG. 34D illustrates a wristwatch-type mobile terminal, which includes a housing 5701 with a curved surface, a display 5702, and the like. When the display 5702 is formed using a flexible substrate, the display 5702 can be supported by the housing 5701 with the curved surface, and thus a use-friendly wristwatch-type mobile terminal that is flexible can be provided. The display 5702 includes a touch sensor. A user can operate the mobile terminal by touching the display 5702. When the display device 10 described in the above embodiment is used in the display 5702, the visibility of a region which is touched by the user's finger can be improved. In addition, the power consumption of the mobile terminal can be reduced.

Figure 34E:
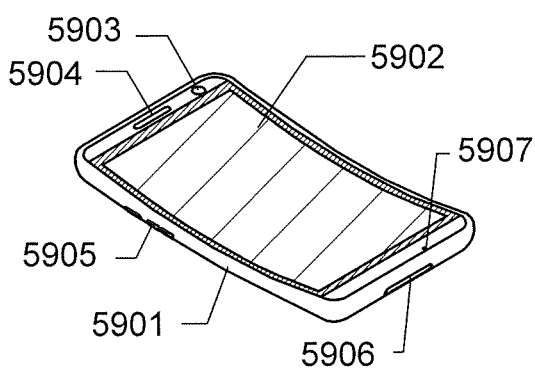

FIG. 34E illustrates a mobile phone, which includes a display 5902, a microphone 5907, a speaker 5904, a camera 5903, an external connection port 5906, and an operation button 5905 in a housing 5901 with a curved surface. The display 5902 includes a touch sensor. A user can operate the mobile phone by touching the display 5902. When the display device 10 described in the above embodiment is used in the display 5902, the visibility of a region which is touched by the user's finger can be improved. In addition, the power consumption of the mobile phone can be reduced.

In this specification and the like, a metal oxide means an oxide of metal in a broad sense. Metal oxides are classified into an oxide insulator, an oxide conductor (including a transparent oxide conductor), an oxide semiconductor (also simply referred to as an OS), and the like. For example, a metal oxide used in a semiconductor layer of a transistor is called an oxide semiconductor in some cases. That is to say, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis aligned crystal (CAAC)" or "cloud-aligned composite (CAC)" might be stated. CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC-metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are observed to be coupled in a cloud-like manner with their boundaries blurred, in some cases.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material, in some cases.

The CAC-OS or the CAC metal oxide includes components having different bandgaps. For example, the CAC-OS or the CAC metal oxide includes a component having a wide gap due to the insulating region and a component having a narrow gap due to the conductive region. In the case of such a composition, carriers mainly flow in the component having a narrow gap. The component having a narrow gap complements the component having a wide gap, and carriers also flow in the component having a wide gap in conjunction with the component having a narrow gap. Therefore, in the case where the above-described CAC-OS or the CAC metal oxide is used in a channel region of a transistor, high current drive capability in the on state of the transistor, that is, high on-state current and high field-effect mobility, can be obtained.

In other words, CAC-OS or CAC-metal oxide can be called a matrix composite or a metal matrix composite.

Unless otherwise specified, on-state current in this specification refers to drain current of a transistor in an on state. Unless otherwise specified, the on state (also sometimes abbreviated to "on") of an n-channel transistor means that the voltage between its gate and source ($V_G$) is higher than or equal to the threshold voltage ($V_{th}$), and the on state of a p-channel transistor means that $V_G$ is lower than or equal to $V_{th}$. For example, the on-state current of an n-channel transistor refers to drain current that flows when $V_G$ is higher than or equal to $V_{th}$. The on-state current of a transistor depends on a voltage $V_D$ between a drain and a source.

Unless otherwise specified, an off-state current in this specification refers to a drain current of a transistor in an off state. Unless otherwise specified, the off state (also sometimes abbreviated to "off") of an n-channel transistor means that $V_G$ is lower than $V_{th}$, and the off state of a p-channel transistor means that $V_G$ is higher than $V_{th}$. For example, the off-state current of an n-channel transistor refers to drain current that flows when $V_G$ is lower than $V_{th}$. The off-state current of a transistor depends on $V_G$ in some cases. Thus, "the off-state current of a transistor is lower than $10^{-21}$ A" may mean there is $V_G$ at which the off-state current of the transistor is lower than $10^{-21}$ A.

The off-state current of a transistor depends on $V_D$ in some cases. Unless otherwise specified, the off-state current in this specification may be off-state current at $V_D$ with an absolute value of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at $V_D$ used in a semiconductor device or the like including the transistor.

In this specification and the like, the terms "one of a source and a drain" (or a first electrode or a first terminal) and "the other of the source and the drain" (or a second electrode or a second terminal) are used to describe the connection relationship of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, an explicit description "X and Y are connected" means that X and Y are electrically connected and that X and Y are directly connected.

Here, X and Y each denote an object (e.g., a device, an element, a circuit, a wiring, an electrode, a terminal, a conductive film, or a layer).

Examples of the case in which X and Y are directly connected include a case in which X and Y are connected without elements that enable an electrical connection between X and Y, such as a switch, a transistor, a capacitor, an inductor, a resistor, a diode, a display element, a light-emitting element, or a load, connected between X and Y.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that a switch is conducting or not conducting (turned on or off) to determine whether current flows therethrough or not. Alternatively, the switch has a function of selecting and changing a current path. Note that the case where X and Y are electrically connected includes the case where X and Y are directly connected.

This application is based on Japanese Patent Application serial No. 2016-166719 filed with Japan Patent Office on Aug. 29, 2016, the entire contents of which are hereby incorporated by reference.

What is claimed is:

1. A display device comprising a display region displayed by a light-emitting element,
    wherein the display region is configured to detect a touch,
    wherein a point touched by a user in the display region is a first point,
    wherein another point touched by the user is a second point,
    wherein the display region comprises a first region and a second region obtained by excluding the first region from the display region,
    wherein the first region comprises the first point and the second point,
    wherein a luminance in the first region is higher than a luminance in the second region,
    wherein a luminance of blue in the second region is lower than a luminance of blue in the first region, and
    wherein the luminance of blue in the second region is lowered, while a luminance of red and green in the second region is not lowered.

2. The display device according to claim 1, wherein the display region displays a background and text including a plurality of lines.

3. A display device comprising a display region,
    wherein the display region is configured to detect a touch,
    wherein a point touched by a user's forefinger in the display region is a first point,
    wherein a point touched by a user's thumb is a second point,
    wherein the display region comprises a first region and a second region obtained by excluding the first region from the display region,
    wherein the first region comprises the first point and the second point,
    wherein a luminance in the first region is higher than a luminance in the second region,
    wherein a luminance of blue in the second region is lower than a luminance of blue in the first region,
    wherein display is performed in the first region by using a light-emitting element,
    wherein display is performed in the second region by using a reflective element, and
    wherein the luminance of blue in the second region is lowered, while a luminance of red and green in the second region is not lowered.

4. The display device according to claim 3, wherein the display region displays a background and text including a plurality of lines.

5. A display method,
    wherein a display region displayed by a light-emitting element is configured to detect a touch,
    wherein a point touched by a user's forefinger in the display region is a first point,
    wherein a point touched by a user's thumb is a second point,
    wherein the display region comprises a first region and a second region obtained by excluding the first region from the display region,
    wherein the first region comprises the first point and the second point,
    wherein a luminance in the first region is higher than a luminance in the second region,
    wherein a luminance of blue in the second region is lower than a luminance of blue in the first region, and
    wherein the luminance of blue in the second region is lowered, while a luminance of red and green in the second region is not lowered.

6. The display method according to claim 5, wherein the display region displays a background and text including a plurality of lines.

7. The display device according to claim 1, wherein a contour of the first region is one ellipse.

8. The display device according to claim 7, wherein the one ellipse is configured to be enlarged as a distance between the user's forefinger and thumb increases.

9. The display device according to claim 3, wherein a contour of the first region is one ellipse.

10. The display device according to claim 9, wherein the one ellipse is configured to be enlarged as a distance between the user's forefinger and thumb increases.

11. The display method according to claim 5, wherein a contour of the first region is one ellipse.

12. The display method according to claim 11, wherein the one ellipse is configured to be enlarged as a distance between the user's forefinger and thumb increases.

13. The display device according to claim 1, wherein a boundary between the first region and the second region has a luminance between that of the first region and the second region.

\* \* \* \* \*